United States Patent
Tashiro et al.

(10) Patent No.: US 7,212,266 B2
(45) Date of Patent: May 1, 2007

(54) LIQUID CRYSTAL DISPLAY HAVING REFLECTION ELECTRODES

(75) Inventors: Kunihiro Tashiro, Kawasaki (JP); Yasutoshi Tasaka, Kawasaki (JP); Katsufumi Ohmuro, Kawasaki (JP); Hidefumi Yoshida, Kawasaki (JP); Yoshinori Tanaka, Kawasaki (JP); Norio Sugiura, Kawasaki (JP); Seiji Doi, Kawasaki (JP); Manabu Sawasaki, Kawasaki (JP); Tomonori Tanose, Kawasaki (JP); Isao Tsushima, Kawasaki (JP); Tetsuya Fujikawa, Kawasaki (JP); Tomoshige Oda, Kawasaki (JP)

(73) Assignees: Fujitsu Limited, Kawasaki (JP); AU Optronics Corporation, Kawasaki (JP)

( * ) Notice: Subject to any disclaimer, the term of this patent is extended or adjusted under 35 U.S.C. 154(b) by 67 days.

(21) Appl. No.: 10/909,975

(22) Filed: Aug. 2, 2004

(65) Prior Publication Data
US 2005/0168672 A1 Aug. 4, 2005

(30) Foreign Application Priority Data
Feb. 2, 2004 (JP) .............................. 2004-025182

(51) Int. Cl.
G02F 1/1335 (2006.01)

(52) U.S. Cl. ........................ 349/114; 349/38; 349/39; 349/113; 349/129

(58) Field of Classification Search ................ 349/129, 349/114, 113, 38, 39
See application file for complete search history.

(56) References Cited

U.S. PATENT DOCUMENTS
2002/0175335 A1 11/2002 Lim
(Continued)

FOREIGN PATENT DOCUMENTS
JP 10-268289 10/1998
(Continued)

Primary Examiner—David Nelms
Assistant Examiner—(Nancy) Thanh-Nhan Phan Nguyen
(74) Attorney, Agent, or Firm—Greer, Burns & Crain, Ltd.

(57) ABSTRACT

The liquid crystal display comprises a first substrate 2 including a gate bus line 12a, a data bus line 28, a thin film transistor 18 formed near an intersection between the gate bus line 12a and the data bus line 28, and a pixel electrode 52 including a transmission electrode 32a electrically connected to the thin film transistor 18 and a reflection electrode 48b electrically connected to the transmission electrode 32a; a second substrate 4 opposed to the first substrate 2 and including an opposed electrode 68 opposed to the pixel electrode 52; and a liquid crystal layer 6 sealed between the first substrate 2 and the second substrate 4. The reflection electrode 48b is formed over another gate bus line 12b which is different from the gate bus line 12a, with an insulation layer 40 formed therebetween. The decrease of a voltage applied between the reflection electrode 48b and the opposed electrode 68 can be prevented while the space which can be not used as the transmission region can be utilized. Thus, the area decrease of the transmission part is prevented while the area of the reflection part can be increased, whereby a reflective transmission type liquid crystal display of higher display quality can be provided.

26 Claims, 55 Drawing Sheets

U.S. PATENT DOCUMENTS

| | | | |
|---|---|---|---|
| 2003/0071952 A1* | 4/2003 | Yoshida et al. | 349/141 |
| 2004/0036827 A1* | 2/2004 | Tsuda et al. | 349/114 |
| 2004/0183970 A1* | 9/2004 | Niiya | 349/114 |
| 2004/0201803 A1* | 10/2004 | Yang et al. | 349/114 |
| 2004/0233360 A1* | 11/2004 | Yoshida et al. | 349/114 |
| 2005/0036088 A1* | 2/2005 | Okumura | 349/114 |

FOREIGN PATENT DOCUMENTS

| | | |
|---|---|---|
| JP | 11-101992 | 4/1999 |
| JP | 11-316382 | 11/1999 |
| JP | 2000-111902 | 4/2000 |
| JP | 2000-267081 | 9/2000 |
| JP | 2000-298271 | 10/2000 |
| JP | 2001-166289 | 6/2001 |
| JP | 2001-343660 | 12/2001 |
| JP | 2002072220 | 3/2002 |
| JP | 2002-221716 | 9/2002 |
| JP | 2002-296585 | 10/2002 |
| KR | 199-79772 | 11/1999 |
| KR | 2002-89005 | 11/2002 |

* cited by examiner

R G B

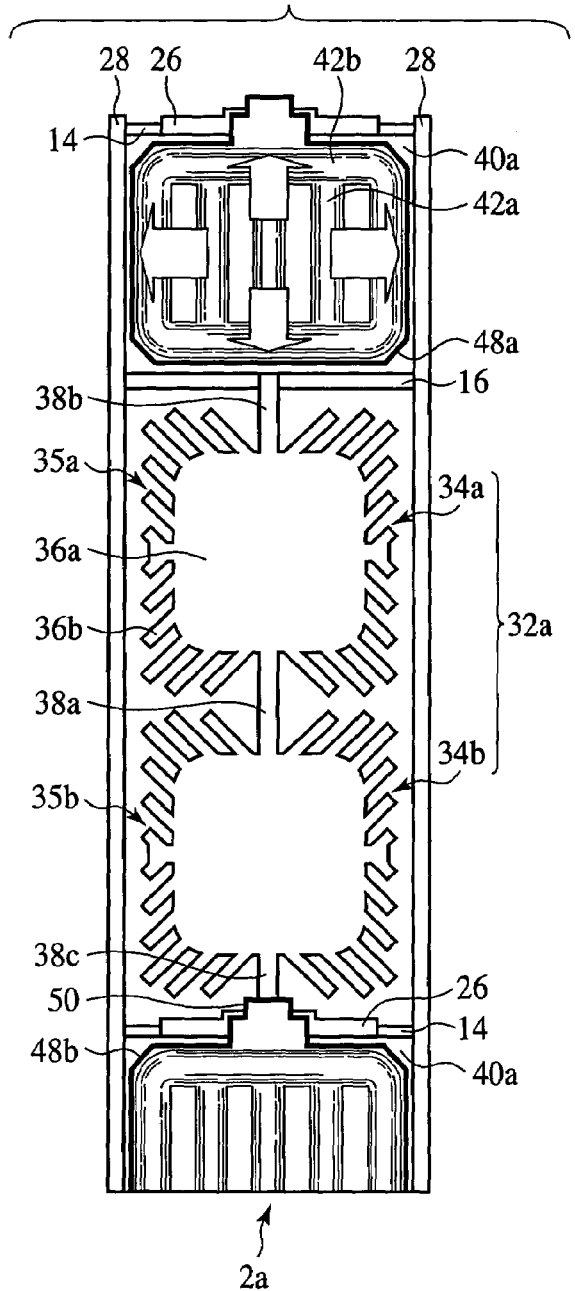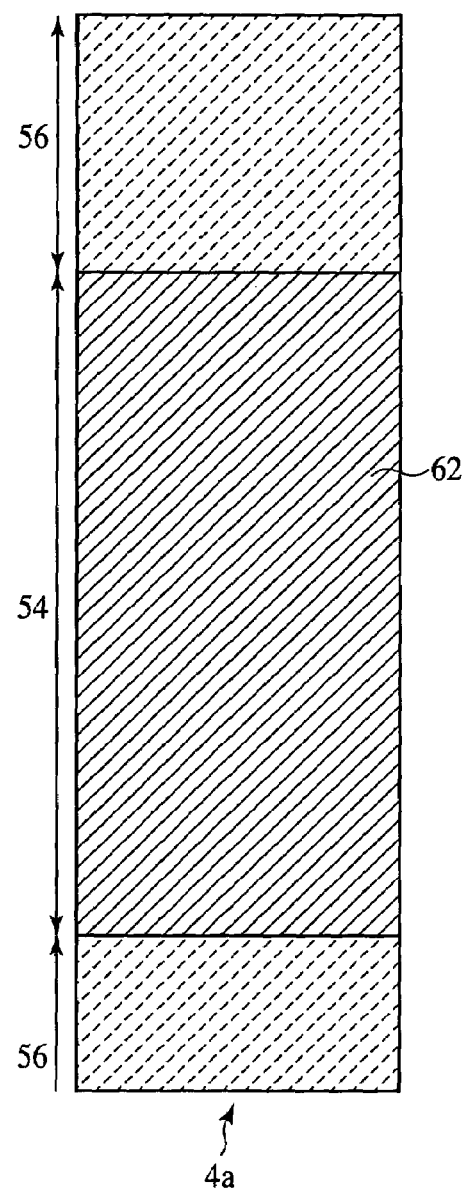

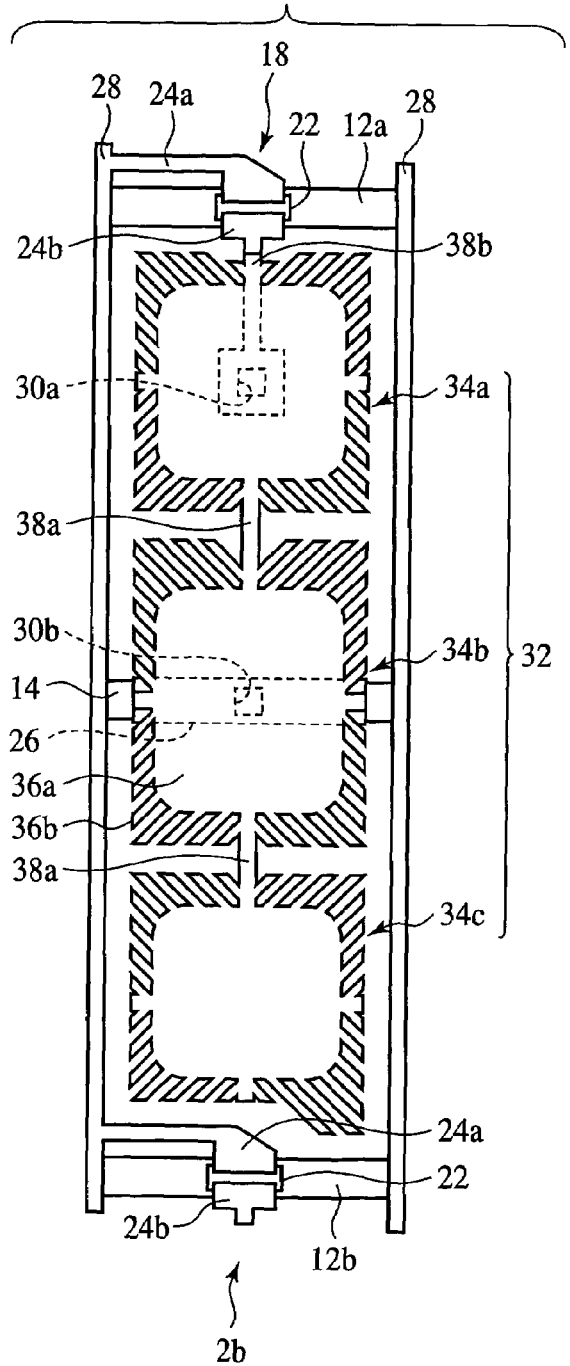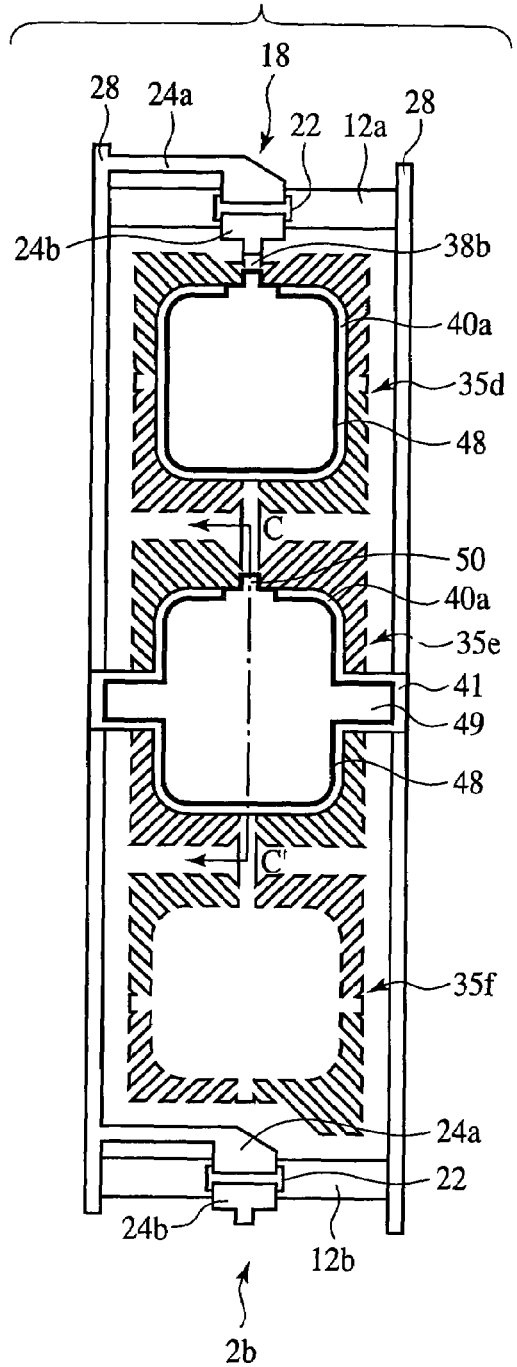

FIG. 18A
FIG. 18B
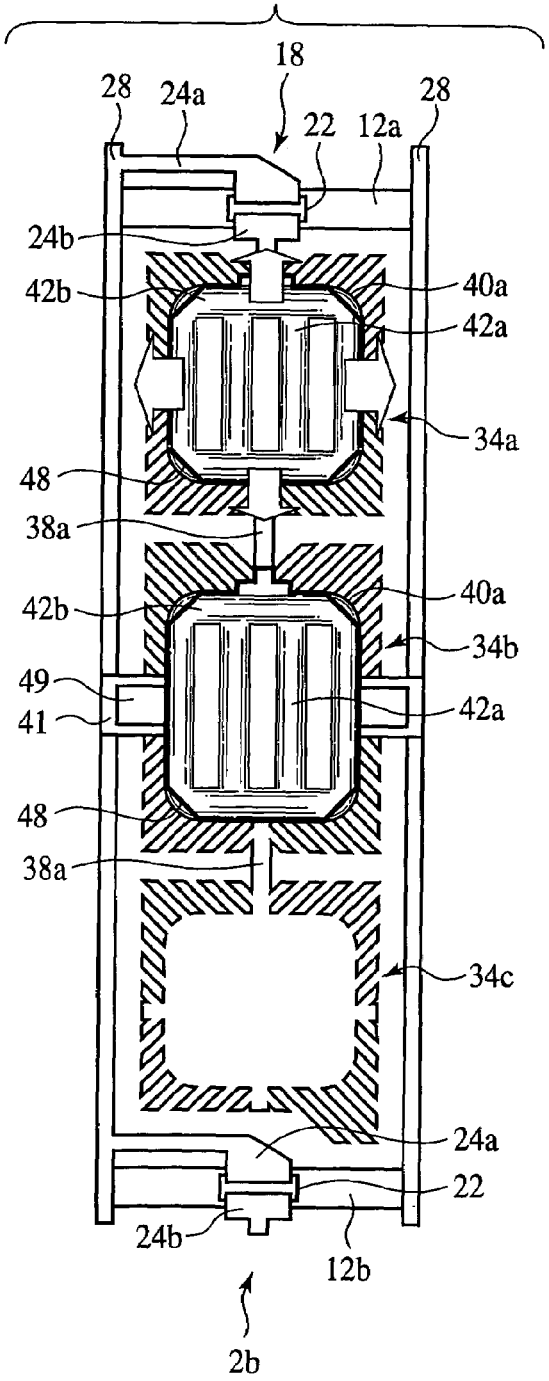
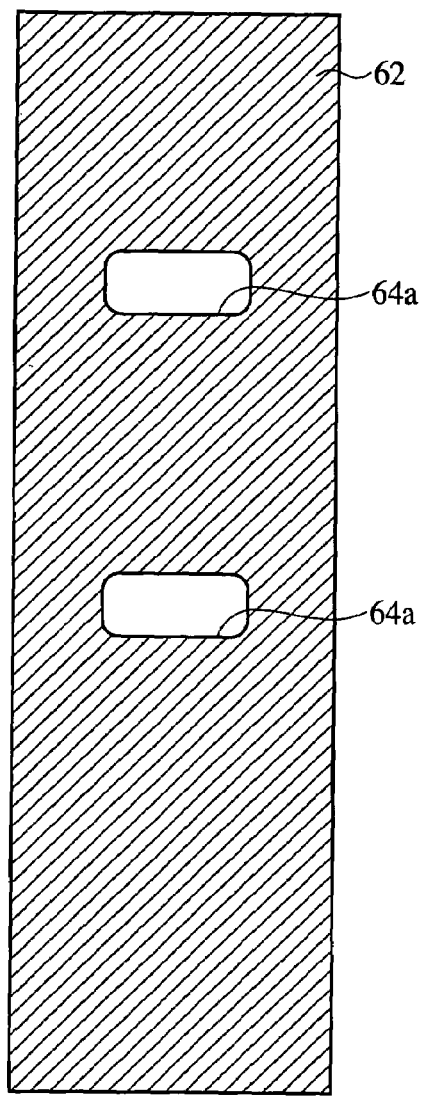

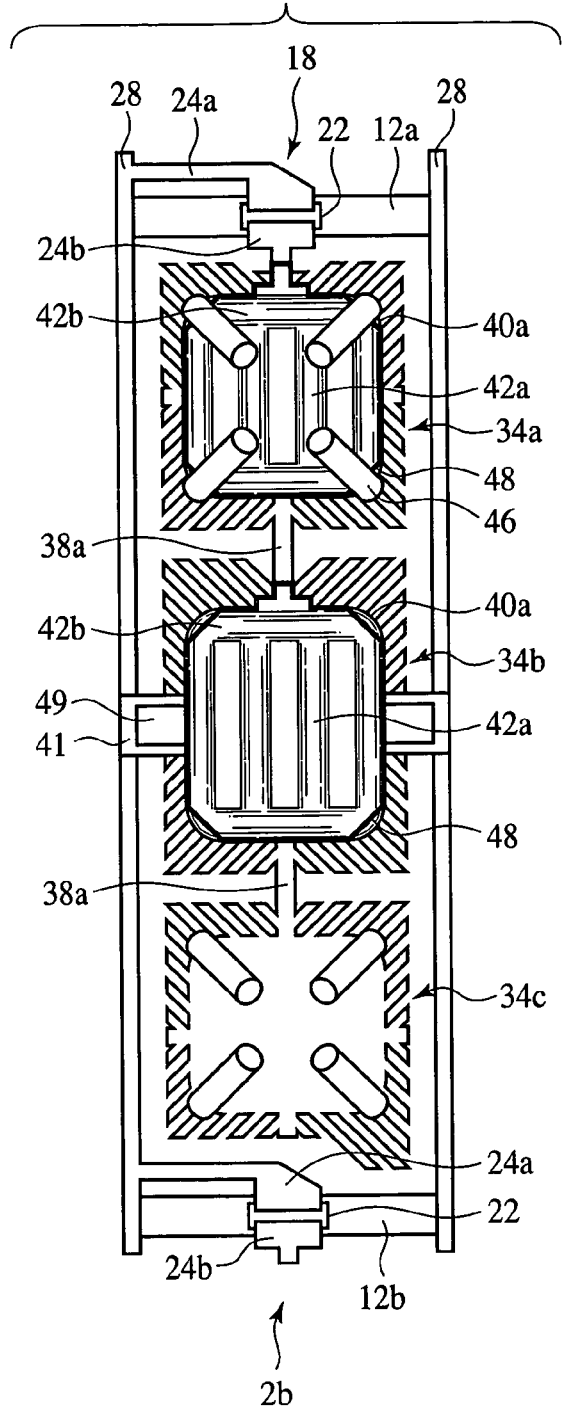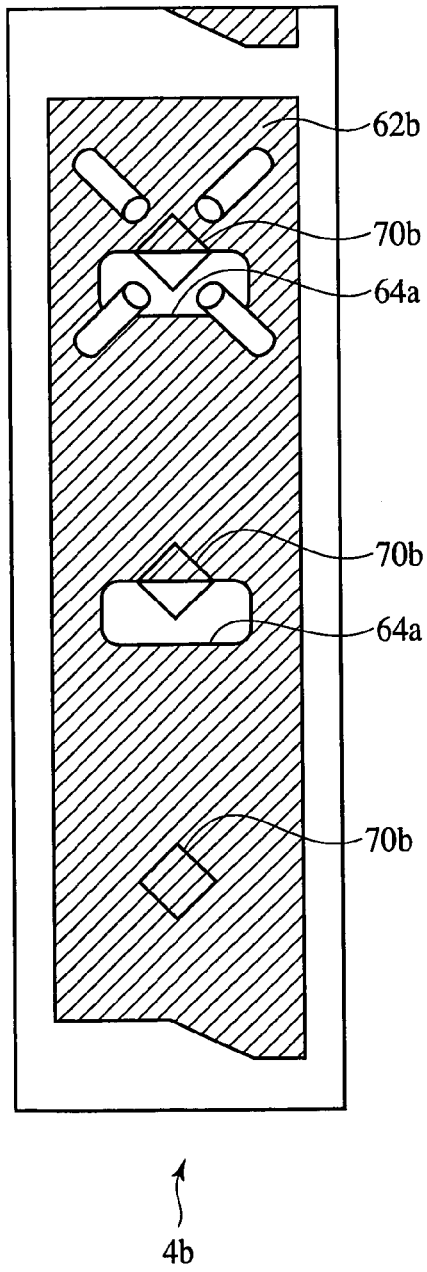

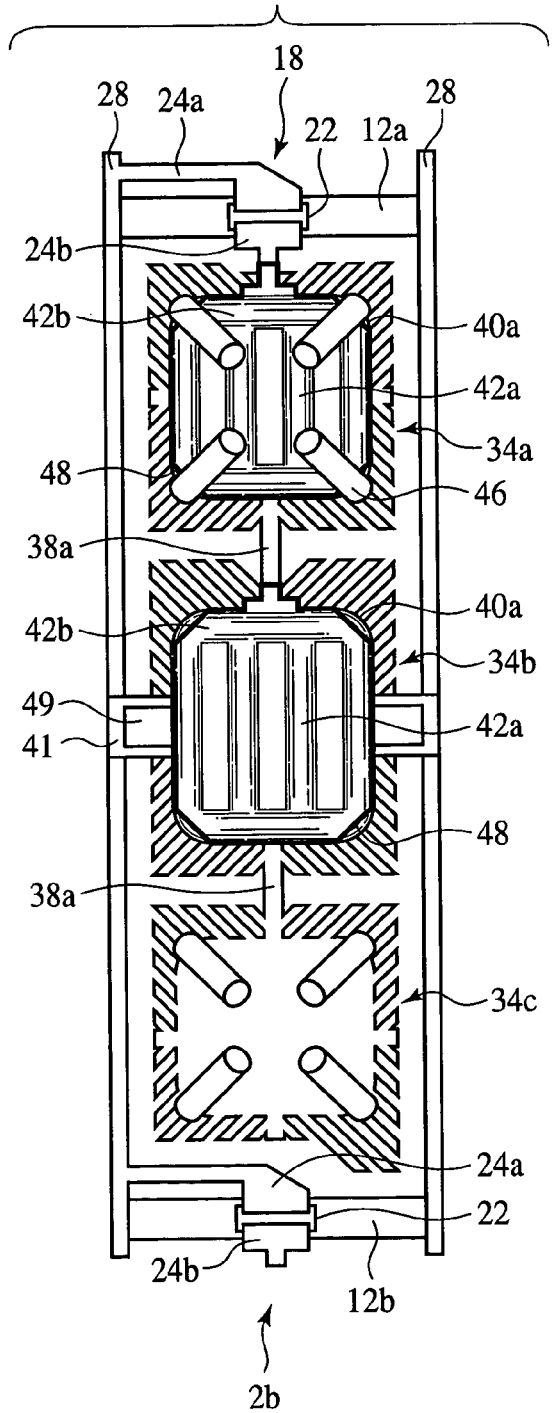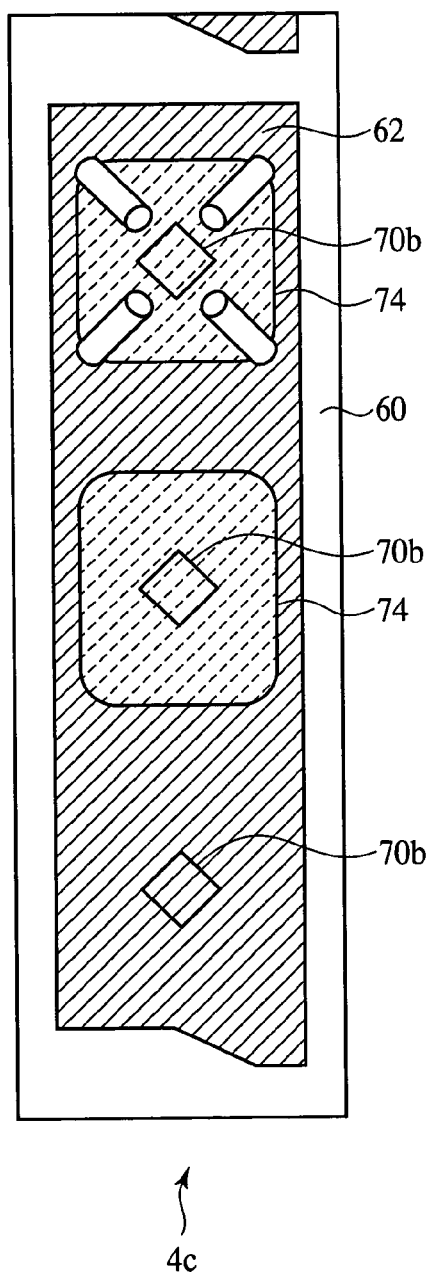

2c

4e

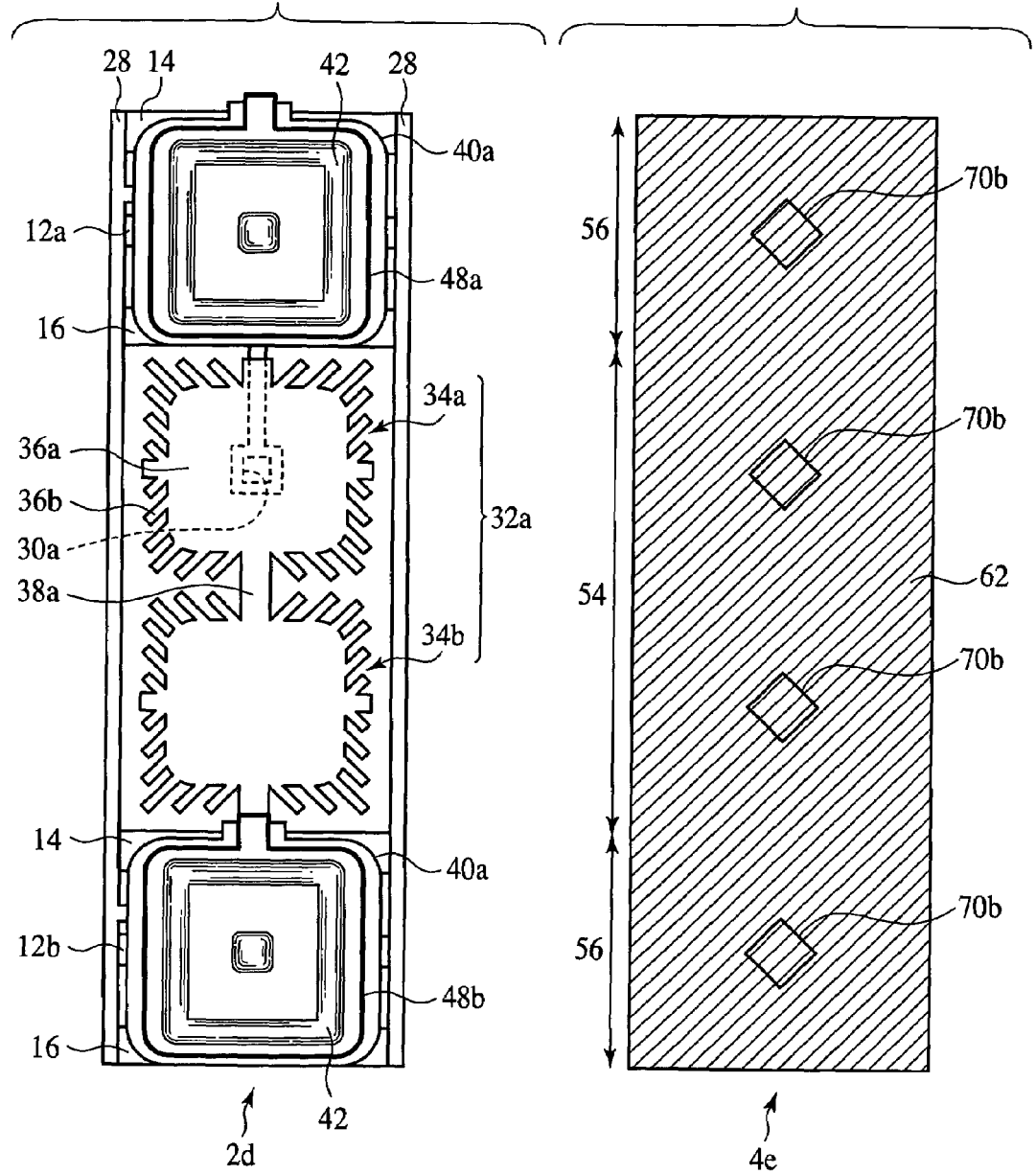

LIQUID CRYSTAL DISPLAY HAVING REFLECTION ELECTRODES

CROSS-REFERENCE TO RELATED APPLICATION

This application is based upon and claims priority of Japanese Patent Application No. 2004-25182, filed on Feb. 2, 2004, the contents being incorporated herein by reference.

BACKGROUND OF THE INVENTION

The present invention relates to a liquid crystal display and a method for fabricating the liquid crystal display, more specifically a liquid crystal display including reflection electrodes and a method for fabricating the liquid crystal display.

Reflective type liquid crystal displays are noted because they require no back light, which makes the electric power consumption low, and allows the displays to be thin and light.

However, the reflective type liquid crystal displays cannot have good visibility in dark surroundings.

As liquid crystal displays which can have good visibility even in dark surroundings, transmission type liquid crystal displays including back lights are proposed. The transmission type liquid crystal displays, which include back light, can have good visibility even in dark surroundings.

However, the transmission type liquid crystal displays, which have high current consumption, cannot satisfy the requirement of low electric power consumption.

Then, reflective transmission type liquid crystal displays which can work as reflective type liquid crystal displays in bright surroundings and in dark surroundings can work as transmission type liquid crystal displays are proposed.

Following references disclose the background art of the present invention.

[Patent Reference 1]
Specification of Japanese Patent Application Unexamined Publication No. Hei 11-101992
[Patent Reference 2]
Specification of Japanese Patent Application Unexamined Publication No. Hei 11-316382
[Patent Reference 3]
Specification of Japanese Patent Application Unexamined Publication No. 2001-343660
[Patent Reference 4]
Specification of Japanese Patent Application Unexamined Publication No. 2000-111902
[Patent Reference 5]
Specification of Japanese Patent Application Unexamined Publication No. 2000-298271
[Patent Reference 6]
Specification of Japanese Patent Application Unexamined Publication No. Hei 10-268289
[Patent Reference 7]
Specification of Japanese Patent Application Unexamined Publication No. 2000-267081
[Patent Reference 8]
Specification of Japanese Patent Application Unexamined Publication No. 2001-166289
[Patent Reference 9]
Specification of Japanese Patent Application Unexamined Publication No. 2002-296585
[Patent Reference 10]
Specification of Japanese Patent Application Unexamined Publication No. 2002-221716

SUMMARY OF THE INVENTION

An object of the present invention is to provide a reflective transmission type liquid crystal display whose display quality is good in both the transmission display and the reflective display.

According to one aspect of the present invention, there is provided a liquid crystal display comprising: a first substrate including a gate bus line; a data bus line formed intersecting the gate bus line; a thin film transistor formed near an intersection between the gate bus line and the data bus line; and a pixel electrode including a transmission electrode electrically connected to the thin film transistor and a reflection electrode electrically connected to the transmission electrode; a second substrate opposed to the first substrate and including an opposed electrode opposed to the pixel electrode; and a liquid crystal layer sealed between the first substrate and the second substrate, the reflection electrode being formed over another gate bus line which is different from said gate bus line, with an insulation layer formed therebetween.

According to another aspect of the present invention, there is provided a liquid crystal display comprising: a first substrate including a gate bus line; a data bus line intersecting the gate bus line; a thin film transistor formed near an intersection between the gate bus line and the data bus line; and a pixel electrode including a transmission electrode electrically connected to the thin film transistor and a reflection electrode electrically connected to the transmission electrode; a second substrate opposed to the first substrate and including an opposed electrode opposed to the pixel electrode; and a liquid crystal layer sealed between the first substrate and the second substrate, the transmission electrode including a plurality of electrode units interconnected to each other by an interconnection pattern, and the reflection electrode being formed over the electrode unit with an insulation layer with convexities formed in the surface of the insulation layer, which is formed therebetween.

According to further another aspect of the present invention, there is provided a liquid crystal display comprising: a first substrate including an insulation layer formed on a transparent substrate; a reflection electrode formed over the insulation layer; a color filter layer formed over the reflection electrode and the transparent substrate; and a transmission electrode formed over the color filter layer in a region adjacent to the reflection electrode and electrically connected to the reflection electrode; a second substrate opposed to the first substrate and including an opposed electrode opposed to the pixel electrode; and a liquid crystal layer sealed between the first substrate and the second substrate, a thickness of the color filter layer present over the reflection electrode being smaller than a thickness of the color filter layer present below the transmission electrode.

According to further another aspect of the present invention, there is provided a liquid crystal display comprising: a first substrate including a gate bus line; a data bus line intersecting the gate bus line; a thin film transistor formed near an intersection between the gate bus line and the data bus line; a pixel electrode including a transmission electrode electrically connected to the thin film transistor and a reflection electrode electrically connected to the transmission electrode with convexities formed in a surface of the reflection electrode; a second substrate opposed to the first substrate and including an opposed electrode opposed to the pixel electrode; and a liquid crystal layer sealed between the first substrate and the second substrate, the reflection electrode including a first region with the color filter layer formed over and a second region without the color filter layer formed over, the reflection electrode having a directivity of the reflection intensity in azimuth direction or polar angle direction, and the second region being arranged so that the directivity of the reflection intensity of light reflected by the reflection electrode in the first region and the directivity of the reflection intensity of light reflected by the reflection electrode in the second region are the same.

According to further another aspect of the present invention, there is provided a liquid crystal display comprising: a first substrate including a gate bus line; a data bus line intersecting the gate bus line; a thin film transistor formed near an intersection between the gate bus line and the data bus line; a pixel electrode including a transmission electrode electrically connected to the thin film transistor and a reflection electrode electrically connected to the transmission electrode with convexities formed in a surface of the transmission electrode; a second substrate opposed to the first substrate and including an opposed electrode opposed to the pixel electrode; and a liquid crystal layer sealed between the first substrate and the second substrate, the reflection electrode including a first region with the color filter layer formed over and a second region without the color filter layer formed over, the reflection electrode having a directivity of the reflection intensity in azimuth direction or polar angle direction, the directivity of the reflection intensity of light reflected by the reflection electrode in the first region and the directivity of the reflection intensity of light reflected by the reflection electrode in the second region being different from each other, and the second region being arranged so that the reflection intensity of light reflected by the reflection electrode in the first region is higher than the reflection intensity of light reflected by the reflection electrode in the second region.

According to further another aspect of the present invention, there is provided a liquid crystal display comprising: a first substrate including gate bus lines; data bus lines intersecting the gate bus lines; thin film transistors respectively formed near an intersections between the gate bus lines and the data bus lines; and reflection electrodes respectively electrically connected to the thin film transistors; a second substrate opposed to the first substrate and including an opposed electrode opposed to the reflection electrodes; and a liquid crystal layer sealed between the first substrate and the second substrate, the reflection electrodes being arranged on a strip-shaped resin layer, and wrinkles being formed in a surface of the strip-shaped resin layer, the streaks of the wrinkles being perpendicular to the longitudinal direction of the strip-shaped resin layer.

According to further another aspect of the present invention, there is provided a liquid crystal display comprising: a first substrate including a gate bus line; a data bus line intersecting the gate bus line; a thin film transistor formed near an intersection between the gate bus lie and the data bus line; and a reflection electrode electrically connected to the thin film transistor; a second substrate opposed to the first substrate and including an opposed electrode opposed to the reflection electrode; and a liquid crystal layer sealed between the first substrate and the second substrate, the reflection electrode being formed on the resin layer with wrinkles in a surface of the resin layer, streaks of the wrinkles being formed concentrically.

According to further another aspect of the present invention, there is provided a method for fabricating a liquid crystal display comprising a first substrate including gate bus lines, data bus lines intersecting the gate bus lines, thin film transistors respectively formed near an intersections between the gate bus lines and the data bus lines, and reflection electrodes respectively electrically connected to the thin film transistors; a second substrate opposed to the first substrate and including an opposed electrode opposed to the reflection electrodes; and a liquid crystal layer sealed between the first substrate and the second substrate, a step of forming the first substrate comprising the steps of forming a strip-shaped resin layer over a transparent substrate; solidifying selectively the surfaces of the strip-shaped resin layer; performing thermal processing on the strip-shaped resin layer to form wrinkles in the surface of the strip-shaped resin layer, the streaks of the wrinkles being perpendicular to the longitudinal direction of the strip-shaped resin layer; and forming a plurality of reflection electrodes over the strip-shaped resin layer.

According to further another aspect of the present invention, there is provided a method for fabricating a liquid crystal display comprising a gate bus line, a data bus line intersecting the gate bus line, a thin film transistor formed near an intersection between the gate bus lien and the data bus line, and a reflection electrode electrically connected to the thin film transistor; a second substrate opposed to the first substrate and including an opposed electrode opposed to the reflection electrode; and a liquid crystal layer sealed between the first substrate and the second substrate, a step of forming the first substrate comprising the steps of forming an island-shaped resin layer over a transparent substrate; solidifying selectively the surface of the island-shaped resin layer, performing thermal processing on the island-shaped resin layer to form wrinkles concentrically in the surface of the resin layer; and forming the reflection electrode over the island-shaped resin layer.

In the present invention, the pixel electrode is electrically connected to the thin film transistor formed near the intersection between the gate bus line and the data bus line, and the reflection electrode of the pixel electrode is formed on another gate bus line with the insulation layer formed therebetween. The gate bus lines are sequentially scanned, and a signal voltage is never applied simultaneously to the two gate bus lines. Accordingly, when a signal voltage is applied to the gate bus line, the thin film transistor is turned on, and the voltage is applied to the reflection voltage, the other gate bus line is open. Accordingly, no large capacitance is formed between the reflection electrode and the other gate bus line. Thus, according to the present invention, the decrease of a voltage applied between the reflection electrode and the opposed electrode can be prevented while the space which can not be used as the transmission region can be utilized. Thus, according to the present invention, the area decrease of the transmission part is prevented while the area of the reflection part can be increased, whereby the present invention can provide a reflective transmission type liquid crystal display of higher display quality.

According to the present invention, the storage capacitance bus line, the thin film transistor, etc. are disposed below the reflection electrode with the insulation layer formed therebetween, which permits the region which does not transmit light to be more utilized. Thus, according to the present invention, the decrease of the area of the transmission part is prevented while the area of the reflection part can further increased, whereby the present invention can provide a reflective transmission type liquid crystal display of higher display quality.

According to the present invention, the edge of the insulation layer is positioned on the storage capacitance bus line, etc., whereby the region near the edge of the insulation layer, where disalignments of the liquid crystal molecules tend to take place can be shaded by the storage capacitance bus line, etc. Thus, according to the present invention, roughness and contrast decrease can be prevented.

According to the present invention, the reflection electrode and the transmission electrode are connected to each other in the region near the edge of the insulation layer without forming a contact hole in the insulation layer, whereby the reflection efficiency decrease and the display quality deterioration can be prevented.

According to the present invention, the interconnection pattern is formed near the center line of the electrode units, whereby the electrode unit and the other electrode unit can be electrically connected to each other without affecting the four directional alignment. According to the present invention, the interconnection pattern is formed near the center line of the electrode units, and accordingly, the electrode unit and the drain electrode can be electrically connected to each other without failure without affecting the four direction alignment. According to the present invention, the interconnection pattern is formed near the center line of the electrode units, and accordingly the electrode unit and the reflection electrode can be electrically connected to each other without failure without affecting the four directional alignment. Thus, the present invention can ensure high display quality and can prevent the occurrence of display defects.

In the present invention, the convexities are formed in the surface of the insulation layer, the direction of the streaks of the convexities being substantially perpendicular to the longitudinal direction of the gate bus line, and the same convexities are formed in the surface of the reflection electrode, reflecting the convexities formed in the surface of the insulation layer. The convexities formed in the surface of the reflection electrode 48 are extended substantially in the same direction, and accordingly the declination direction of the declined planes of most convexities are accordingly the same. Thus, according to the present invention, the reflectivity of light incident in a specific direction, e.g., from the left and right can be improved. When the screen is watched under conditions for providing high reflectivity, even the reflection display can be bright. The brightness of the transmission display is retained sufficient while the brightness of the reflection display can be improved.

In the present invention, the alignment control structure formed on the second substrate is in contact with the reflection electrode formed on the insulation layer on the first substrate, and the thickness of the liquid crystal layer is retained mainly by the height of the alignment control structure and the thickness of the insulation layer on the first substrate. According to the present invention, the thickness of the liquid crystal layer is retained by the alignment control structure on the second substrate and the insulation layer on the first substrate, which makes it unnecessary to provide extra means for retaining the thickness of the liquid crystal layer. Thus, the present invention can provide a liquid crystal display of a simple structure.

In the present invention, the alignment control structure is formed not only on the second substrate but also on the first substrate, whereby the alignment direction of the liquid crystal molecules can be stabilized. Thus, the present invention can provide a liquid crystal display of higher display quality.

In the present invention, the region where the reflection is not formed is present at the edge of the insulation layer, whereby slant electric fields caused by the reflection electrode can be made small near the edge of the insulation layer. Thus, according to the present invention, disalignment of the liquid crystal molecules at the edge of the insulation layer can be suppressed, and higher display quality can be realized.

In the present invention, the insulation layer is formed in an island-shape for the reflection part of each pixel, and the first convexities and the second convexities are formed in the surface of the insulation layer. The directions of the streak of the first convexities are substantially perpendicular to the longitudinal direction of the gate bus line, and the direction of the streak of the second convexities are substantially parallel to the longitudinal direction of the gate bus line. The same convexities are formed in the surface of the reflection electrode, reflecting the convexities formed in the surface of the insulation layer. Most of the first convexities formed in the surface of the reflection electrode are aligned in the same direction, and accordingly the declination direction of the declined planes of the first convexities are the same. Most of the second convexities formed in the surface of the reflection electrode are aligned in the same direction, and accordingly the declination direction of the declined planes of the most of the second convexities are the same. Furthermore, the declination direction of the declined planes of the first convexities are substantially perpendicular to the declination direction of the declined planes of the second convexities. Thus, according to the present invention, not only light incident, e.g., from the left and right, but also the light incident, e.g., from above and below can exit to the front surface of the screen of the liquid crystal display at high intensities. Thus, the present invention can provide a liquid crystal display of higher display quality.

In the present invention, the reflection electrode is formed on the solid portion of the electrode unit with the insulation layer having the convexities formed in the surface with the insulation layer formed therebetween. According to the present invention, the reflection electrode is not formed on the gate bus line, whereby the formation of large capacitances between the reflection electrode and the gate bus line or between the reflection electrode and the data bus line is prevented. Thus, the present invention can provide a liquid crystal display of high display quality.

In the present invention, the reflection electrode is formed not only above the solid portion but also above the storage capacitance bus line, whereby the region which cannot function as the transmission region can be utilized as the reflection region. Thus, the present invention can improve the reflection efficiency.

In the present invention, the color filter layer is formed at the central part of the reflection part, and the color filter layer is not formed in the region of the reflection part other than the central part. The area ratio between the region where the color filter layer is formed in the reflection part and the region where the color filter is not formed in the reflection part is suitably set, whereby the color density of the reflection part can be adjusted. Thus, according to the present invention, extreme increase of the color density of the reflection part can be prevented in comparison with the color density of the transmission part. Accordingly, the color density of the transmission part and that of the reflection part can be made substantially equal to each other.

In the present invention, one and the same color filter layer used in the transmission part is used in the reflection part, which makes it unnecessary to form a planarization layer of a transparent resin on the second substrate. Accordingly, this contributes to the cost reduction.

In the present invention, the alignment control structure is formed below the color filter layer at the central part of the reflection electrode. According to the present invention, the voltage to be applied to the liquid crystal layer can be partially decreased by the alignment control structure, whereby the phase difference conditions for the liquid crystal layer can be adjusted.

In the present invention, the color filter layer is formed on the reflection electrode and below the transmission electrode, and the thickness of the color filter layer on the reflection electrode is smaller than the thickness of the color filter layer below the transmission electrode, whereby extreme increase of the color density in the reflection part in comparison with the color density in the transmission part can be prevented.

In the present invention, the color filter layer is formed on the reflection electrode, whereby the voltage to be applied to the liquid crystal layer of the reflection part can be decreased by the color filter layer present on the reflection electrode. Thus, according to the present invention, the thickness of the color filter layer present on the reflection electrode is suitably set, whereby phase difference conditions can be matched between the reflection part and the transmission part.

In the present invention, the surface of the first substrate is planarized with the color filter layer, which allows the thickness of the liquid crystal layer to be retained simply by arranging a universal spacer between the first and the second substrates. That is, in the present invention, the thickness of the liquid crystal is retained with a simple means.

In the present invention, convexities are formed concentric in the reflection electrode, and the non-colored region is arranged so that the presence ratio between the longitudinal wrinkles and the transversal wrinkles in the non-colored region of the reflection part and the presence ratio between the longitudinal wrinkles and the transversal wrinkles in the colored region of the reflection part are substantially equal to each other, whereby the exit direction of light reflected in the non-colored region and the exit direction of light reflected in the colored region can be made substantially the same. Thus according to the invention, extreme difference between the color density in the reflection part and the color density in the transmission region can be prevented while the color regeneration range can be made large.

In the present invention, the streaks of the convexities are formed in the surface of the reflection electrode in alignment with each other, and the colored region is arranged in the region where the ends of the streaks of the convexities are not contained, and the non-colored region is arranged, containing the ends of the streaks of the convexities. Accordingly, under condition for the bright display, a large color regeneration range can be obtained. On the other hand, under conditions for the dark display, the color regeneration range is small. However, under conditions for the dark display, the small color regeneration range is difficult to recognize, practically without special problems. Thus, the present invention can provide a liquid crystal display of good display quality.

According to the present invention, the area of the non-colored region is varied by colors of the color filter layer, whereby good white color display be realized.

In the present invention, the resin layer is formed in a strip along the gate bus line, and convexities are formed in the surface of the resin layer, the direction of the streaks of the convexities being substantially perpendicular to the longitudinal direction of the resin layer. In the present invention, the reflection electrode is formed on the insulation layer with such convexities formed in, and the same convexities are formed also in the surface of the reflection electrode, reflecting the convexities in the surface of the resin layer.

The declination direction of the declined planes of the convexities substantially agree the longitudinal direction of the gate bus line. Thus, according to the present invention, the reflectivity of light incident, e.g., from the left and right can be increased. That is, according to the present invention, the reflectivity of light incident, e.g., from the left and right of the screen or from above and below the screen can be increased. Thus, according to the present invention, the brightness of the reflection display can be increased.

In the present invention, the resin layer has a projected pattern projected from the region between the adjacent reflection electrodes. At the forward end of the projected pattern, the declination of the plane of the side wall of the resin layer is blunt to the substrate surface, and when the conduction film is dry etched to form the reflection electrode, the residue of the conduction film is not easily left at the forward end of the projected pattern. Thus, according to the present invention, the shorting of the adjacent reflection electrodes can be prevented without failure.

In the present invention, the light shielding film is formed below the resin layer, whereby the reflection of light by the exposure stage can be prevented, and disuniform sensitization of the resin film in the exposure can be prevented.

Accordingly, according to the present invention, the convexities can be uniformly formed in the surface of the resin layer, and a liquid crystal display of good display quality can be provided.

In the present invention, the resin layer is formed in an island-shape, and convexities are formed concentrically in the surface of the island-shaped resin layer. The reflection electrode is formed on the insulation layer with the convexities formed concentric in the surface, and the same concentric convexities are also formed in the surface of the reflection electrode. Accordingly, first convexities are formed in the surface of the reflection electrode, the directions of the streaks of the convexities being substantially perpendicular to the longitudinal direction of the gate bus line, and second convexities are formed in the surface of the reflection electrode, the directions of the streaks of the convexities being substantially parallel to the longitudinal direction of the gate bus line. The declination direction of the declined planes of the first convexities substantially parallel to the longitudinal direction of the gate bus line substantially agrees with the longitudinal direction of the gate bus line. The declination direction of the declined planes of the second convexities substantially parallel with the longitudinal direction of the gate bus line substantially agrees with the direction perpendicular to the longitudinal direction of the gate bus line. Thus, according to the present invention, light incident from the left and right of the screen of the liquid crystal display and light incident from above and below the screen of the liquid crystal display can exit to the front surface of the screen of the liquid crystal display at high light intensities.

BRIEF DESCRIPTION OF THE DRAWINGS

FIGS. 10A and 10B are plan views (Part 1) of the liquid crystal display according to a second embodiment of the present invention.

FIGS. 16A and 16B are plan views (Part 1) of the liquid crystal display according to a third embodiment of the present invention.

FIGS. 18A and 18B are plan views (Part 2) of the liquid crystal display according to the third embodiment of the present invention.

FIGS. 19A and 19B are plan views (Part 3) of the liquid crystal display according to the third embodiment of the present invention.

FIGS. 21A and 21B are plan views (Part 2) of the liquid crystal display according to the modification of the third embodiment of the present invention.

FIGS. 27A and 27B are plan views of the liquid crystal display according to the modification of the fifth embodiment of the present invention.

DETAILED DESCRIPTION OF THE INVENTION

In the proposed reflective transmission type liquid crystal displays, a required voltage cannot be applied between the reflection electrodes and the opposed electrodes, and the reflective display cannot have often good display quality.

In the proposed reflective transmission type liquid crystal displays, in ensuring sufficient brightness of the transmission display, the reflective display is dark. Here, it is an idea to improve the brightness of the reflection display by increasing the area of the reflection unit. However, this decreases the area of the transmission unit, which reduces the brightness of the transmission display.

In the proposed reflective transmission type liquid crystal displays, the color density of the reflective display becomes so high in comparison with the color density of the transmission display, and good quality of the display has not been often provided.

[A First Embodiment]

Figure 1:
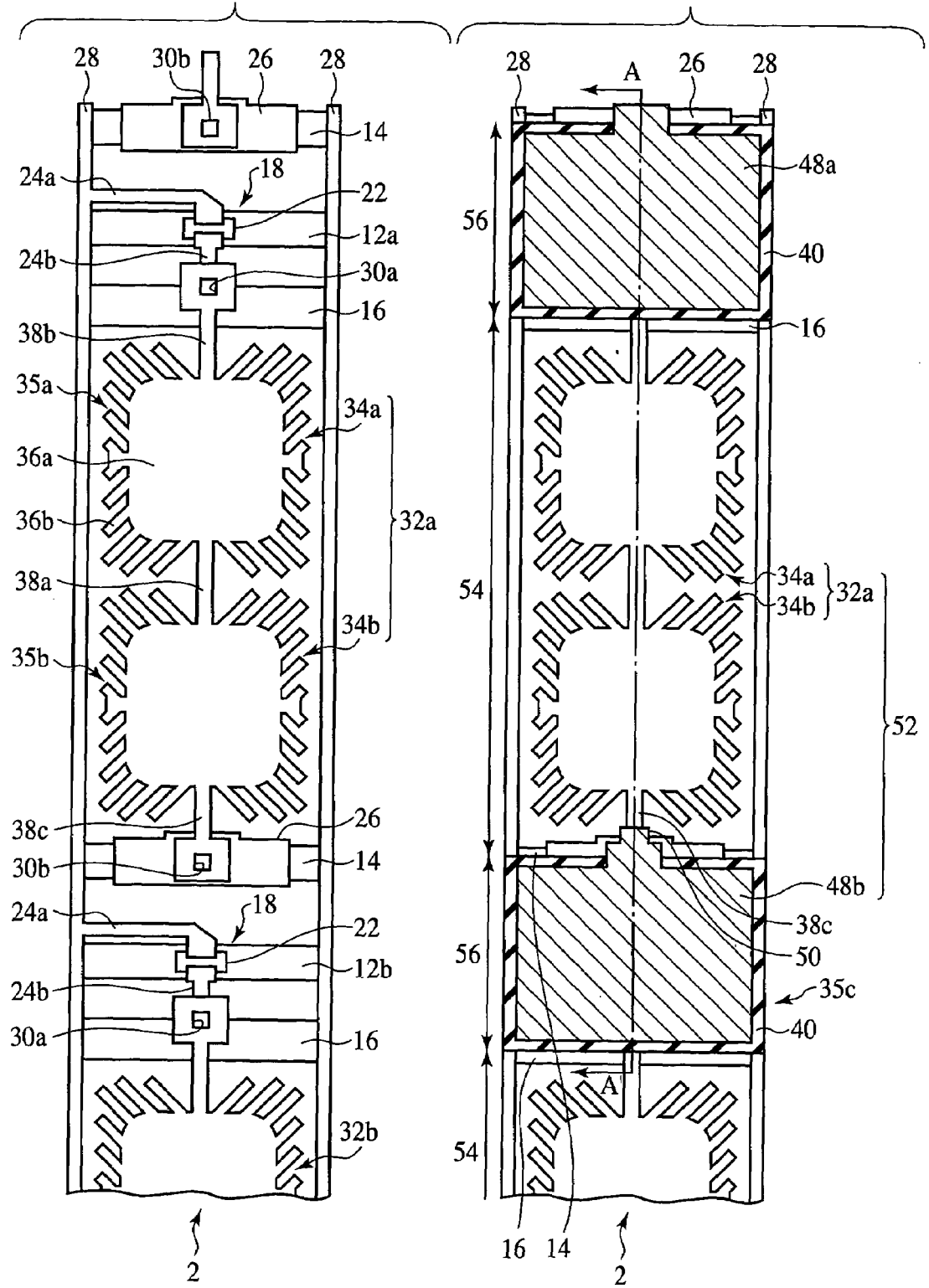
FIGS. 1A and 1B are plan views of the liquid crystal display according to a first embodiment of the present invention (Part 1).
Figure 2:
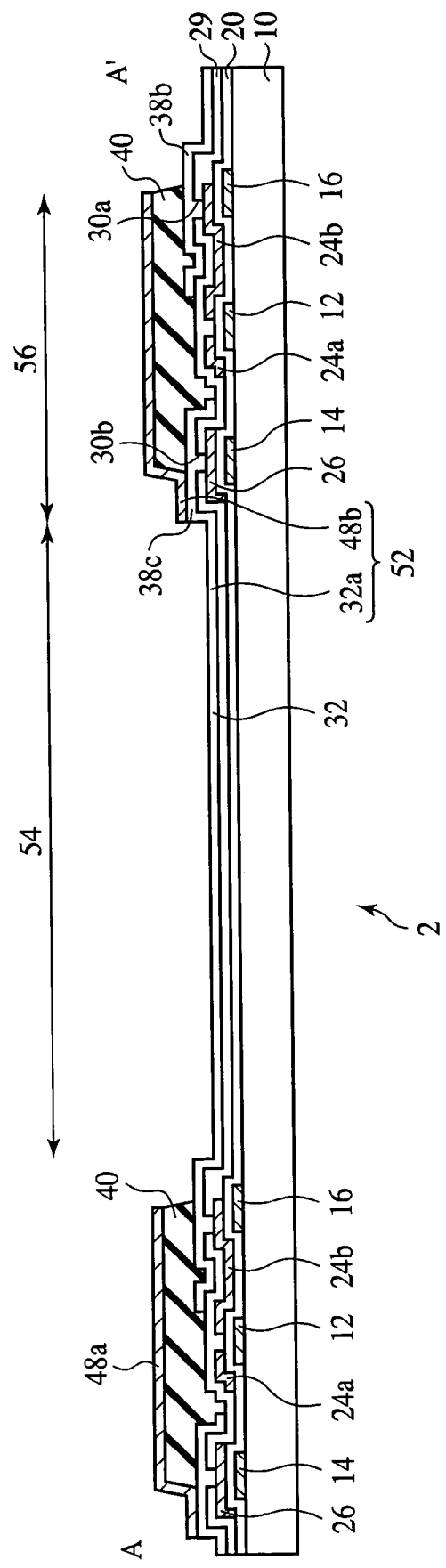
FIG. 2 is a sectional view of the liquid crystal display according to the first embodiment of the present invention (Part 1).
Figure 3A:
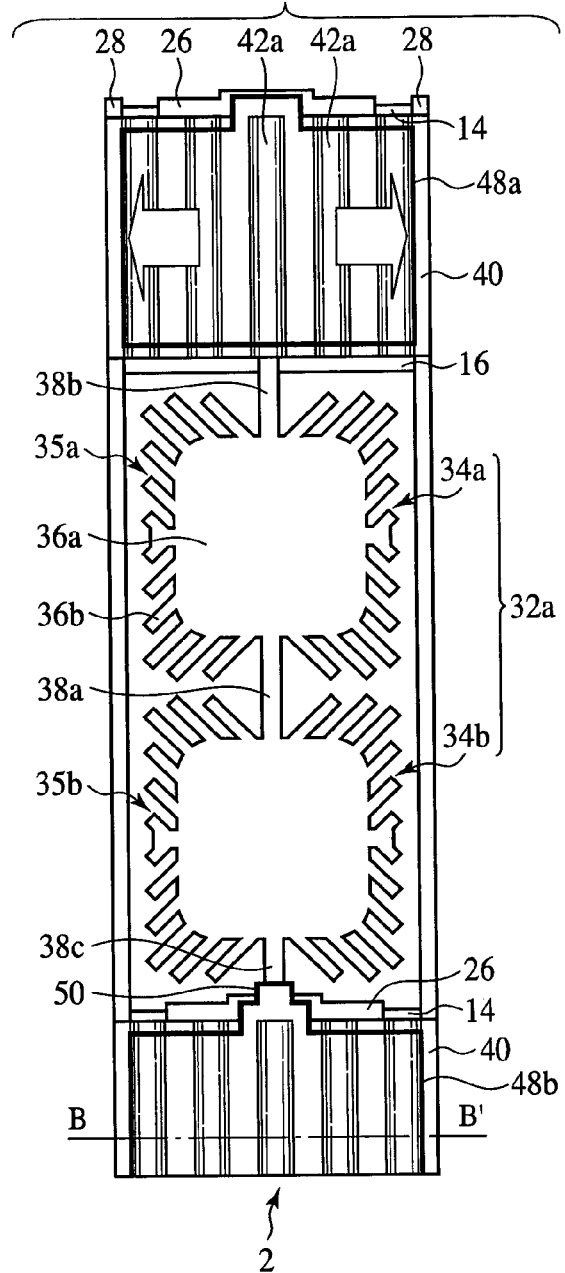
FIGS. 3A and 3B are plan views of the liquid crystal display according to the first embodiment of the present invention (Part 2).
Figure 3B:
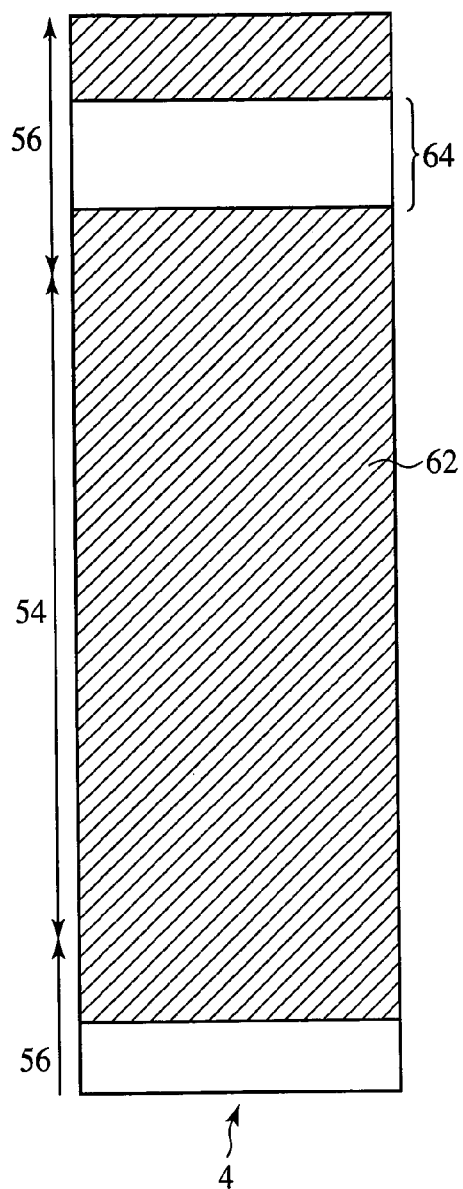
Figure 3C:
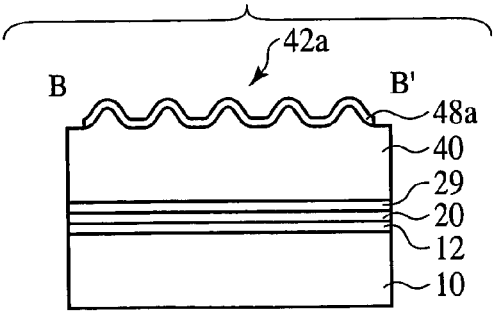
FIG. 3C is a sectional view of the liquid crystal display according to the first embodiment of the present invention (Part 2).
Figure 4A:
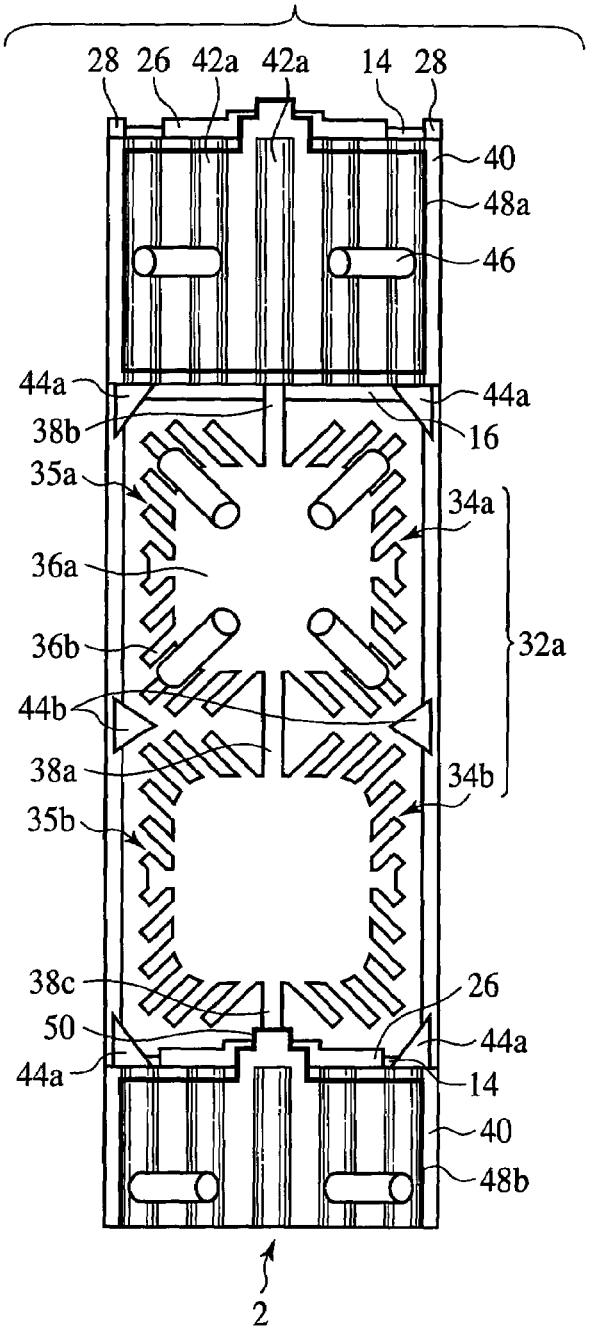
FIGS. 4A and 4B are plan views of the liquid crystal display according to the first embodiment of the present invention (Part 3).
Figure 4B:
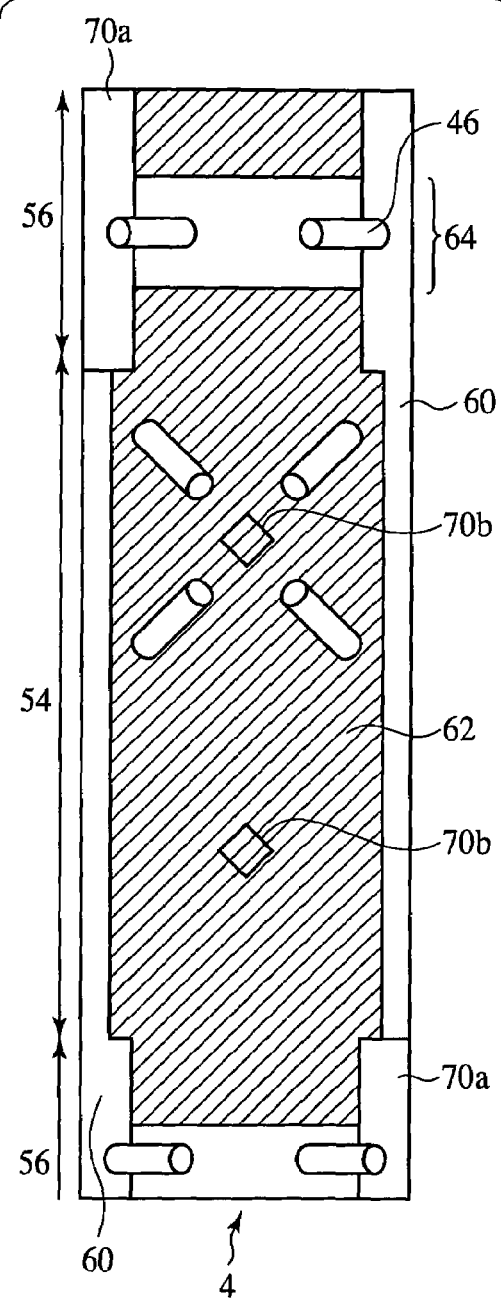
Figure 5:
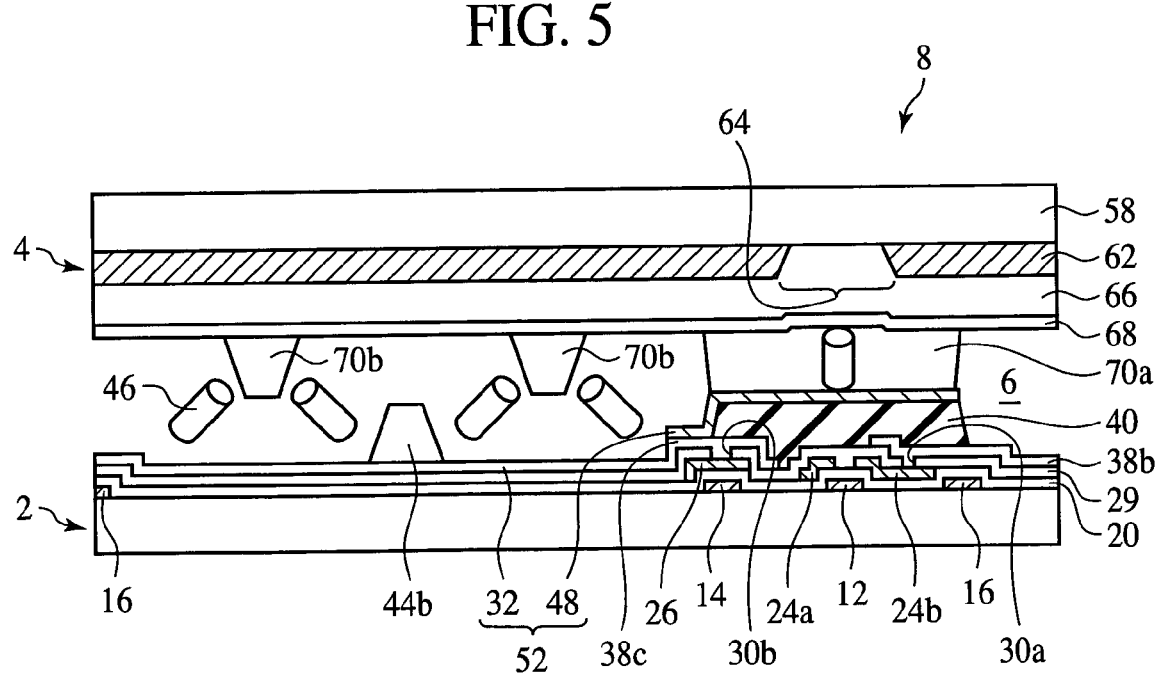
FIG. 5 is a sectional view of the liquid crystal display according to the first embodiment of the present invention (Part 3)

The liquid crystal display according to a first embodiment of the present invention will be explained with reference to FIGS. 1A to 9. FIGS. 1A and 1B are plan views of the liquid crystal display according to the present embodiment (Part 1). In FIG. 1A, the insulation layer and the reflection electrode are omitted. In FIG. 1B, the insulation film and the reflection electrode are shown. FIG. 2 is a sectional view of the liquid crystal display according to the present embodiment (Part 1). FIGS. 3A and 3B are plan views of the liquid crystal display according to the present embodiment (Part 2). FIG. 3A illustrates the TFT substrate. FIG. 3B is the CF substrate of the region corresponding to FIG. 3A. FIG. 3C is a sectional view of the liquid crystal display according to the present embodiment (Part 2). FIG. 3C is the sectional view along the line B–B' in FIG. 3A. FIGS. 4A and 4B are plan views of the liquid crystal display according to the present embodiment (Part 3). FIG. 4A illustrates the TFT substrate. FIG. 4B illustrate the CF substrate of the region corresponding to FIG. 4A. FIG. 5A is the sectional view of the liquid crystal display according to the present embodiment (Part 3).

The liquid crystal display according to the present embodiment includes a TFT substrate 2, a CF substrate 4 opposed to the TFT substrate 2, and a liquid crystal layer 6 sealed between the TFT substrate 2 and the CF substrate 4.

First, the TFT substrate 2 will be explained with reference to the drawings.

As shown in FIGS. 1A to 2, a plurality of gate bus lines 12a, 12b are formed on a glass substrate 10. The gate bus lines 12 are formed substantially in parallel with each other. On both sides of each of the gate bus lines 12, a Cs (storage capacitance) bus line 14 and a Cs dummy bus line 16 are formed. Each gate bus line 12 functions as the gate electrode of a TFT (Thin Film Transistor) 18. The Cs bus line 14 is formed substantially in parallel with the gate bus line 12. The Cs dummy bus line 16 is formed substantially in parallel with the gate bus line 12. The Cs bus line 14 forms a prescribed capacitance together with a pixel electrode 52 to thereby retain the pixel electrode 52 at a prescribed potential. The gate bus lines 12, the Cs bus line 14 and the Cs dummy bus lines 16 are formed of one and the same conduction film.

A gate insulation film 20 of, e.g., a silicon nitride film is formed on the glass substrate 10 with the gate bus line 12, the Cs bus line 14 and the dummy bus line 16 formed on.

A channel layer 22 of, e.g., amorphous silicon is formed on the gate insulation film 20. The channel layer 22 is illustrated in FIG. 1A but is omitted in FIG. 2.

On the channel layer 22 and the gate insulation film 20, a source electrode 24a and a drain electrode 24b are formed. Thus, the thin film transistor including the gate electrode 12, the channel layer 22, the source electrode 24a, the drain electrode 24b, etc. is formed.

A Cs opposed electrode (intermediate electrode) 26 is formed near the Cs bus line 14 with the gate insulation film 20 formed therebetween. The Cs opposed electrode 26 provides a large capacitance together with the Cs bus line 14. The Cs opposed electrode 26, the source electrode 24a and the drain electrode 24b are formed of one and the same conduction film.

On the gate insulation film 20, a plurality of data bus lines 28 are formed substantially perpendicular to the gate bus lines 12, etc. The plurality of data bus lines 28 are formed substantially in parallel with each other. The data bus lines 28, the source electrodes 24a the drain electrodes 24b and the Cs opposed electrodes 26 are formed of one and the same conduction film. The data bus lines 28 and the source electrodes 24a of the thin film transistor 18 are formed integral with each other.

A protection film 29 is formed on the glass substrate 10 with the data bus lines 28, the Cs opposed electrodes 26, etc. formed on.

Contact holes 30a and the contact holes 30b are formed in the protection film 29 respectively down to the drain electrodes 24b and the Cs opposed electrodes 26.

Transmission electrodes 32a, 32b of ITO film are formed on the protection film 29. Each transmission electrode 32 includes two electrode units 34a, 34b. In the present embodiment, each transmission electrode 32 has two electrode units 34a, 34b. However, the number of the electrode units 34 included in each transmission electrode 32 is not limited to two and can be one, three or more. Each electrode unit 34 comprises a solid portion 36a and a plurality of extensions 36b extended outward from the solid portion 36a. The extensions 36b toward the longitudinal direction of the data bus lines 28 are extended at 45 degrees or 135 degrees.

The electrode unit 34a and the electrode unit 34b are interconnected by an interconnection pattern. The interconnection pattern 38a for interconnecting the electrode unit 34a and the electrode unit 34b is formed near the center line of the electrode units 34. The electrode unit 34a, which is nearer to the drain electrode 24b has an interconnection pattern 38b for the electric interconnection with the drain electrode 24b. The electrode unit 34b, which is nearer to the reflection electrodes 48, has an interconnection pattern 38c for the electric interconnection with the reflection electrodes 48. The electrode units 34a, 34b and the interconnection patterns 38a–38c are formed of one and the same ITO film. The transmission electrode 32 is connected to the drain electrode 24 of the thin film transistor through the contact hole 30a and connected to the Cs opposed electrode 26 through the contact hole 30b.

An insulation layer 40 of, e.g., a positive-type resist is formed on the interconnection patterns 38b, 38c of the transmission electrode 32 and the protection film 29. The insulation layer 40 is formed in strip-shape in the region between the Cs bus line 14 and the Cs dummy bus line 16. The thickness of the insulation layer 40 is, e.g., about 2 μm. The insulation layer 40 in the region has one edge positioned on the Cs bus line 14 and the other edge positioned on the Cs dummy bus line 16. Streaks of convexities (wrinkles) 42a (see FIGS. 3A and 3C, and FIG. 4A) are formed side by side in the surface of the insulation layer 40. The streaks of the convexities 42a are omitted in FIG. 1B. Most of the directions of the streaks of the convexities 42a are arranged substantially perpendicular to the longitudinal direction of the strip-shaped insulation layer 40, i.e., substantially perpendicular to the longitudinal direction of the gate bus lines 12.

The streaks of the convexities 42a are formed in the surface of the insulation layer 40 in a uniform direction, so that the streaks of the convexities are formed in the surface of the reflection electrode 48 in the uniform direction, reflecting the convexities 42a in the surface of the insulation layer 40. The streaks of the convexities 42a are formed in the surface of the reflection electrode 48 in the uniform direction, so that light incident in a specific direction can exit to the front surface of the liquid crystal display at high light intensity.

The convexities 42a can be formed in the following way.

That is, first a positive-type resist film, for example, is formed. Then, resist film is pre-baked. Next, the resist film is patterned. The insulation layer 40 of the resist film is formed in a strip shape.

Next, the insulation layer 40 is thermally processed (post-baked). The thermal processing temperature is, e.g., about 130–170° C.

Next, ion implantation, irradiation of UV (ultraviolet) radiation, etc. are performed on the surface of the insulation layer 40 to solidify the surface of the insulation layer 40.

Next, thermal processing (hard cure) is performed on the insulation layer 40 at a temperature higher than that of the post-bake. The thermal processing temperature is, e.g., about 190–230° C. The surface of the insulation layer 40 has been already cured by the ion implantation, etc. while the inside of the insulation layer 40 is thermally much shrunk by the heat processing (hard cure) of the relatively high temperature.

Accordingly, the convexities (wrinkles) 42a are formed in the surface of the insulation layer 40. In the present embodiment, the thermal processing of the relatively high temperature applies a large stress to the insulation layer 40, which is formed in a strip shape, in the longitudinal direction of the insulation layer 40. Resultantly, the convexities 42a which are substantially perpendicular to the longitudinal direction of the insulation layer 40 are formed in wrinkles. Most of the directions of the streak of the convexities 42a are substantially perpendicular to the longitudinal direction of the gate bus line 12.

As shown in FIG. 4A, alignment control structures 44a, 44b are formed on the data bus line 28. The alignment control structures 44a, 44b are for controlling the alignment directions of the liquid crystal molecules 46 of the liquid crystal layer 6. The alignment control structures 44a, 44b are formed of the one and the same resist film as the insulation layer 40. The alignment control structures 44a, 44b have, e.g., a triangular shape or quadrangular shape (rhombic shape). In FIGS. 1A to 3C, the alignment control structures 44 are omitted.

The reflection electrodes 48a, 48b are formed on the insulation layer 40. The reflection electrode 48b is not electrically connected to the transmission electrode 32b driven by the gate bus line 12b, which is present below the reflection electrode 48b but is electrically connected to the transmission electrode 32a driven by the gate bus line 12a, which is different from the gate bus line 12b, which is present below the reflection electrode 48b.

The reflection electrodes 48 are formed on the insulation layer 40 with the convexities 42a formed on, and the convexities 42a are formed in the surface of the reflection electrode 48, reflecting the convexities 42a formed in the surface of the insulation layer 40. In the surface of the reflection electrode 48, the streaks of the convexities 42a are formed substantially perpendicular to the longitudinal direction of the gate bus line 12. The convexities 42a are aligned substantially in the same direction. The declination direction of the declined surfaces of the convexities 42a formed in the surface of the reflection electrode 48 are substantially in agreement with the longitudinal direction of the gate bus line 12. The declined surfaces of most of the convexities 42a are declined in the same direction, which makes it possible for light incident in a specific direction to exit to the front surface of the liquid crystal display at high light intensity. In the present embodiment, in which the declination direction of the declined surfaces of most convexities 42a are substantially in agreement with the longitudinal direction of the gate bus line, 12, when the longitudinal direction of the gate bus line 12 agrees with the horizontal direction of the liquid crystal display, light incident from the left and right of the liquid crystal display exits to the front surface of the liquid crystal display at high light intensity. In FIGs. 3A, the arrows indicate the direction in which light reflectivity is highest.

The regions where the reflection electrode 48 is not formed is present in edge portion of the insulation layer 40. An interconnection pattern 50 interconnected with the interconnection pattern 38c of the transmission electrode 32 is formed near the center line of the reflection electrode 48. The interconnection pattern 50 of the reflection electrode 48 is connected to the interconnection pattern 38c of the transmission electrode 32 near the edge of the insulation layer 40.

The transmission electrode 32 and the reflection electrode 48 form the pixel electrode 52. As described above, the transmission electrode 32 includes the two electrode units 34a, 34b, and the electrode units 34a, 34b respectively form sub-pixels 35a, 35b. The reflection electrode 48b forms a sub-pixel 35c. Thus, the pixel electrode 52 is constituted by three sub-pixels 35a–35c. The region where the transmission electrode 52 is formed is a region transmitting the light applied by the back light and is called a transmission part 54. The region where the reflection electrode 48 is formed is a region reflecting light incident from the outside and is called a reflection part 56.

Thus, the TFT substrate 2 is constituted.

Then, a CF substrate 4 will be explained with reference to FIGS. 3B, 4B and 5.

A black matrix layer 60 is formed below the glass substrate 58 (see FIG. 4B). The black matrix layer 60 is formed, positioned above the data bus lines 28. The black matrix layer 60 has the width which is relatively larger near the reflection part 56 and smaller near the transmission part 54. The black matrix layer 60 is not formed at the border between the reflection part 56 and the transmission part 54. For high aperture ratios, the black matrix layer 60 is not formed between the reflection part 56 and the transmission part 54.

A color filter layer 62 is formed below the glass substrate 58, where the black matrix layer 60 is formed. An opening 64 is formed in the color filter layer 62 in the reflection part 56. The opening 64 is formed in the color filter 62 in the reflection part 56 for the following reason. That is, in the reflection part 56, light incident from the outside passes through the color filter layer 62 to be reflected on the reflection electrode 48 and again passes through the color filter layer 62 to exit outside. In other words, in the reflection part 56, the light passes twice through the color filter layer 62. Accordingly, in the case that the color filter layer 62 is formed simply on the entire reflection part, light exiting the reflection part 56 is darker than light exiting the transmission part 54. In the present embodiment, where the opening 64 is formed in the color filter layer 62 in the reflection part 56, light incident from the outside is reflected, in the opening 64, on the reflection electrode 48 without passing through the color filter layer 62 and then, without passing through the color filter layer 62, exits outside. Accordingly, the light exiting through the opening 64 acts to decrease color density. Thus, the size of the opening 64 is suitably set, whereby the thickening of the color density of the transmission part 54 with respect to that of the reflection part 56 can be prevented.

A planarization layer 66 of a transparent resin is formed below the color filter layer 62.

An opposed electrode 68 of ITO film is formed below the planarization layer 66.

Alignment control structures 70a, 70b for controlling the alignment direction of the liquid crystal molecules 46 of the liquid crystal layer 6 are formed below the opposed electrode 68. The height of the alignment control structure 70 is, e.g., about 2 μm. The alignment control structure 70b positioned above the center of the electrode units 34 has, e.g., a quadrangular (rhombic) plane shape. The alignment control structure 70a positioned above the data bus line 28 in the reflection part 56 has, e.g., a quadrangular (rectangular) plane shape. None of the alignment control structures are formed above the center of the reflection electrode 48 so that the aperture ratio of the reflection part 56 can be high.

Thus, the CF substrate 4 is constituted.

As shown in FIG. 5, the TFT substrate 2 and the CF substrate 4 are arranged with the pixel electrode 52 and the opposed electrode 68 opposed to each other. The liquid crystal layer 6 is sealed between the TFT substrate 2 and the CF substrate 4. The liquid crystal layer 6 is formed of a liquid crystal having negative dielectric anisotropy.

The reflection electrodes 48 on the insulation layer 40 of the TFT substrate 2, and the alignment control structures 70a of the CF substrate 4 are in contact with each other to thereby retain the thickness of the liquid crystal layer 6. The thickness of the liquid crystal layer 6 is retained mainly by the insulation layer 40 and the alignment control structure 70a. As described above, the thickness of the insulation layer 40 is about 2 μm, and the height of the alignment control structure 70a is about 2 μm. Accordingly, the thickness of the liquid crystal layer 6 in the reflection parts 56 is about 2 μm. The thickness of the liquid crystal layer 6 in the transmission parts 54 is about 4 μm.

Thus, a liquid crystal panel 8 including the TFT substrate 2, the CF substrate 4 and the liquid crystal layer 6 is constituted.

Circular polarization plates (not shown) are bonded to both surfaces of the liquid crystal panel 8. The circular polarization plates are adhered to the liquid crystal panel 8 with a light diffusing adhesive. The light diffusing adhesive forms a light diffusion layer. The light diffusion layer is for suitably diffusing light for good display characteristics. A back light unit (not shown) is provided on the backside of the liquid crystal panel 8. The liquid crystal panel 8 is connected to a drive circuit (not shown).

Thus, the liquid crystal display according to the present embodiment is constituted.

Next, the alignment direction of the liquid crystal molecules 46 of the liquid crystal layer 6 will be explained with reference to FIGS. 4A and 4B.

First, the alignment direction of the liquid crystal molecules 46 in the region where the electrode units 34 are formed will be explained.

In the region of the region where the electrode units 34 are formed, where the extensions 36b are formed, the extension direction of the extensions 36b and the alignment control structures 44a, 44b, 70b control the alignment direction of the liquid crystal molecules 46. In the region where the extensions 36b are formed, the liquid crystal molecules 46a realigned along the extension direction of the extensions 36b.

In the region of the region where the electrode units 34 are formed, where the solid portions 36b are formed, the alignment direction of the liquid crystal molecules 46 is controlled by the slant electric field in the periphery portion of the solid portions 36a and the alignment control structures 44a, 44b, 70b. Accordingly, in the region where the solid parts 36a are formed, the liquid crystal molecules 46 are aligned toward the centers of the solid parts 36a.

Thus, in the region where the electrode units 34 are formed, the alignment is divided roughly four directions.

Then, the alignment direction of the liquid crystal molecules 46 in the region where the reflection electrode 48 is formed will be explained.

In the region where the reflection electrode 48 is formed, the alignment direction of the liquid crystal molecules 46 is controlled by the alignment control structure 70a. Accordingly, in the region where the reflection electrode 48 is formed, the liquid crystal molecules are aligned in parallel with the longitudinal direction of the gate bus line 12.

(Evaluation Result)

Figure 6:
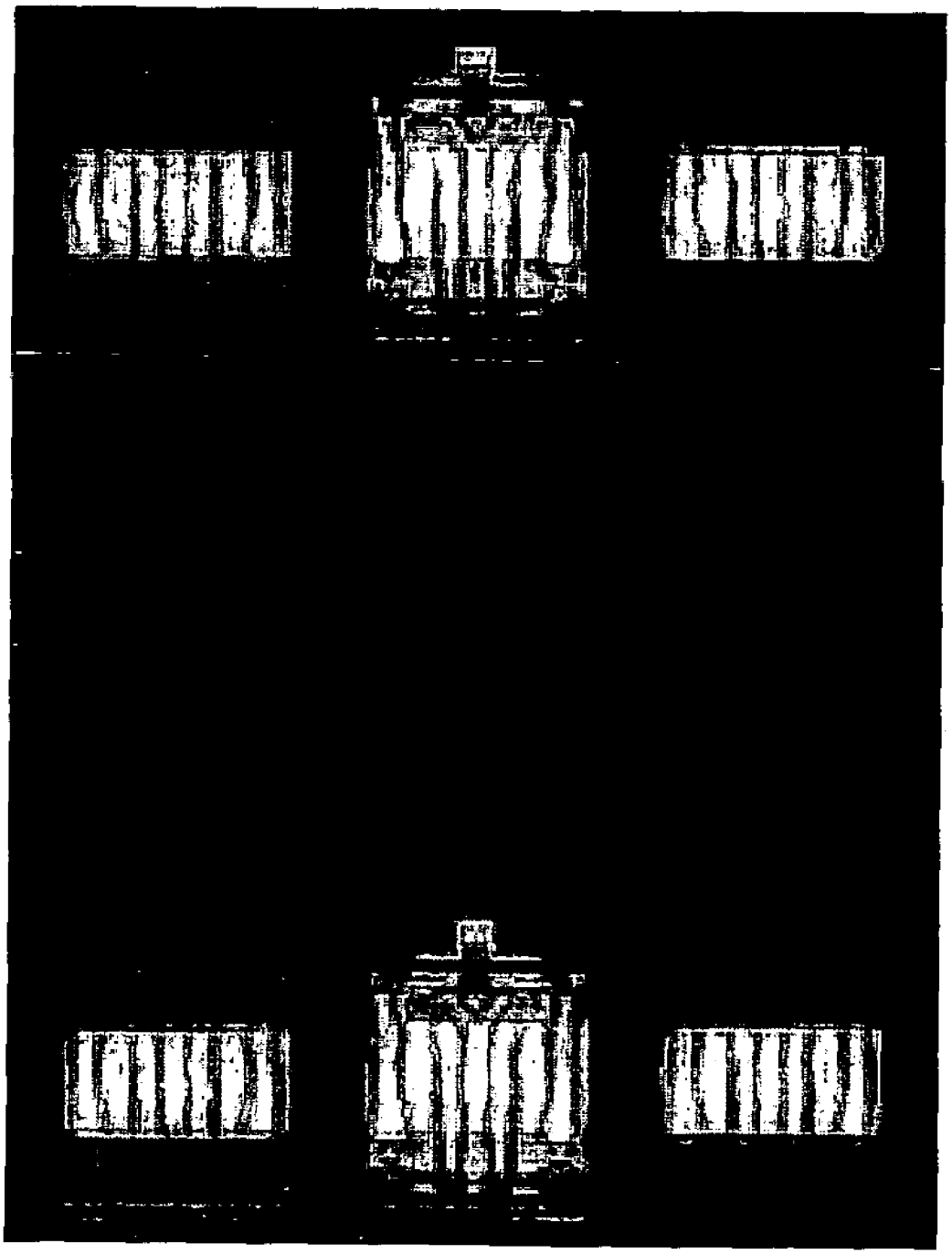
FIG. 6 is a plan view of display states of respective pixels in the reflection display.
Figure 7:
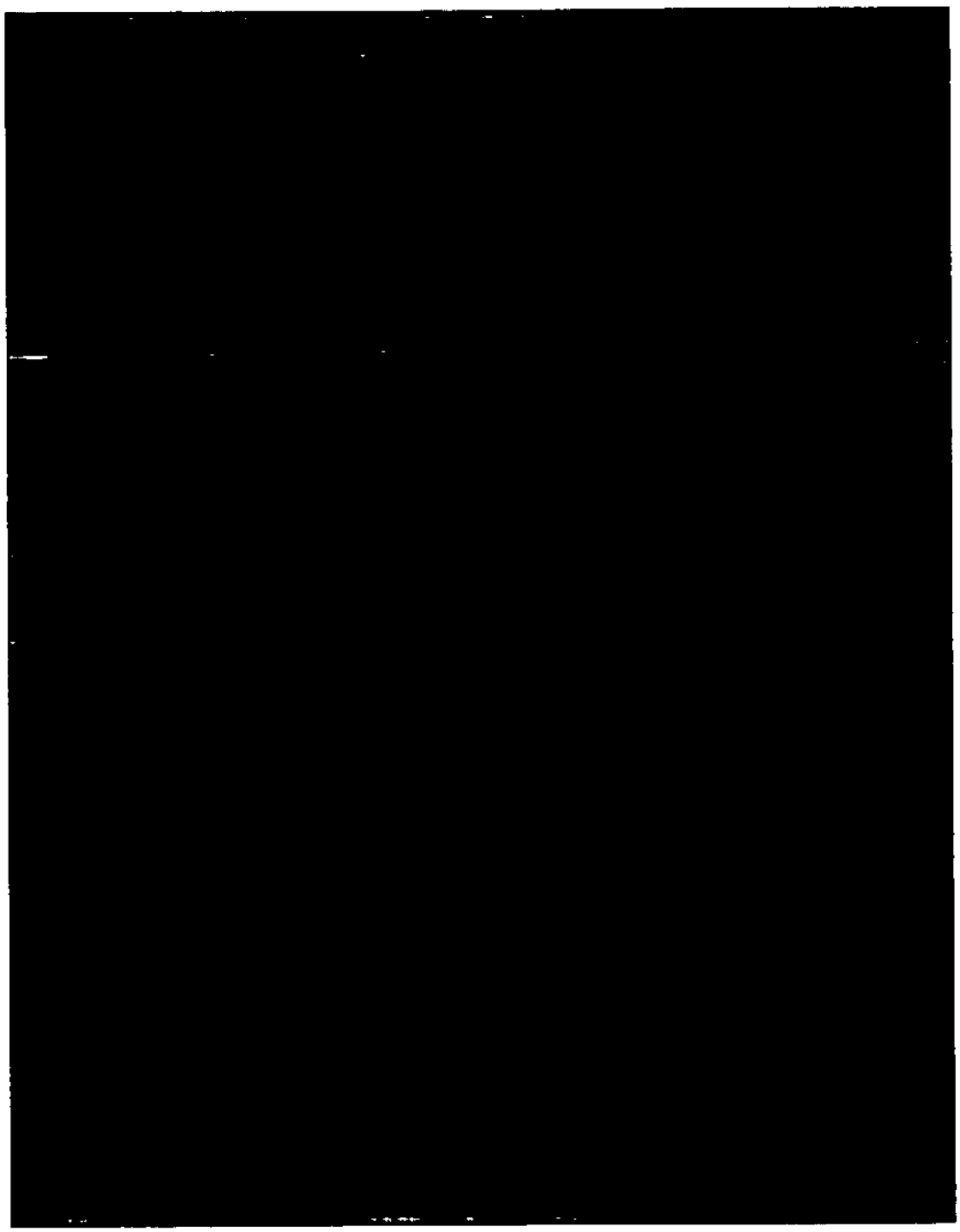
FIG. 7 is a plan view of display states of respective pixels in the transmission display.

Next, the result of evaluating the liquid crystal display according to the present embodiment will be explained with reference to FIGS. 6 and 7.

First, the evaluation result of displays of the respective pixels will be explained. FIG. 6 is a plan view of displays of the respective pixels in the reflective display. FIG. 7 is a plan view of displays of the respective pixels in the transmission display. The display colors of the respective pixels are red, green and blue from the left side of the drawing.

In all the colors, the displays are good without dark lines and roughness. This means that the liquid crystal molecules 48 are well aligned.

Next, the result of measuring the transmittance will be explained. In measuring the transmittance, light is incident on the backside of the liquid crystal panel 8, and light exiting at the front surface was measured. The incident direction of the light was normal to the substrate surface. The measuring points were normal to the substrate surface. The measured transmittance was about 8%, and the result was good.

Then, the result of measuring the reflectivity will be explained. In measuring the reflectivity, light was incident on the front surface of the liquid crystal panel 8, and the light exiting at the front surface was measured. The incident direction of the light was 25 degrees to the normal to the substrate surface. The measuring point was normal to the substrate surface. The measured reflectivity was about 7%, and the result was good.

Next, the result of measuring the contrast of the transmission display will be explained. In measuring the contrast of the transmission display, light is incident on the backside of the liquid crystal panel 8, and light exiting at the front surface was measured. The incident direction of the light was normal to the substrate surface. The measuring point was normal to the substrate surface. The measured contrast of the transmission display was above 300, and the result was good.

Then, the result of measuring the contrast of the reflection display will be explained. In measuring the contrast of the reflection display, light was incident on the front surface of the liquid crystal panel 8, and light exiting at the front surface was measured. The incident direction of the light was 25 degrees to the normal to the substrate surface. The measuring point was normal to the substrate surface. The measured contrast of the reflection display was above 30, and the result was good.

Next, the result of measuring the visual angle characteristics of the reflectivity of light will be explained with reference to FIGS. 8 and 9.

Figure 8:
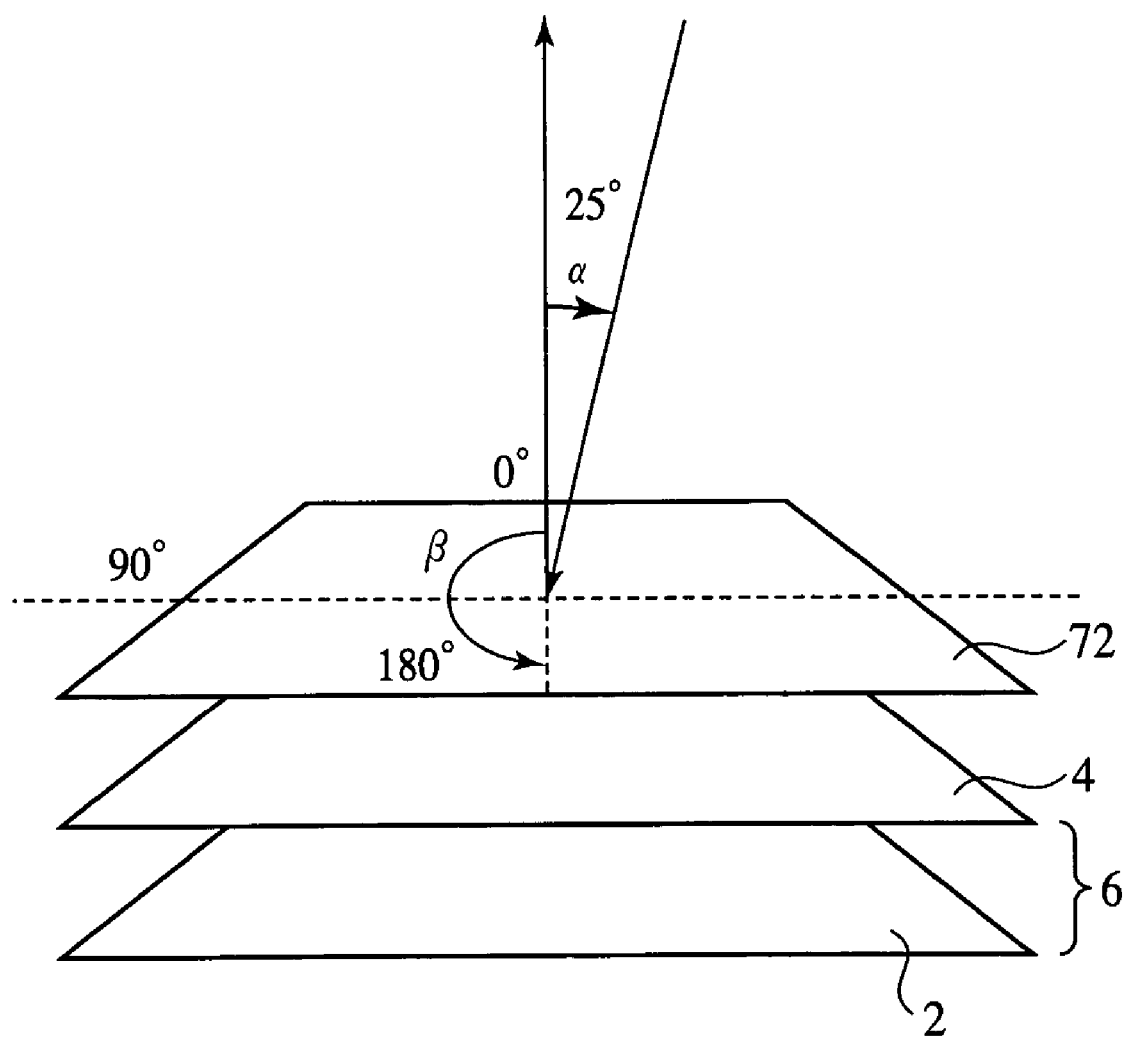
FIG. 8 a view illustrating a method of measuring visual angle characteristics of the reflectivity of light.

FIG. 8 is a view illustrating the method of measuring the visual characteristics of the reflectivity of light. As shown in FIG. 8, in measuring the visual angle characteristics of the reflectivity of light, the polar angle α of the incident light was 25 degrees, and the azimuth β of the incident light was changed in the range of 0–180 degrees. The measuring point was normal to the substrate surface. The polar angle α is an angle of the incident light to the normal to the substrate surface.

Figure 9:
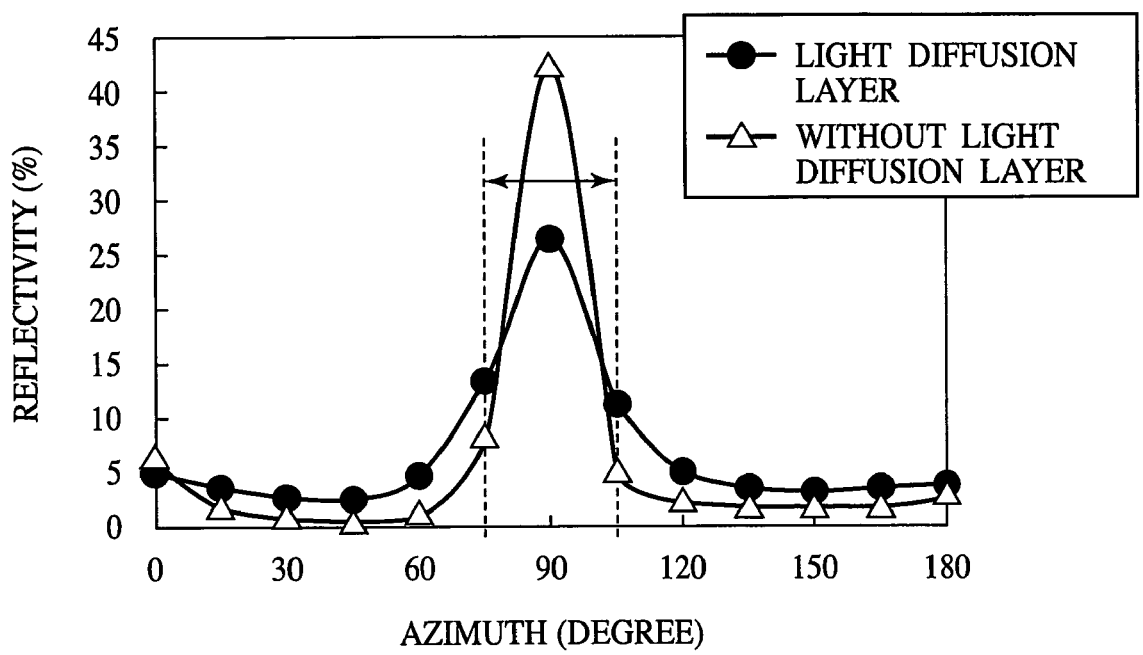
FIG. 9 is a graph of the visual angle characteristics of the reflectivity of light.

FIG. 9 is a graph of the visual angle characteristics of the reflectivity of the light. In FIG. 9, the ● marks indicate the case that the circular polarization plates (not shown) are bonded to the liquid crystal panel 8 with a diffusion adhesive, i.e., the light diffusion layer 72 of the diffusion adhesive is formed on the liquid crystal panel 8. In FIG. 8, the ▲ marks indicate the case that no diffusion adhesive is used to adhere the circular polarization plates (not shown) to the liquid crystal panel 8, i.e., the light diffusion layer 72 of the diffusion adhesive is not formed on the liquid crystal panel 8.

As indicated by the ● marks in FIG. 9, a high reflectivity of about 25%, which is high, is obtained when the azimuth β of the incident light is about 90 degrees. Such high reflectivity is equivalent to that of total reflection type liquid crystal displays. Such high reflectivity at an azimuth β of about 90 degrees is because the direction of the streaks of the convexities 42a present in the surface of the reflection electrodes 48 are all perpendicular to the longitudinal direction of the gate bus lines 12.

As indicated by the ▲ marks in FIG. 9, when the azimuth β of the incident light is about 90 degrees, the reflectivity is about 43%, which is higher. Without the light diffusion layer 72, when parallel rays are incident, interference unevenness tend to take place, and practically it is preferable that the light diffusion layer 72 is formed.

The liquid crystal display according to the present embodiment is characterized mainly in that each pixel electrode 52 including the transmission electrode 32a and the reflection electrode 48b is electrically connected to the thin film transistor 18 formed near the intersections between the gate bus line 12a and the data bus line 28, and the pixel electrode 48b of the pixel electrode 52 is formed on the other gate bus line 12b with the insulation layer 40 formed therebetween.

The region where the gate bus line 12 is formed cannot transmit light and cannot be the transmission part 54. Then, to utilize the region which is not usable as the transmission part 54 the reflection electrode 48 will be formed above the gate bus line 12. However, when the reflection electrode 48 is formed simply on the gate bus line 12, a large capacitance is formed between the gate bus line 12 and the reflection electrode 48, and a voltage applied to the liquid crystal layer 6 between the reflection electrode 48 and the opposed electrode 68 is lowered.

In the present embodiment, however, the pixel electrode 52a is electrically connected to the thin film transistor 18 formed near the intersections between the gate bus line 12a and the data bus line 28, and the reflection electrode 48b of the pixel electrode 52a is formed on the other gate bus line 12b with the insulation layer 40 formed therebetween. The gate bus lines 12 are sequentially scanned, and a signal voltage is never simultaneously applied to the two gate lines 12. Thus, when a signal voltage is applied to the gate bus line 12a, the thin film transistor 18 is turned on, and a voltage is applied to the reflection electrode 48b, the other gate bus line 12b is opened. Accordingly, no large capacitance is formed between the reflection electrode 48b and the other gate bus line 12b. Thus, according to the present embodiment, the decrease of a voltage applied to the liquid crystal layer 6 between the reflection electrode 48b and the opposed electrode 68 can be prevented while the space which can not be used as the transmission part 54 can be utilized. Accordingly, the present embodiment can prevent the decrease of the area of the transmission part 54 and increase the area of the reflection part 56, whereby the reflective transmission type liquid crystal display of high display quality can be provided.

The liquid crystal display according to the present embodiment is characterized mainly in that the Cs bus line 14, the Cs dummy bus line 16, the intermediate electrode 26 and the thin film transistor 18 are arranged below the reflection electrode 48 with the insulation layer 40 formed therebetween.

The region where the Cs bus line 14, the Cs dummy bus line 16, the intermediate electrode 26, the source electrode 24a and the drain electrode 24b are formed is also a region which cannot transmit light. In the present embodiment, the Cs bus line 14, the Cs dummy bus line 16, the intermediate electrode 26, the source electrode 24a and drain electrode 24b are arranged below the reflection electrode 48, which permits the region which cannot transmit light to be further utilized. Accordingly, the present embodiment can prevent the decrease of the area of the transmission part 54 and increase the area of the reflection part 56, whereby the reflective transmission type liquid crystal display of high display quality can be provided.

The liquid crystal display according to the present embodiment is characterized mainly in that the insulation layer 40 has the edge located on the Cs bus line 14 and the Cs dummy bus line 16.

In the region near the edge of the insulation layer 40, disalignment of the liquid crystal molecules 46 tends to take place in the white display state, and in the black display state, light leakage due to slant liquid crystal molecules 46 tends to take place. Accordingly, in the region near the edge of the insulation layer 40, roughness tends to take place, and the contrast tends to be decreased.

In the present embodiment, the insulation layer 40 has the edge located on the Cs bus line 14 and the Cs dummy bus line 16, whereby the Cs bus line 14 and the Cs dummy bus line 16 can seal light in the region near the edge of the insulation layer 40, where disalignment of the liquid crystal molecules 46 tend to take place. Thus, the present embodiment can prevent generation of roughness and decrease of the contrast.

The liquid crystal display according to the present embodiment is also characterized mainly in that the reflection electrode 48 and the transmission electrode 32 are interconnected with each other in the region near the edge of the insulation layer 40.

When the contact hole is formed in the insulation layer 40, and the reflection electrode 48 and the transmission electrode 32 are interconnected with each other through the contact hole, the reflection efficiency is decreased due to the contact hole. The alignment of the liquid crystal molecules 46 near the contact hole is disturbed, and the display quality degraded.

In the present embodiment, the reflection electrode 48 and the transmission electrode 32 are interconnected with each other in the region near the edge of the insulation layer 40 without forming any contact hole in the insulation layer 40, whereby the decrease of the reflection efficiency and degradation of the display quality can be prevented.

The liquid crystal display according to the present embodiment is also characterized mainly in that the electrode unit 34a and the electrode unit 34b are interconnected by the interconnection pattern 38a near the center line of the electrode units 34, the electrode unit 34a and the drain electrode 24b are interconnected with each other by the interconnection pattern 38b near the center line of the electrode units 34, and the electrode unit 34a and the reflection electrode 48 are interconnected to each other by the interconnection pattern 38c near the center line of the electrode units 34.

The extensions 36b extended from the solid portions 36a outward toward the border of the electrode units 34 are for controlling the alignment direction of the liquid crystal molecules 46. The extensions 36b of a thick pattern lowers the alignment controlling force for the liquid crystal molecules 46, and it is not preferable to make the pattern thick. When the interconnection pattern 38a for interconnecting the electrode unit 34a and the electrode unit 34b with each other, and the interconnection pattern 38c for interconnecting the electrode unit 34b and the reflection electrode 48 with each other are formed thin, line breakage tends to take place, which leads to display defects. It is preferable that the interconnection pattern 38a for interconnecting the electrode unit 34a and the electrode unit 34b with each other, the interconnecting pattern 38b for interconnecting the electrode unit 34a and the drain electrode 24b, and the interconnection pattern 38c for interconnecting the electrode unit 34b and the reflection electrode 48 are formed thick. The borders of the four directional alignment division are near the center line of the solid portions 36a, and even when the alignment controlling force is decreased near the center line of the solid portion 36a, the four directional alignment division is not substantially affected. In the present embodiment, wherein the interconnection pattern 38a is formed near the center line of the electrode units 34, the electric interconnection between the electrode unit 34a and the electrode unit 34b can be ensured without affecting the four directional alignment division. The formation of the interconnection pattern 38b near the center line of the electrode units 34 ensures the electric interconnection between the electrode unit 34a and the drain electrode 34b without affecting the four directional alignment division. The formation of the interconnection pattern 38c near the center line of the electrode units 34 ensures the electric interconnection between the electrode unit 34 band the reflection electrode 48b without affecting the four directional alignment division. Thus, the present embodiment can ensure high display quality while preventing generation of display defects.

The liquid crystal display according to the present embodiment is also characterized mainly in that convexities (wrinkles) 42a are formed in the surface of the insulation layer 40, the directions of the streaks of the convexities 42a are substantially perpendicular to the longitudinal direction of the gate bus lines 12, and the same convexities 42a are formed also in the surface of the reflection electrode 48, reflecting the convexities 42a in the surface of the insulation layer 40.

Most of the streaks of the convexities 42a formed in the surface of the reflection electrode 48 are arranged in a uniform direction, the declined surfaces of most of the convexities 42a are in the same declination direction. Thus, according to the present embodiment, the reflectivity of light incident along a specification direction, e.g., the horizontal direction can be increased. When the screen is watched under conditions which make the reflectivity high, bright displays can be obtained in the reflection display, which allows the brightness of the reflection display to be increased while the brightness of the transmission display is maintained sufficiently high.

The liquid crystal display according to the present embodiment is also characterized mainly in that the alignment control structure 70a formed on the side of the CF substrate 4 is contact with the reflection electrode 48 form on the insulation layer 40 of the TFT substrate 2, and the thickness of the liquid crystal layer 6 is retained by the height of the alignment control structure 70a on the side of the CF substrate 4 and the thickness of the insulation layer 40 of the TFT substrate 2.

In the present embodiment, the thickness of the liquid crystal layer 6 is retained mainly by the alignment control structure 70a on the side of the CF substrate 4 and the insulation layer 40 on the side of the TFT substrate 2, which makes it unnecessary to provide extra means for retaining the thickness of the liquid crystal layer 6. Thus, according to the present embodiment, the structure of the liquid crystal display can be simple.

The liquid crystal display according to the present embodiment is also characterized mainly in that the alignment control structures 44a, 44b are provided on the side of the CF substrate 4, and also on the side of the TFT substrate 2, the alignment control structures 44a. 44b are provided on the data bus line 28.

In the case that the alignment control structures 70a, 70 are provided on the side of the CF substrate 4, and the slits (blank patterns) are provided in the picture element electrode of the TFT substrate 2 so as to align the liquid crystal molecules 46, the alignment direction of the liquid crystal molecules 46 cannot be often sufficiently stabilized.

In the present embodiment, however, the alignment control structures 70a, 70b are provided on the side of the CF substrate 4, and also on the side of the TFT substrate 2, the alignment control structures 44a, 44b are provided, whereby the alignment direction of the liquid crystal molecules 46 can be stabilized. Thus, the liquid crystal display can have high display quality.

The liquid crystal display according to the present embodiment is also characterized mainly in that the reflection electrode 48 is not formed in the edge portion of the insulation layer 40.

The presence of the insulation layer 40 in the edge portion of the reflection electrode 48 makes the alignment direction of the liquid crystal molecules 46 around the insulation layer 40 unstable. This is because the alignment controlling force of the alignment control structure 70a and the alignment controlling force of slant electric fields generated by the reflection electrode 48 are exerted in directions opposite to each other.

According to the present embodiment, a region where the reflection electrode 48 is not formed is present in the edge portion of the insulation layer 40, whereby the slant electric field generated by the reflection electrode 48 can be made smaller around the insulation layer 40. Accordingly, disalignment of the liquid crystal molecules 46 around the insulation layer 40 can be suppressed, and higher display quality can be realized. The interconnection pattern 50 for interconnecting the reflection electrode 48 with the electrode unit 34b of the transmission electrode 52 is formed, near the center line of the reflection electrode 48, also in the edge portion of the insulation layer 40 but does not affect the four directional alignment division because the border of the four directional alignment division is near the center line of the reflection electrode 48. Accordingly, even when the reflection electrode 48 is formed in the edge portion of the insulation layer 40 near the center line of the reflection electrode 48, this causes no problem.

[A Second Embodiment]

Figure 11A:
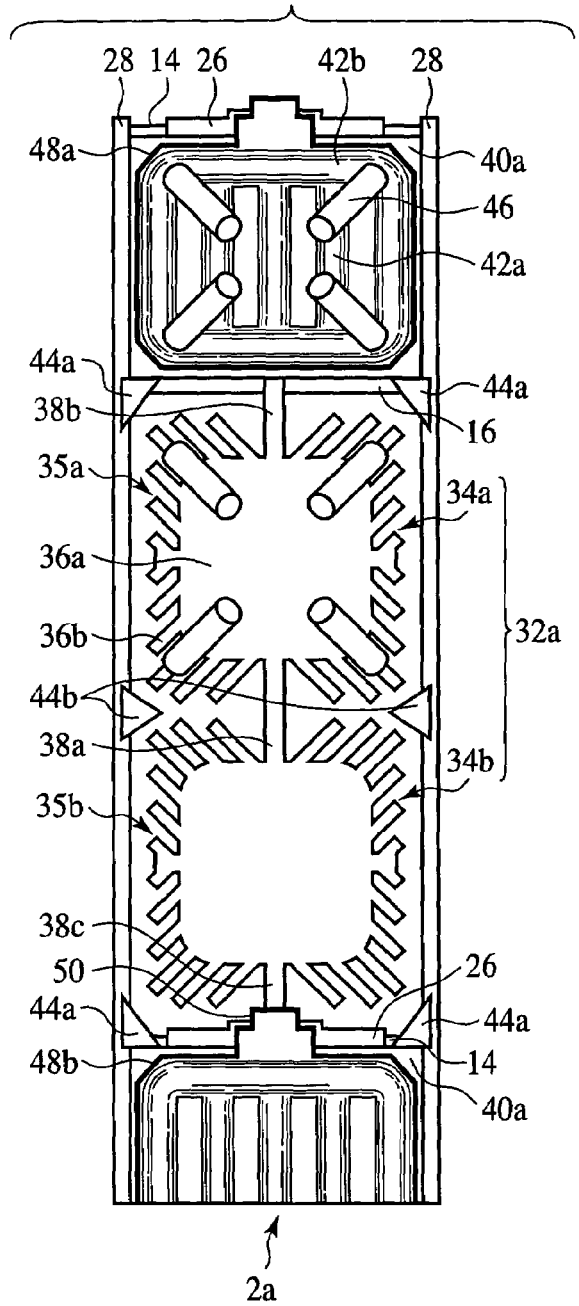
FIGS. 11A and 11B are plan views (Part 2) of the liquid crystal display according to the second embodiment of the present invention.
Figure 11B:
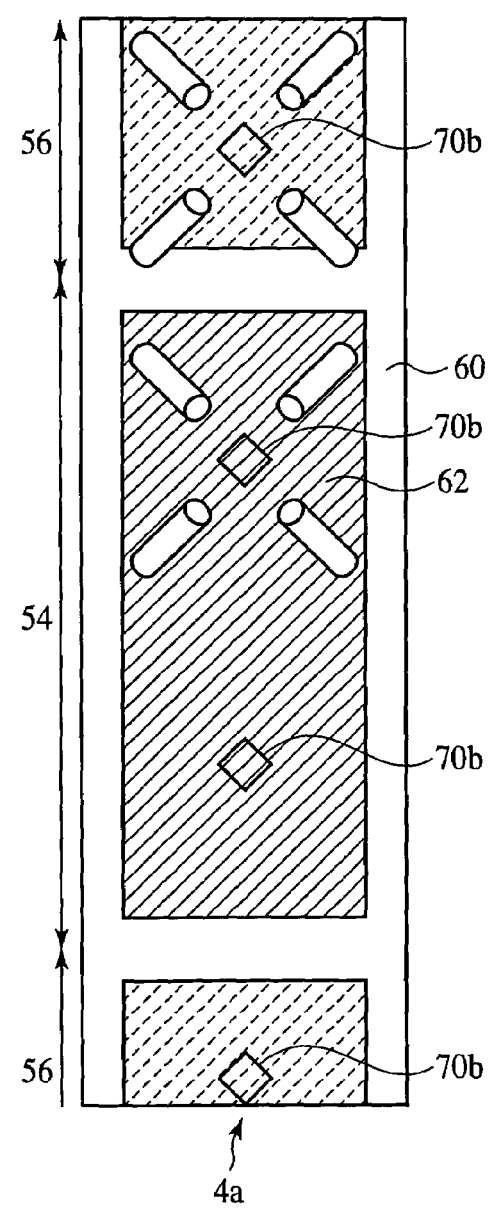
Figure 12:
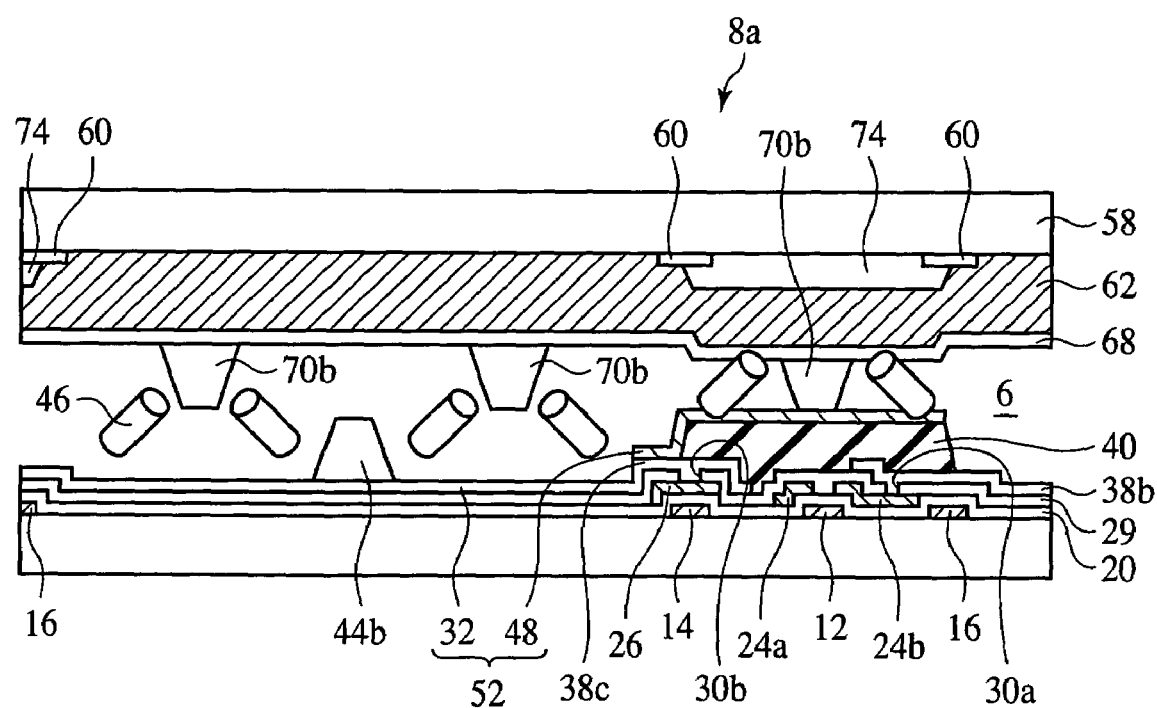
FIG. 12 is a sectional view of the liquid crystal display according to the second embodiment of the present invention.

The liquid crystal display according to a second embodiment of the present invention will be explained with reference to FIGS. 10A to 15. FIGS. 10A and 10B are plan views of the liquid crystal display according to the present embodiment (Part 1) FIG. 10A is illustrates a TFT substrate, and FIG. 10B illustrates a CF substrate in the region illustrated in FIG. 10A. FIGS. 11A and 11B are plan views of the liquid crystal display according to the present embodiment (Part 2). FIG. 11A illustrate the TFT substrate, and FIG. 11B illustrates the CF substrate in the region illustrated in FIG. 11A. FIG. 12 is a sectional view of the liquid crystal display according to the present embodiment. The same reference numbers of the present embodiment as those of the liquid crystal display according to the first embodiment shown in FIGS. 1A to 9 are represented by the same reference numbers not to repeat or to simplify their explanation.

The liquid crystal display according to the present embodiment is characterized mainly in that an insulation layer 40a is formed in the island-shape for the reflection parts 56 of respective pixels, and convexities (wrinkles) 42b which are substantially in parallel with the longitudinal direction of a gate bus line 12 and convexities (wrinkles) 42a which are substantially perpendicular to the longitudinal direction of the gate bus line 12 are formed in the surface of each insulation layer 40a.

First, the TFT substrate 2a will be explained.

On a glass substrate 10 with transmission electrodes 32, etc. formed on, the island-shaped insulation layer 40a are formed for the respective pixels. In the surface of each insulation layer 40a, the streaks of the convexities 42b which are substantially parallel with the longitudinal direction of the gate bus line 12 and the streaks of the convexities 42a which are substantially perpendicular to the longitudinal direction of the gate bus line 12 are formed. The streaks of the convexities 42b, which are substantially parallel with the longitudinal direction of the gate bus line 12 will be called horizontal wrinkles, and the streaks of the convexities 42a, which are substantially perpendicular to the longitudinal direction of the gate bus line 12 are called vertical wrinkles.

The directions of most of the convexities 42a, 42b are substantially perpendicular to the longitudinal direction of the gate bus lines 12 and substantially parallel with the longitudinal direction of the gate bus line 12.

The streaks of the convexities 42a, 42b are formed in the surface of the insulation layer 40 so as to form the aligned streaks of the convexities also in the surface of the reflection electrode 48, reflecting the streaks of the convexities 42a, 42b formed in the surface of the insulation layer 40. The aligned streaks of the convexities 42a, 42b are formed in the surface of the reflection electrode 48 so as to cause light incident in a specific direction to exit to the front surface of the liquid crystal display at high light intensities.

The vertical winkles 42a and the horizontal winkles 42b are formed in the surface of the island-shaped insulation layer 40a for the following reason. That is, when thermal processing is performed on the insulation layer 40 having the surface solidified in advance, stresses are applied to the insulation layer 40a due to solidifying shrinkage differences between the surface of the insulation layer 40 and the inside thereof. In the present embodiment, stresses which are substantially parallel to the longitudinal direction of the data bus line 28 and are substantially parallel to the longitudinal direction of the gate bus line 12 are exerted to the insulation layer 40a, which is formed for each pixel and has a quadrangular shape whose aspect ratio is not so large. Resultantly, the perpendicular wrinkles 42a and the horizontal wrinkles 42b are formed in the surface of the insulation layer 40a.

When the insulation layer 40a is formed in the island-shape, wrinkle patterns are often formed concentrically. When the insulation layer 40a has a quadrangular plane shape, quadrangular patterns of convexities (wrinkles) 42 (see FIGS. 23A and 23B) are formed concentrically. The convexities 42 may be formed concentrically in the surface of the insulation layer 40a. Such concentric convexities 42 have the horizontal wrinkles and perpendicular wrinkles and can cause the light incident in a specific direction to exit to the front surface of the screen at high reflection intensities.

A reflection electrode 48 is formed on the island-shaped insulation layer 40a. The convexities 42a, 42b are formed also in the surface of the reflection electrode 48, which is formed on the insulation layer 40a with the convexities 42a, 42b formed, reflecting the convexities 42a, 42b formed in the surface of the insulation layer 40a. Accordingly, the streaks of the convexities 42a which are substantially perpendicular to the longitudinal direction of the gate bus line 12 and the streaks of the convexities 42b which are substantially parallel to the longitudinal direction of the gate bus line 12 are formed in the surface of the reflection electrode 48. Most of the convexities 42a are aligned. Most of the convexities 42b are aligned. The declination directions of the declined planes of most of the convexities 42a are aligned in parallel with the longitudinal direction of the gate bus line 12. The declination directions of the declined planes of most of the convexities 42b are aligned perpendicular to the longitudinal direction of the gate bus line 12. Because of the declination direction of the declined planes of most of the convexities 42a, which is substantially along the longitudinal direction of the gate bus line 12, when the longitudinal direction of the gate bus line 12 is extended in the left-to-right direction of the liquid crystal display, light incident from the left and right of the liquid crystal display is caused to exit to the front surface of the screen of the liquid crystal display at a high light intensity. Because of the declination direction of the declined planes of most of the convexities 42*b*, which are substantially perpendicular to the longitudinal direction of the gate bus line 12, when the longitudinal direction of the gate bus lines 12 is extended in the left-to-right direction of the liquid crystal display, light incident from above and below of the screen of the liquid crystal display is caused to exit to the front surface of the screen of the liquid crystal display at a high light intensity. Accordingly, in the present embodiment, light incident from the left and right of the screen of the liquid crystal display and light incident from above and below of the screen of the liquid crystal display are caused to exit to the front surface of the screen of the liquid crystal display at a high reflection intensity. In FIG. 10A, the arrows indicate directions in which the light reflectivity is highest.

A region where the reflection electrode 48 is not formed is present in the edge of the insulation layer 40*a*. Corners of the reflection electrode 48 are chamfered. Because of the chamfered corners of the reflection electrode 48, electric fields are applied obliquely to the liquid crystal molecules 46 at the corners of the reflection electrode 48, and the liquid crystal molecules 46 are aligned toward the center of the reflection electrode 48.

Next, the CF substrate 4*a* will be explained.

As shown in FIGS. 11B and 12, a black matrix layer 60 is formed below the glass substrate 58. The black matrix layer 60 is positioned above a data bus line 28, a Cs bus line 14 and a Cs dummy bus line 16. The black matrix layer 60 is formed on the border between the reflection part 56 and the transmission part 54, i.e., above the Cs bus line 14 and the Cs dummy bus line 16 so as to obtain good contrast.

As shown in FIG. 12, a transparent resin layer 74 is formed below the glass substrate 58 with the black matrix layer 60 formed on. The transparent resin layer 74 is positioned above the reflection electrode 48. The thickness of the transparent resin layer 74 is, e.g., about 0.8 μm. The transparent resin layer 74 is for reducing the thickness of the color filter layer 62 partially at the reflection part 56.

A color filter layer 62 is formed below the glass substrate 58 with the transparent resin layer 74 formed on. The surface of the substrate is planarized by the color filter layer 62. The thickness of the color filter 62 in the reflection part 56 is smaller than the thickness of the color filter layer 62 in the transmission part 54, because of the transparent resin layer 74 is formed in the reflection part 56. The thickness of the color filter layer 62 in the transmission part 54 is, e.g., about 1.4 μm. The thickness of the color filter layer 62 in the reflection part 56 is, e.g., about 0.7 μm.

The thickness of the color filter layer 62 in the reflection part 56 is smaller than that of the color filter layer 62 in the transmission part 54 for the following reason. In the reflection part 56, as described above, light incident from the outside passes through the color filter layer 62 to be reflected by the reflection electrode 48 and passes again the color filter layer 62 to exit outside. In other words, the light passes twice through the color filter layer 62 in the reflection part 56. Accordingly, in the case that the color filter layer 62 is simply formed below the glass substrate 58, the color density in the reflection part 56 is much higher than that in the transmission part 54. In the present embodiment, in which the transparent resin layer 74 is provided in the reflection part 56, and the color filter layer 62 is formed to planarize the substrate surface, the thickness of the color filter layer 62 in the reflection part 56 is smaller than that of the color filter layer 62 in the transmission part 54. Thus, the color density in the reflection part 56 is prevented from being higher than that in the transmission part 54. Furthermore, the color density in the reflection part 56 can be made substantially equal to that in the transmission part 54. Accordingly, the liquid crystal display according to the present embodiment can have higher display quality.

An opposed electrode 68 of, e.g., ITO is formed below the color filter layer 62.

Alignment control structures 70*b* are formed below the opposed electrode 68. The alignment control structures 70*b* have, e.g., a quadrangular (rhombic) plane shape. The alignment control structures 70*b* are positioned respectively above the centers of the electrode units 34 and the center of the reflection electrode 48. Because of the alignment control structures 70*b* positioned above he centers of the electrode units 34, the liquid crystal molecules 46 are aligned toward the centers of the electrode units 34. Because of the alignment control structure 70*b* positioned above the center of the reflection electrode 48, the liquid crystal molecules 46 are aligned toward the center of the reflection electrode 48. The liquid crystal molecules 46 are brought into the same alignment in both the reflection part 56 and the transmission part 54. That is, four direction alignment division is realized in both of the reflection part 56 and the transmission part 54, whereby stable visual characteristics can be obtained.

The reflection electrode 48 on the insulation layer 40*a* of the TFT substrate 2 and the alignment control structure 70*b* on the CF substrate 4 are in contact with each other to thereby retain the thickness of the liquid crystal layer 6. The liquid crystal layer 6 is formed of a liquid crystal having, e.g., negative dielectric anisotropy.

Thus, a liquid crystal panel 8*a* including the TFT substrate 2*a*, the CF substrate 4*a* and the liquid crystal layer 6 is constituted.

Circular polarization plates (not shown) are provided on both surfaces of the liquid crystal panel 8*a* with light diffusion layers formed therebetween, as in the liquid crystal display according to the first embodiment. As in the liquid crystal display according to the first embodiment, a back light unit (not shown) is provided on the backside of the liquid crystal panel 8*a*. A drive circuit (not shown) is connected to the liquid crystal panel 8*a*, as in the liquid crystal display according to the first embodiment.

Thus, the liquid crystal display according to the present embodiment is constituted.

(Evaluation Result)

Figure 13:
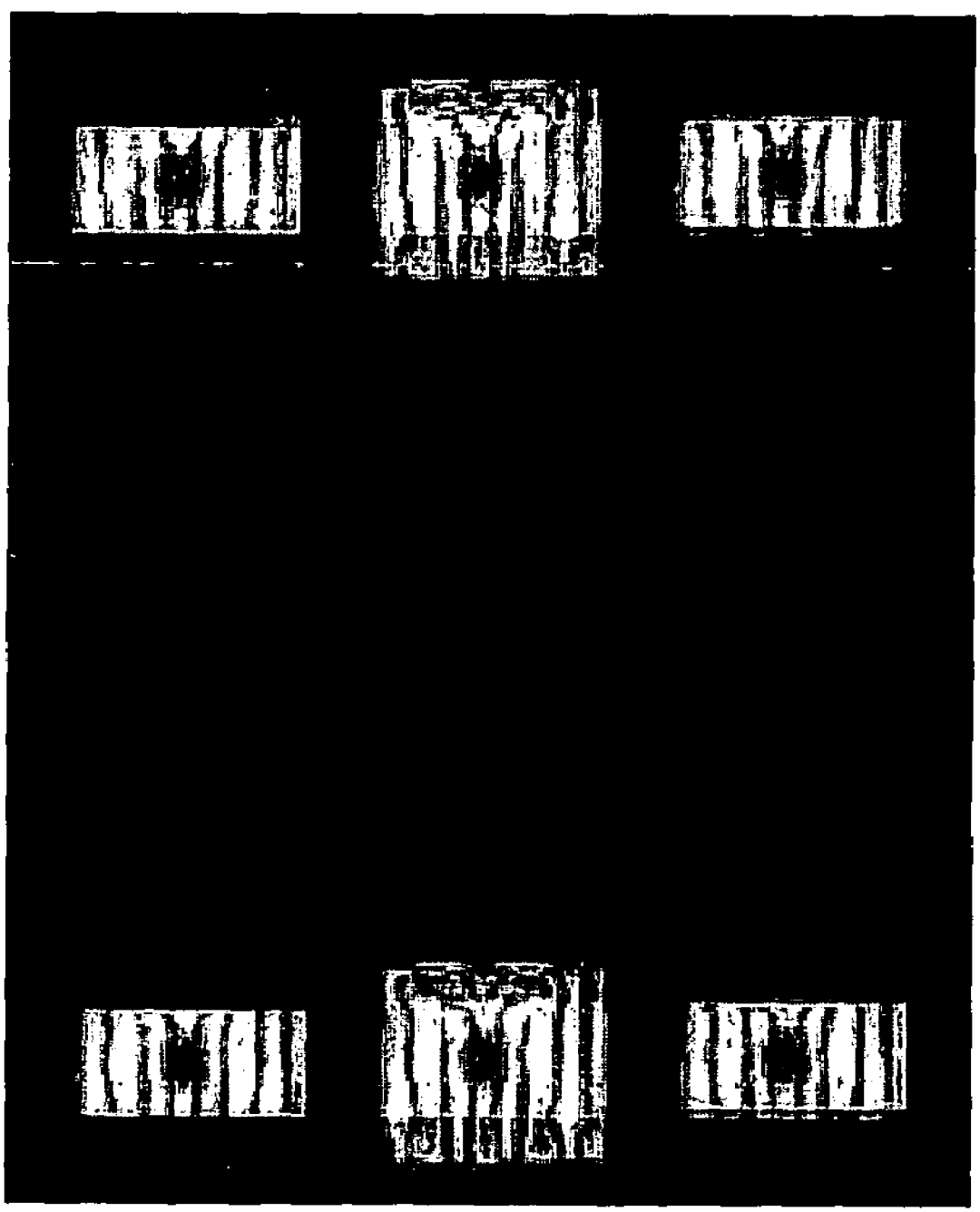
FIG. 13 is a plan view of the display states of respective pixels in the reflection display.
Figure 14:
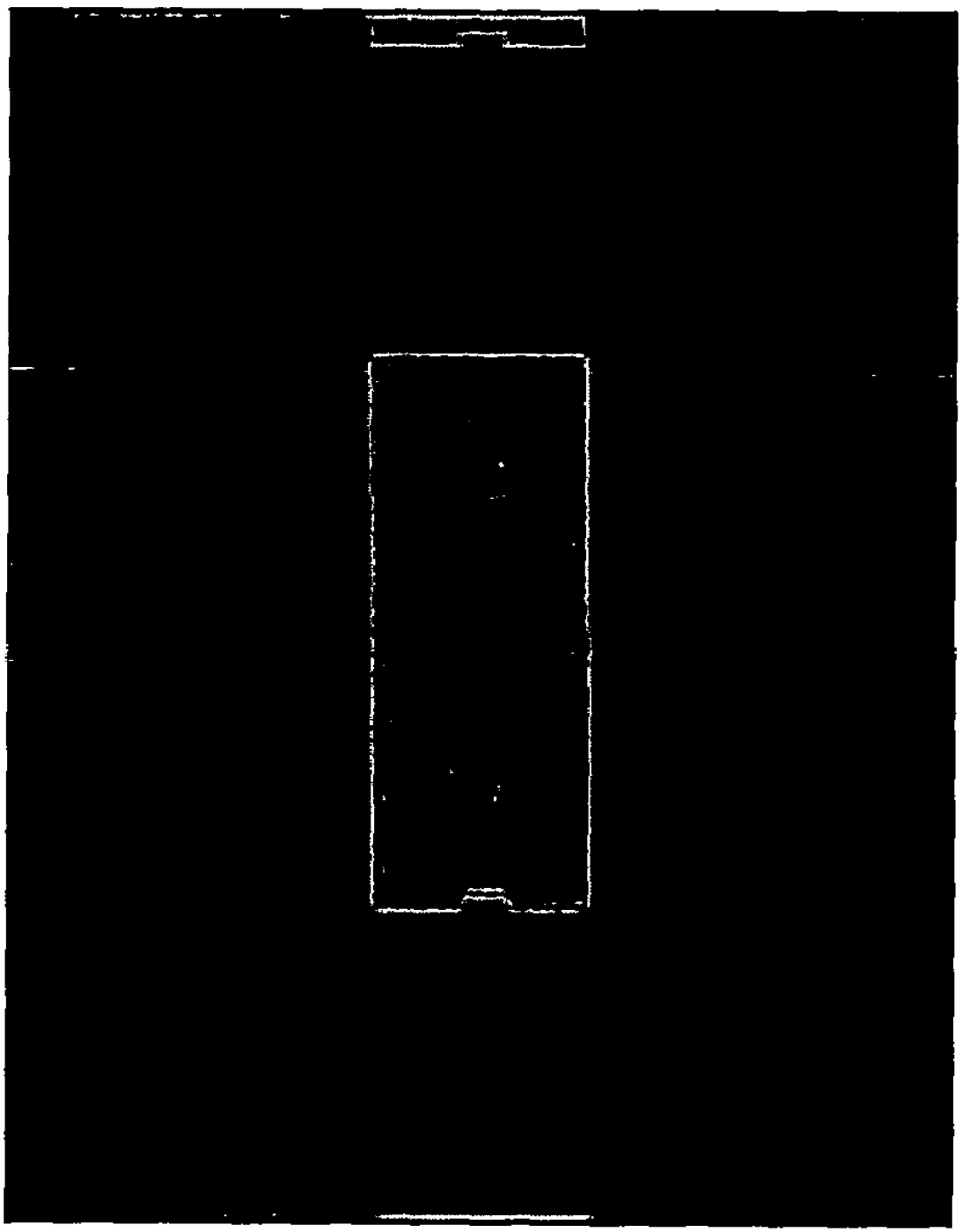
FIG. 14 is a plan view of the display states of respective pixels in the transmission display.

Next, the result of evaluating the liquid crystal display according to the present embodiment will be explained with reference to FIGS. 13 and 14.

First, the evaluation result of displays of the respective pixels will be explained with reference to FIGS. 13 and 14. FIG. 13 is a plan view of displays of the respective pixels in the reflective display. FIG. 14 is a plan view of displays of the respective pixels in the transmission display. The display colors of the respective pixels are red, green and blue from the left side of the drawing.

In all the colors, the displays are good without dark lines and roughness. This means that the liquid crystal molecules 48 are well aligned.

Then, the result of measuring the transmittance will be explained. In measuring the transmittance, light is incident on the backside of the liquid crystal panel 8*a*, and light exiting at the front surface was measured. The incident direction of the light was normal to the substrate surface. The measuring points were normal to the substrate surface. The measured transmittance was about 7%, and the result was good. Based on this, it is found that the present embodiment can have good transmittance, as does the first embodiment.

Then, the result of measuring the reflectivity will be explained. In measuring the reflectivity, light was incident on the front surface of the liquid crystal panel 8a, and the light exiting at the front surface was measured. The incident direction of the light was 25 degrees to the normal to the substrate surface. The measuring point was normal to the substrate surface. The measured reflectivity was about 6%, and the result was good. Based on this, it is found that the present embodiment can have good reflectivity, as does the first embodiment.

Next, the result of measuring the contrast of the transmission display will be explained. In measuring the contrast of the transmission display, light is incident on the backside of the liquid crystal panel 8a, and light exiting at the front surface was measured. The incident direction of the light was normal to the substrate surface. The measuring point was normal to the substrate surface. The measured contrast of the transmission display was above 500, and the result was good. Based on this, it is found that the present embodiment can improve the contrast of the reflection display in comparison with the first embodiment.

Then, the result of measuring the contrast of the reflection display will be explained. In measuring the contrast of the reflection display, light was incident on the front surface of the liquid crystal panel 8a, and light exiting at the front surface was measured. The incident direction of the light was 25 degrees to the normal to the substrate surface. The measuring point was normal to the substrate surface. The measured contrast of the reflection display was about 50, and the result was good. Based on this, it is found that the present embodiment can improve the contrast of the reflection display as well in comparison with the first embodiment.

Figure 15:
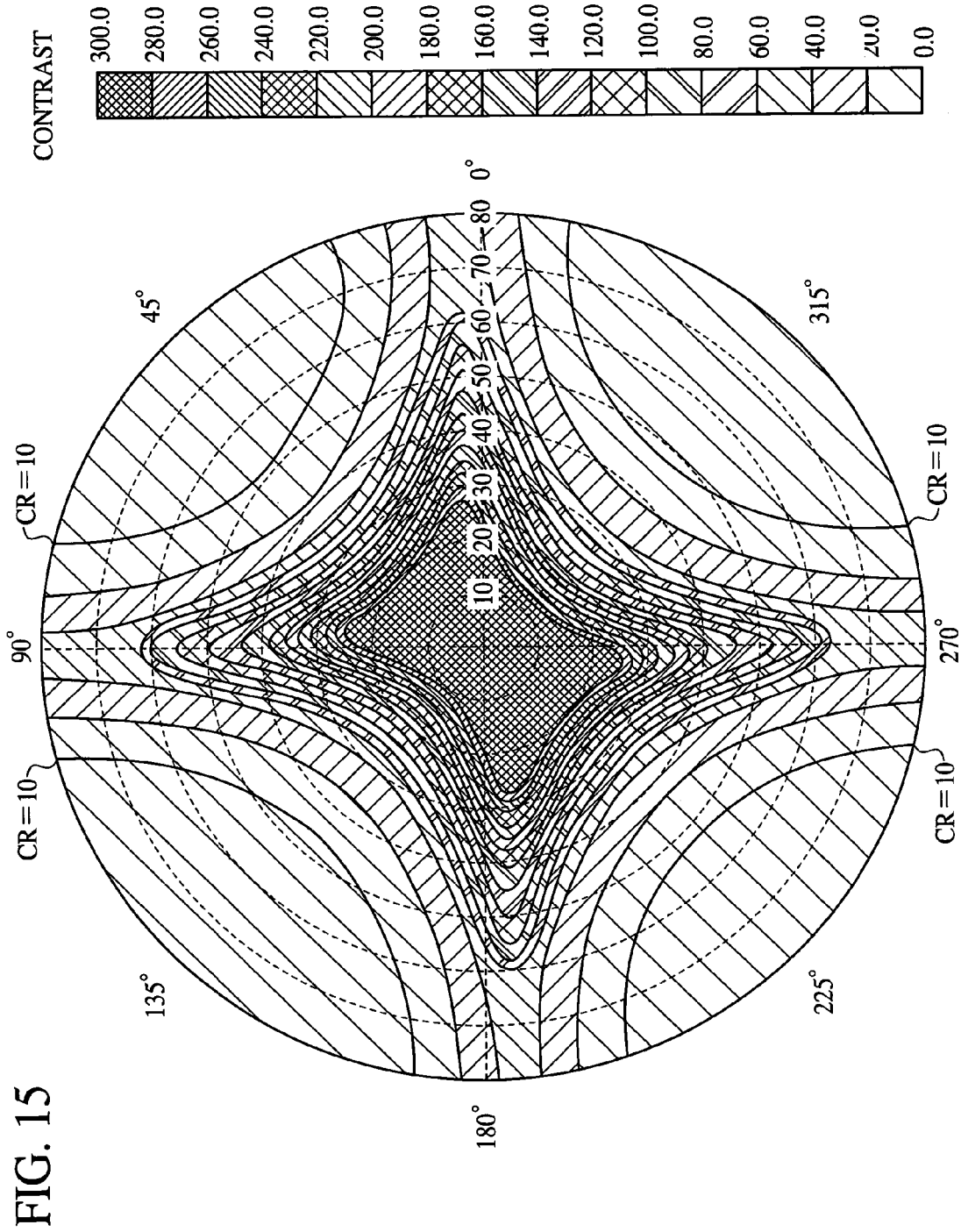
FIG. 15 is a view of the visual angle characteristics of the liquid crystal display according to the second embodiment of the present invention.

Next, the result of the contrast of the transmission display will be explained. FIG. 15 is a view of the visual angle characteristics of the liquid crystal display according to the present embodiment. In FIG. 15, the broken lines indicate polar angles. In FIG. 15, contrasts are indicated by contour lines. As seen in FIG. 15, regions where the contrast CR is 10 or more are present totally over about 160 degrees at the upper and the lower parts and the left and the right parts. Based on this, the liquid crystal display according to the present embodiment can have a very wide visual angle range.

The liquid crystal display according to the present embodiment is characterized mainly in that, as described above, the insulation layer 40a is formed in an island shape for the reflection part 56 of each pixel, and the streaks of the convexities 42b which are substantially parallel with the longitudinal direction of the gate bus line 12, and the streaks of the convexities 42a which are substantially perpendicular to the longitudinal direction of the gate bus lines 12 are formed in the surface of the insulation layer 40. The same convexities 42a are formed in the surface of the reflection electrode 48 reflecting the convexities 42 in the surface of the insulation layer 40.

Most of the convexities 42a formed in the surface of the reflection electrode 48 are aligned in the same direction, and accordingly, the declination directions of the declined planes of most of the convexities 42a are the same. Most of the convexities 42b formed in the surface of the reflection electrode 48 are aligned in the same direction, and accordingly, the declination directions of the declined planes of most of the convexities 42b are the same. The declination direction of the declined planes of the convexities 42a and the declination direction of the declined planes of the convexities 42b are substantially perpendicular to each other. Accordingly, the present embodiment can cause not only light incident, e.g., from the left and right but also light incident from above and below to exit to the front surface of the screen of the liquid crystal display at high intensities. Thus, the liquid crystal display according to the present embodiment can have higher display quality.

[A Third Embodiment]

Figure 17:
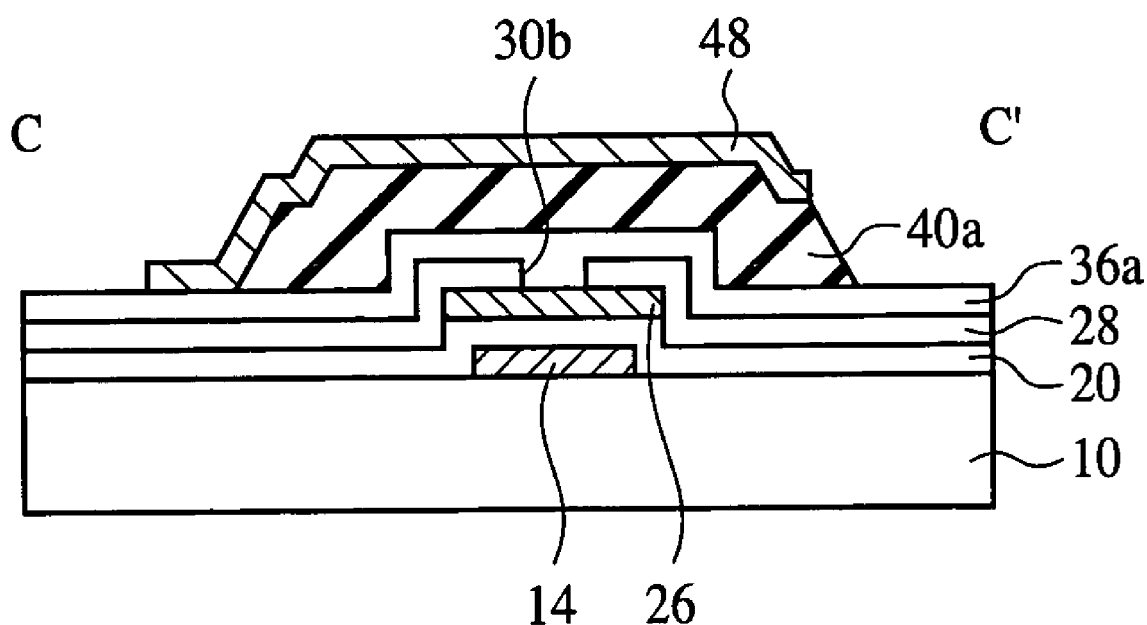
FIG. 17 is a sectional view of the liquid crystal display according to the third embodiment of the present invention.

The liquid crystal display according to a third embodiment of the present invention will be explained with reference to FIGS. 16A to 19B. FIGS. 16A and 16B are plan views of the liquid crystal display according to the present embodiment (Part 1). In FIG. 16A, the insulation layer and the reflection electrode are omitted, and in FIG. 16B, the insulation layer and the reflection electrode are illustrated. FIG. 17 is a sectional view of the liquid crystal display according to the present embodiment. FIG. 17 is the sectional view along the line C–C' in FIG. 16B. FIGS. 18A and 18B are plan views of the liquid crystal display according to the present embodiment (Part 2). FIG. 18A illustrates a TFT substrate, and FIG. 18B illustrates a CF substrate in the region illustrated in FIG. 18A. FIGS. 19A and 19B are plan views of the liquid crystal display according to the present embodiment (Part 3). FIG. 19A illustrates the TFT substrate, and FIG. 19B illustrates the CF substrate in the region illustrated in FIG. 19A. The same members of the present embodiment as those of the liquid crystal display according to the first or the second embodiment shown in FIG. 1A to 15 are represented by the same reference numbers not to repeat or to simplify their explanation.

The liquid crystal display according to the present embodiment is characterized mainly in that reflection electrodes 48 are formed on the solid portions 36a of an electrode unit 34 forming a transmission electrode 32 each with an island-shaped insulation layer 40a formed therebetween, which has convexities 42a, 42b formed in the surface thereof.

First, the TFT substrate 2b will be explained.

As in the first and the second embodiments, a plurality of gate bus lines 12a, 12b are formed on a glass substrate 10.

A Cs bus line 14 is formed between one gate bus line 12a and the other gate bus line 12b. The gate bus lines 12 and the Cs bus line 14 are formed of the one and the same conduction film.

A gate insulation film 20 is formed on the glass substrate 10 with the gate bus lines 12 and the Cs bus line formed on.

A channel layer 22 of silicon thin film is formed on the gate bus lines 12 with the gate insulation film 20 formed therebetween. A source electrode 24a and a drain electrode 24b are formed on both side of the channel layer 22.

A Cs opposed electrode (intermediate electrode) 26 is formed on the Cs bus line 14 with the gate insulation film 20 formed therebetween. The Cs opposed electrode 26 is formed of one and the same conduction film as the gate bus lines 12, and the source electrode 24a and the drain electrode 24b.

On the gate insulation film 20, a plurality of data bus lines 28 are formed, substantially perpendicularly intersecting the gate bus lines 12 and the Cs bus lines 14.

An insulation film 29 is formed on the glass substrate 10 with the data bus lines 28, the source electrode 24a, the drain electrode 24b and the Cs opposed electrode 26 formed on.

A contact hole 30b and a contact hole 30a are formed in the insulation film 29 respectively down to the Cs opposed electrode 26 and the drain electrode 24b.

A transmission electrode 32 of ITO film is formed on the insulation film 29. The transmission electrode 32 includes three electrode units 34. In the present embodiment, the transmission electrode 32 includes three electrode units 34, but the number of the electrode units 34 is not limited to three. For example, the number of the electrode units 34 of the transmission electrode 32 can be one or two, or four or more.

The electrode units 34 are interconnected with each other by interconnection patterns 38a. An interconnection pattern 38b for electrically interconnecting the electrode unit 34a and the drain electrode of the thin film transistor 18 is formed in the electrode unit 34a near the thin film transistor 18. The interconnection pattern 38b is formed integral with the electrode unit 34a. The electrode unit 34a formed near the thin film transistor 18 is connected to the drain electrode 24b through the contact hole 30a formed in the insulation film 29. As shown in FIG. 17, the electrode unit 34b formed above the Cs bus line 14 is connected to the intermediate electrode 26 through the contact hole 30b formed in the insulation film 29.

In the two electrode units 34a, 34b of the three electrode units 34a–34c, insulation layers 40a are formed on the solid portions 36a. An average of the thicknesses of the insulation layers 40a is, e.g., about 2 µm. As shown in FIGS. 18A and 18B, convexities 42a, 42b are formed in the surfaces of the insulation layers 40a. That is, in the surface of each insulation layers 40a, the streaks of the convexities (horizontal wrinkles) 42b which are substantially parallel with the longitudinal direction of the gate bus lines 12, and the streaks of the convexities (perpendicular wrinkles) 42a which are substantially perpendicular to the longitudinal direction of the gate bus lines 12 are formed.

In the present embodiment, the island-shaped insulation layers 40a are formed on the two electrode units 34a, 34b of the three electrode units 34a–34c. However, the island-shaped insulation layers 40a may be formed on all the electrode units 34a–34c to form the reflection electrodes 48. It is possible to form the island-shaped insulation layer 40a on one of the three electrode units 34a–34c to form the reflection electrode 48.

The insulation layer 40a formed above the Cs bus line 14 has projected portions 41 which are projected along the Cs bus line. The projected portions 41 are formed integral with the insulation layer 40a.

The reflection electrodes 48 are formed on the insulation layers 40a. In the edge portions of each insulation layer 40a, there is a region where the reflection electrode 48 is not formed. An interconnection pattern 50 is formed near the center line of the reflection electrodes 48. The interconnection pattern 50 electrically interconnects the reflection electrodes 48 to the transmission electrode 32. The interconnection pattern 50 of the reflection electrodes 48 and the electrode units 34 are interconnected with each other near the edges of the insulation layers 40a.

The reflection electrode 48 positioned above the Cs bus line 14 has projected portions 49 which are projected above the Cs bus line 14 from the solid portion 36a. The projected portion 49 are formed on the Cs bus line 14 with the projected portions 41 of the insulation layer 40a formed therebetween. The reflection electrode 48 has the projected portions 49 so as to utilize as a reflection part the region with the Cs bus line 14 formed in, which can not function as a transmission part. Thus, the reflective transmission type liquid crystal display of higher reflectivity can be provided.

The transmission electrode 32 and the reflection electrodes 48 constitute a picture element electrode 52. The pixel electrode 52 includes three sub-pixels 35d–35f (see FIG. 16B). The reflection electrodes 48 are formed above the solid portions 36a of two sub-pixels 35d, 35e of the three sub-pixels 35d–35f. In these two sub-pixels 35d, 35e, wherein the reflection electrodes 48 are formed above the solid portions 36a while the reflection electrodes 48 are not formed around the solid portions 36a, the solid portions 36a function as the reflection part, and the regions around the solid portions 36a function as the transmission part. The reflection electrode 48 is not formed in one sub-pixel 35f of the three sub-pixels 35d–35f. The whole sub-pixel 35f, in which the reflection electrode 48 is not formed, functions as the transmission part.

Thus, the TFT substrate 2b is constituted.

Then, the CF substrate 4b will be explained with reference to FIGS. 18A to 19B.

A black matrix layer 62b is formed below the glass substrate 58 (see FIG. 5). The black matrix layer 62b is formed above the gate bus lines 12, the data bus lines 28 and the thin film transistor 18.

A color filter layer 62 is formed below the glass substrate 58 with the black matrix layer 62b formed on. Openings 64a are formed in the color filter layer 62 in the regions above the reflection electrodes 48. The openings 64a is for preventing the color density of the reflection display from being much higher than the color density of the transmission display, as does the opening 64 formed in the color filter layer 62 of the liquid crystal display according to the first embodiment. A planarization layer 66 (see FIG. 5) of a transparent resin is formed below the color filter layer 62.

An opposed electrode 68 (see FIG. 5) of ITO is formed below the planarization layer 66.

Alignment control structures 70b are formed below the opposed electrode 68. The alignment control structures 70b have, e.g., a quadrangular (rhombic) plane shape. The alignment control structures 70b are positioned above the centers of the respective electrode units 34. The thickness of the alignment control structures 70b is, e.g., about 2 µm.

Thus, the CF substrate 4b is constituted.

The liquid crystal display according to the present embodiment is characterized mainly in that the reflection electrodes 48 are formed on the solid portions 36a of the electrode units 34 with the insulation layers 40a with the convexities lines 42a, 42b formed in the surface thereof.

In the present embodiment, in which the reflection electrodes 48 are not formed on the gate bus lines 12 and the data bus lines 28, the generation of large capacitances between the gate bus liens 12 and the data bus liens 28, and the reflection electrodes 48 can be prevented. Thus, the liquid crystal display according to the present embodiment can have good display quality, as does the liquid crystal display according to the first and the second embodiments.

The liquid crystal display according to the present embodiment is characterized mainly in that the reflection electrodes 48 are formed not only above the solid portions 36a, but also above the Cs bus line 14.

The Cs bus line 14 is formed of a material which cannot transmit light, and the region where the Cs bus line 14 is formed cannot be the transmission part. In the present embodiment, the reflection electrode 48 is formed above the Cs bus line 14, which permits the region which cannot function as the transmission part to be utilized as the reflection part. Thus, the present embodiment can improve the reflection efficiency.

(Modifications)

Figure 20A:
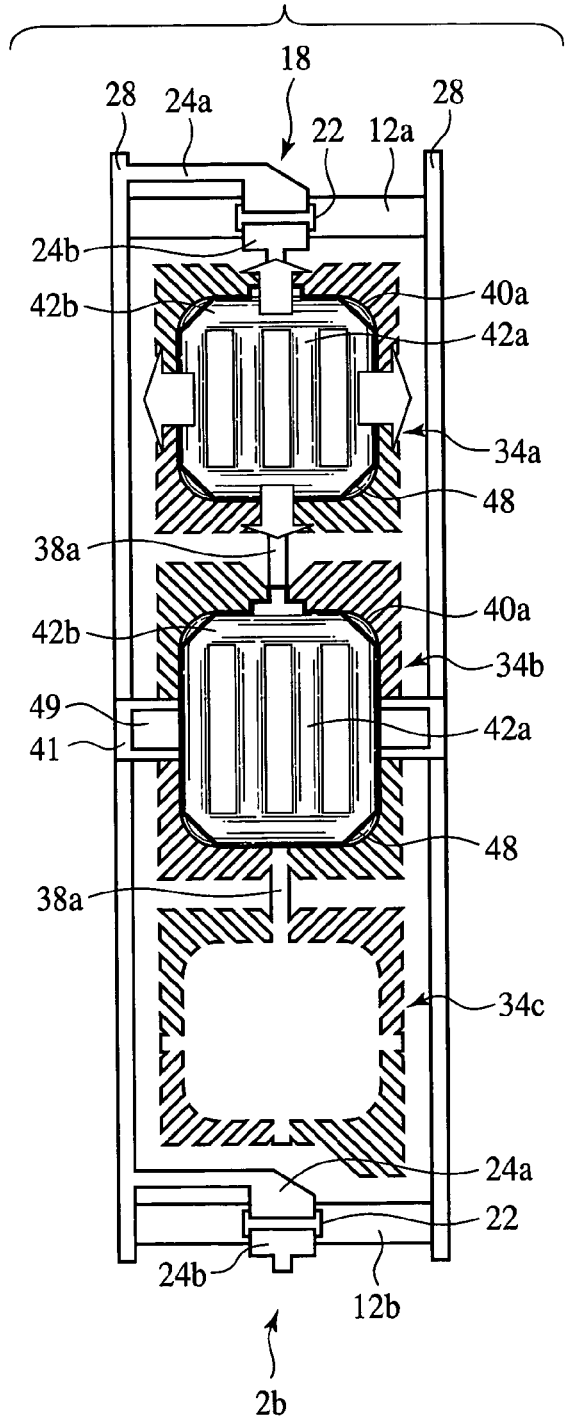
FIGS. 20A and 20B are plan views (Part 1) of the liquid crystal display according to a modification of the third embodiment of the present invention.
Figure 20B:
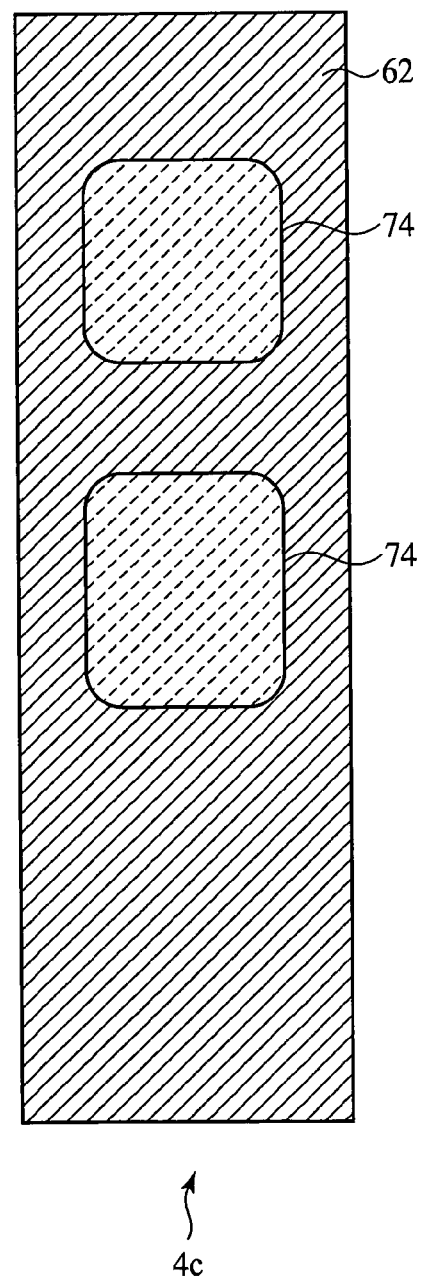

Next, a modification of the liquid crystal display according to the present embodiment will be explained with reference to FIGS. 20A and 21B. FIGS. 20A and 20B are plan views of the liquid crystal display according to the present modification (Part 1). FIG. 20A illustrates the TFT substrate, and FIG. 20B illustrates the CF substrate in the region illustrated in FIG. 20A. FIGS. 21A and 21B are plan views of the liquid crystal display according to the present modification (Part 2). FIG. 21A illustrates the TFT substrate, and FIG. 21B illustrates the CF substrate in the region illustrated in FIG. 21A.

The liquid crystal display according to the present modification is characterized mainly in that the color filter layer 62 has the thickness reduced in the region above the reflection electrode 48.

First, the TFT substrate 2b is the same as the TFT substrate of the liquid crystal display described above with reference to FIGS. 16A, 17, 18 and 19A, and its explanation will be omitted.

Next, the CF substrate 4c will be explained.

Island-shaped transparent resin layers 74 (see FIG. 12) are formed respectively above the regions where the reflection electrodes 48 are formed. The thickness of the transparent resin layers 74 is, e.g., about 0.8 μm. The transparent resin layers 74 are for partially reducing the thickness of the color filter layer 62, as does in the liquid crystal display described above with reference to FIG. 12.

A color filter layer 62 is formed on the underside of the glass substrate 58 (see FIG. 12) with the transparent resin layers 74 formed on. The surface of the substrate is planarized with the color filter layer 62. Because of the transparent resin layers 74 formed in the regions above the reflection electrodes 48, the thickness of the color filter layer 62 in the regions which function as the reflection part is smaller than the thickness of the color filter layer 62 which functions as the transmission part. The thickness of the color filter layer 62 in the region which functions as the transmission part is, e.g., about 1.4 μm. The thickness of the color filter layer 62 in the region which functions as the reflection part is, e.g., about 0.7 μm. The thickness of the color filter layer 62 in the region which functions as the reflection part is made smaller so as to prevent the color density of the reflection display from being much higher than the color density of the transmission display.

In the present modification, in which the thickness of the color filter layer 62 above the reflection electrodes 48 is reduced, the color density of the reflection display is prevented from being much larger than the color density of the transmission display. Thus, the liquid crystal display according to the present modification can have high display quality.

[A Fourth Embodiment]

Figure 22:
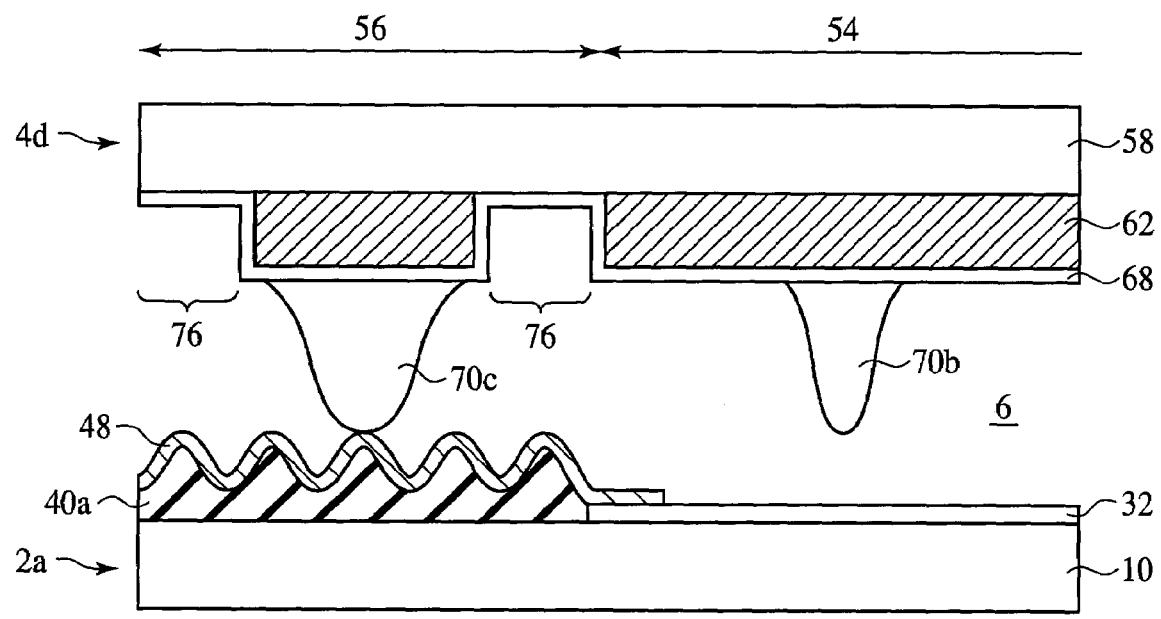
FIG. 22 is a sectional view of the liquid crystal display according to a fourth embodiment of the present invention.
Figure 23A:
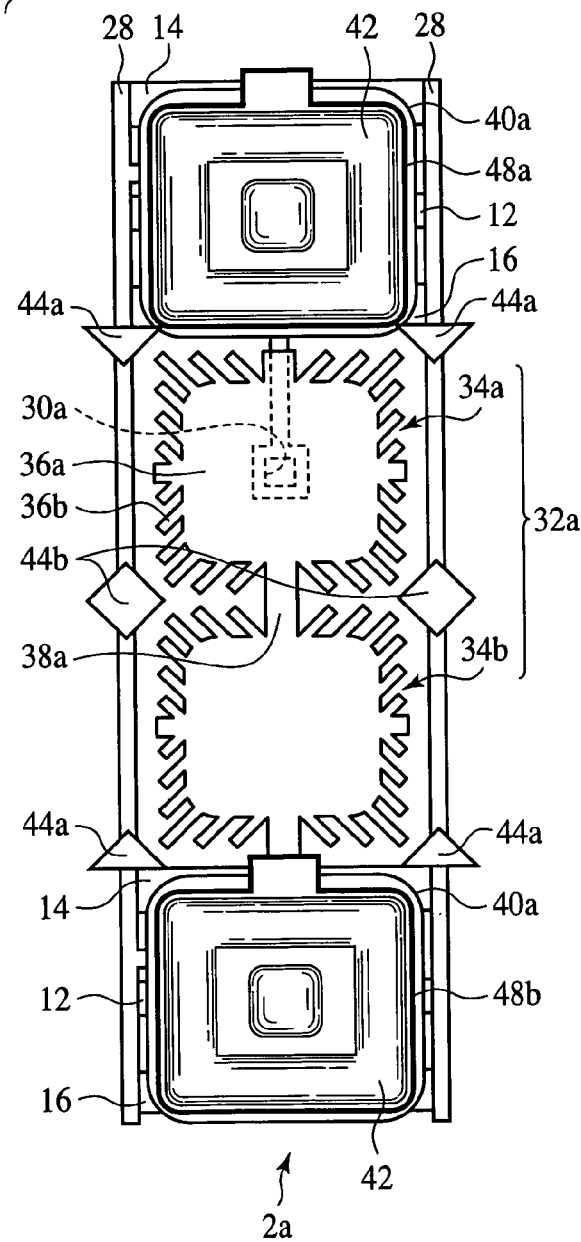
FIGS. 23A and 23B are plan views of the liquid crystal display according to the fourth embodiment of the present invention.
Figure 23B:
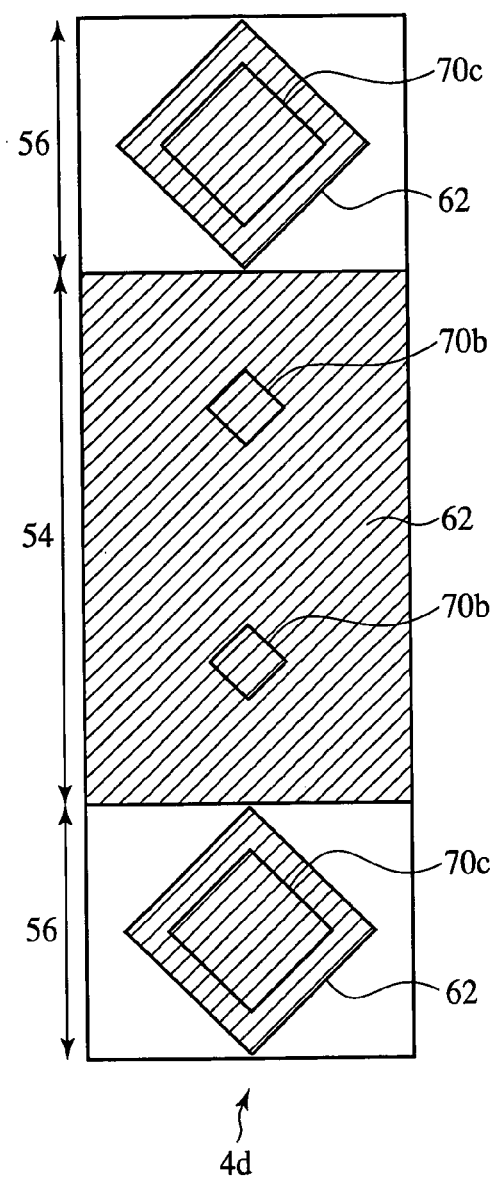

The liquid crystal display according to a fourth embodiment of the present invention will be explained with reference to FIGS. 22 to 23B. FIG. 22 is a sectional view of the liquid crystal display according to the present embodiment. FIGS. 23A and 23B are plan views of the liquid crystal display according to the present embodiment. FIG. 23A illustrates a TFT substrate, and FIG. 23B illustrates a CF substrate in the region illustrated in FIG. 23A. The same members of the present embodiment as those of the liquid crystal display according to the first to the third embodiment shown in FIGS. 1A to 21B are represented by the same reference numbers not to repeat or to simplify their explanation.

The liquid crystal display according to the present embodiment is characterized mainly in that alignment control structures 70c are formed below the central part of a color filter layer 62 of a reflection part 56, and the color filter layer 62 is not formed in the region of the reflection part 56 other than the central part.

First, the TFT substrate 2a is the same as the TFT substrate used in the second embodiment, and its explanation will be omitted.

Next, a CF substrate 4d will be explained.

The color filter layer 62 is formed below a glass substrate 58. The color filter layer 62 is formed all in the transmission part 54 and at the central part of the reflection part 56. The color filter layer 62 in the region other than the central part of the reflection part 56 is removed. That is, an opening 76 is formed in the color filter layer 62 in the region of the reflection part 56 other than the central part. The opening 76 is formed in the color filter layer 62 in the reflection part 56 so as to prevent the color density of the reflection part 56 from being much higher than the color density of the transmission part 54. The color filter layer 62 in the reflection part 56 has a quadrangular (rhombic) plane shape. The diagonals of the quadrangular color filter layer 62 formed in the reflection part 56 are substantially parallel with the gate bus lines 12 or the data bus line lines 28. The thickness of the color filter layer 62 is, e.g., about 2 μm.

Alignment control structures 70c are formed below the color filter layer 62. The alignment control structures 70c are formed respectively at the centers of the sub-pixels 35a–35c. That is, the alignment control structures 70c are formed above the centers of the reflection electrodes 48. Alignment control structures 70b are formed respectively above the centers of the electrode units 34a, 34b. The alignment control structures 70b, 70c have, e.g., a quadrangular (rhombic) plan shape. The diagonals of the quadrangular sectional are substantially parallel with the gate bus lines 12 or substantially parallel with the data bus lines 28. The height of the alignment control structures 70b, 70c is, e.g., about 2 μm.

The alignment control structures 70c formed in the reflection part 56 are in contact with the reflection electrodes 48 formed on the insulation layer 40a. Thus, the thickness of the insulation layer 40a, the height of the alignment control structures 70c and the thickness of the color filter layer 62 retain the thickness of the liquid crystal layer 6. The insulation layer 40a, the alignment control structures 70c and the color filter layer 62 function also as the spacer.

The height of the alignment control structures 70c is, e.g., about 2 μm as described above. The thickness of the liquid crystal layer 6 near the central part of the reflection part 56 is about 2 μm.

The height of the alignment control structures 70c is about 2 μm as described above, and the thickness of the color filter layer 62 is, e.g., about 2 μm as described above. The thickness of the liquid crystal layer 6 is about 4 μm in the region of the reflection part 56 other than the central part thereof.

The height of the alignment control structures 70c is about 2 μm as described above. The thickness of the insulation layer 6 is about 2 μm. Accordingly, in the transmission part 54, the thickness of the liquid crystal layer 6 is about 4 μm.

As described above, the thickness of the liquid crystal layer 6 in the region of the reflection part 56 except the central part thereof is substantially equal to the thickness of the liquid crystal layer 6 in the transmission part 54.

The liquid crystal display according to the present embodiment is characterized mainly in that the color filter layer 62 is formed at the central part of the reflection part 56, and the color filter layer 62 is not formed in the region of the reflection part 56 except the central part.

According to the present embodiment, in which the color filter layer 62 is formed at the central part of the reflection part 56, and the color filter layer 62 is not formed in the region of the reflection parts 56 except the central part, the area ratio between the region, where the color filter layer 62 is formed and the region, where the color filter layer 62 is not formed is suitably set to thereby adjust the color density of the reflection part 56. Thus, the present embodiment can prevent the color density of the reflection part 56 from being much higher than the color density of the transmission part 54, which can make the color density of the transmission part 54 and the color density of the reflection part 56 substantially equal to each other.

Furthermore, according to the present embodiment, one and the same color filter layer 62 used in the transmission part 54 may be used in the reflection part 56, which makes it unnecessary to form the planarization layer of a transparent resin on the CF substrate 4*d*. This can contribute to reducing the cost.

The liquid crystal display according to the present embodiment is also characterized mainly in that the alignment control structures 70*c* are formed below the color filter layer 62 at the central part of the reflection electrode 48.

According to the present embodiment, the voltage applied to the liquid crystal layer 6 can be partially decreased by the alignment control structure 70*c*, which can adjust conditions for the phase difference of the liquid crystal layer 6.

[A Fifth Embodiment]

Figure 24:
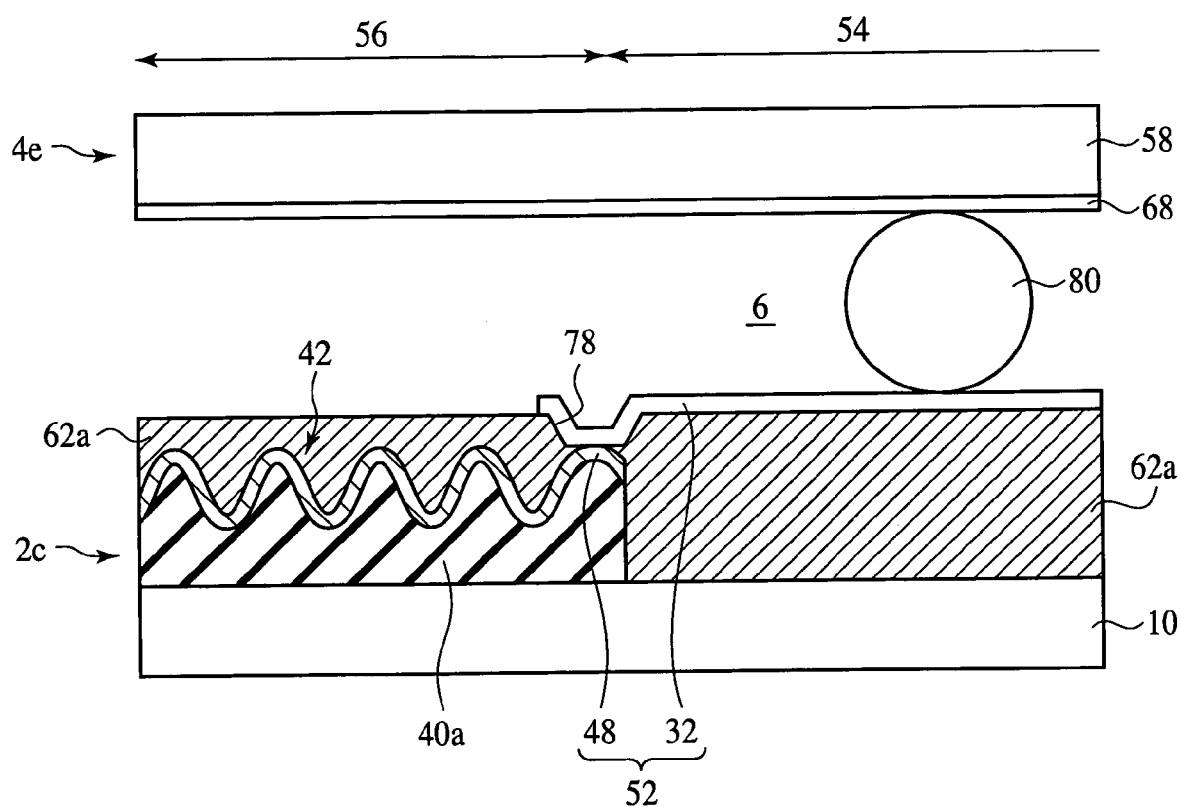
FIG. 24 is a sectional view of the liquid crystal display according to a fifth embodiment of the present invention.
Figure 25A:
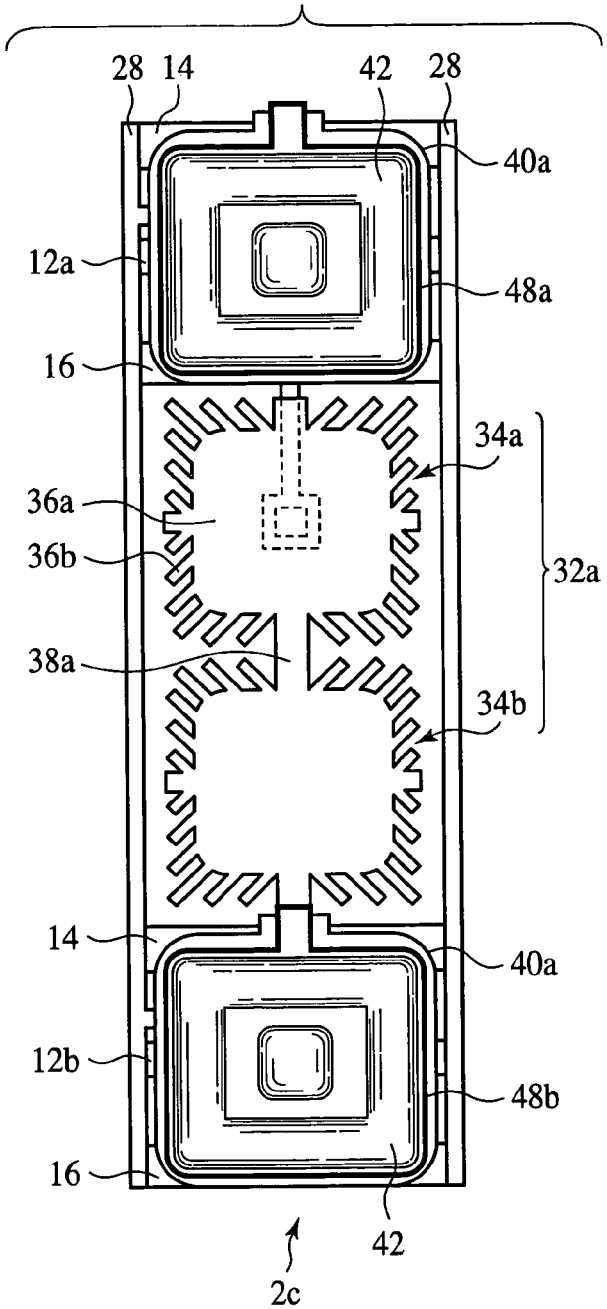
FIGS. 25A and 25B are plan views of the liquid crystal display according to the fifth embodiment of the present invention.
Figure 25B:
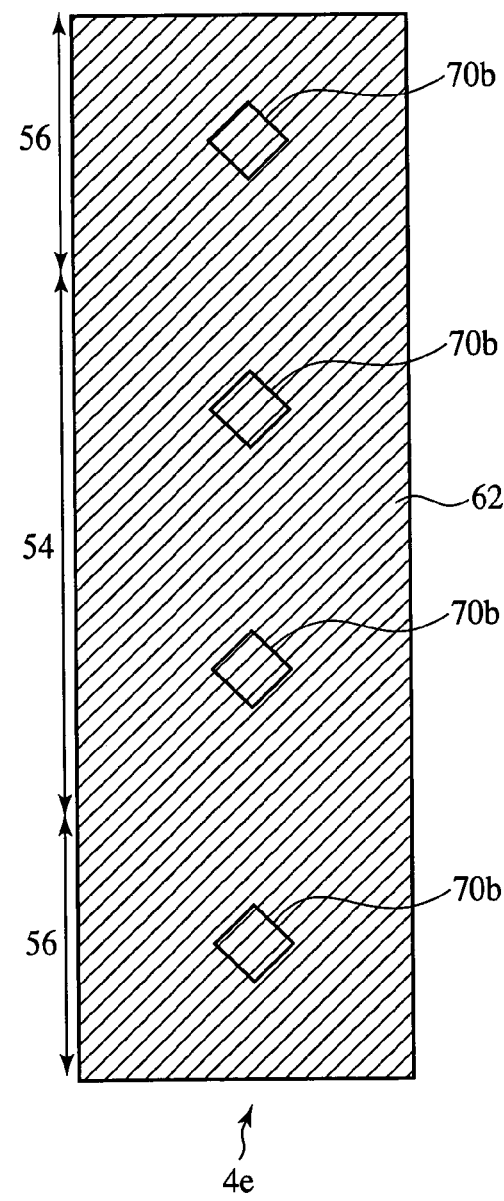

The liquid crystal display according to a fifth embodiment of the present invention will be explained with reference to FIGS. 24 to 25B. FIG. 24 is a sectional view of the liquid crystal display according to the present embodiment. FIGS. 25A and 25*b* are plan views of the liquid crystal display according to the present embodiment. FIG. 25A illustrates a TFT substrate. FIG. 25B illustrates a CF substrate in the region illustrated in FIG. 25A. The same members of the present embodiment as those of the liquid crystal display according to the first to the fourth embodiments shown in FIGS. 1A to 23B are represented by the same reference numbers not to repeat or to simplify their explanation.

The liquid crystal display according to the present embodiment is characterized mainly in that a color filter layer 62*a* is formed on reflection electrodes 48 and below transmission electrodes 32, and the thickness of the color filter layer 62*a* on the reflection electrodes 48 is larger than the thickness of the color filter layer 62*a* below the transmission electrodes 32.

First, the TFT substrate 2*c* will be explained.

Insulation layers 40*a* are formed in reflection parts 56 on a glass substrate 10. Convexities lines 42, for example, are formed concentrically in the surface of the insulation layers 40*a*. The thickness of the insulation layers 40*a* is, e.g., about 1 µM.

A reflection electrode 48 is formed on each insulation layer 40*a*. The reflection electrode 48 is formed on the insulation layer 40*a* with the convexities 42 formed in, and the convexities 42 are accordingly formed also in the surface of the reflection electrode 48.

A color filter layer 62*a* is formed on the reflection electrode 48 and the glass substrate 10. The surface of the substrate is planarized with the color filter layer 62*a*. The thickness of the color filter layer 62*a* in the transmission part 54 is, e.g., about 2 µm. The color filter layer 62*a*, which is formed, planarizing the substrate surface, has, e.g., an about 1 µm-thickness in the reflection parts 56. As described above, in the reflection part 56, light twice passes through the color filter layer 62, and in the transmission part 54, light once passes through the color filter layer 62, but the thickness of the color filter layer 62*a* in the reflection part 56 is set at about ½ of the thickness of the color filter layer 62*a* in the transmission part 54, whereby the color density of the reflection part 56 can be made substantially equal to the color density of the transmission part 54.

A contact hole 78 is formed in the color filter 62*a* down to the edge of the reflection electrode 48.

A transmission electrode 32 is formed on the color filter layer 62*a* of the transmission part 54. The transmission electrode 32 is connected to the reflection electrode 48 through the contact hole 78. The transmission electrode 32 is formed near the contact hole 78 but is not formed above the reflection electrode 48. The reflection electrode 48 and the transmission electrode 32 constitute a pixel electrode 52.

Thus, the TFT substrate 2*c* is constituted.

Then, an opposed substrate 4*e* provided, opposed to the TFT substrate 2*c* will be explained.

An opposed electrode 68 is formed below the glass substrate 58.

Alignment control structures 70*b* are formed below the opposed electrode 68. The alignment control structures 70*b* are formed respectively above the central part of the reflection electrode 48 and above the central parts of the electrode units 34.

Thus, the opposed substrate 4*e* is constituted.

A spacer 80 is provided between the TFT substrate 2*c* and the opposed substrate 4*e*. The size of the spacer 80 is, e.g., an about 4 µm-diameter. A liquid crystal layer 6 is sealed between the TFT substrate 2*c* and the opposed substrate 4*e*.

Thus, the liquid crystal display according to the present embodiment is constituted.

The liquid crystal display according to the present embodiment is characterized mainly in that, as described above, the color filter layer 62*a* is formed on the reflection electrode 48 and below the transmission electrode 32, and the thickness of the color filter layer 62*a* on the reflection electrode 48 is smaller than the thickness of the color filter layer 62*a* below the transmission electrode 32.

In the reflection part 56, light which has passed through the color filter layer is reflected by the reflection electrode 48 to again pass through the color filter layer. In the case that the color filter layer has the same thickness in the reflection part 56 as in the transmission part 54, the color density of the reflection part 56 is much higher than the color density of the transmission part 54.

The present embodiment, in which the thickness of the color filter layer 62*a* on the reflection electrode 48 is smaller than the thickness of the color filter layer 62*a* below the transmission electrode 32, more specifically the thickness of the former is set at about ½ of the thickness of the latter, the color density of the reflection part 56 is prevented from being much higher than the color density of the transmission part 54.

In the present embodiment, in which the color filter layer 62*a* is formed on the reflection electrode 48, the voltage applied to the liquid crystal layer 6 of the reflection part 56 can be decreased by the color filter layer 62*a* present on the reflection electrode 48. Thus, the thickness of the color filter layer 62*a* on the reflection electrode 48 is suitably set, whereby conditions for the phase difference between the reflection part 56 and the transmission part 54 can be matched.

According to the present embodiment, in which the surface of the TFT substrate 2c is planarized by the color filter layer 62a, the spacer 80 for the universal use is disposed between the TFT substrate 2c and the opposed substrate 4e, whereby the thickness of the liquid crystal layer 6 can be retained. That is, according to the present embodiment, the thickness of the liquid crystal layer 6 can be retained by the simple means.

(Modification)

Figure 26:
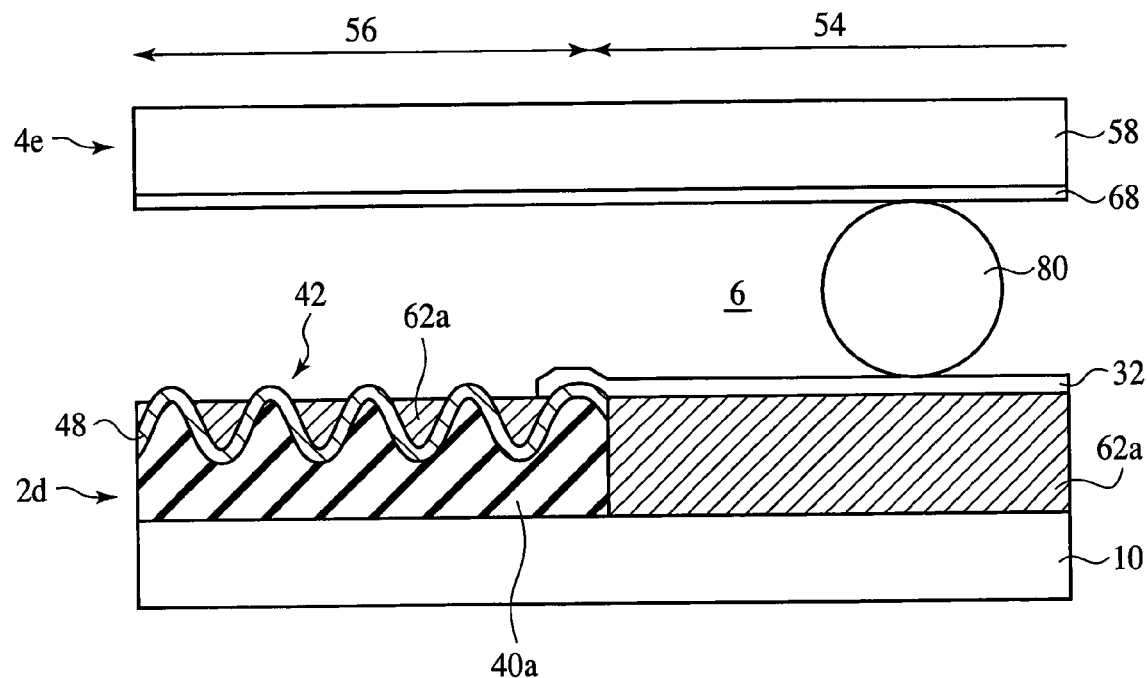
FIG. 26 is a sectional view of the liquid crystal display according to a modification of the fifth embodiment of the present invention.

Next, a modification of the liquid crystal display according to the present embodiment will be explained with reference to FIGS. 26 to 27B. FIG. 26 is a sectional view of the liquid crystal display according to the present modification. FIGS. 27A and 27B are plan views of the liquid crystal display according to the present modification. FIG. 27A illustrates the TFT substrate, and FIG. 27B illustrates the CF substrate in the region illustrated in FIG. 27A.

The liquid crystal display according to the present modification is characterized mainly in that the reflection electrode 48 with the convexities 42 formed in the surface is partially exposed from the color filter layer 26a.

First, the TFT substrate 2d will be explained.

In the present modification, the average thickness of the insulation layer 40a is about 2 μm. When the thickness of the insulation layer 40a is twice, the height difference between the convexities 42 is substantially twice. In the present modification, the thickness of the insulation layer 40a is substantially twice the thickness of the insulation layer 40a of the liquid crystal display shown in FIG. 24, and the height difference between the convexities 42 is substantially twice the height difference between the convexities lines 42 of the insulation layer 40a of the liquid crystal display shown in FIG. 24.

The reflection electrode 48 is formed on the insulation layer 40a.

A color filter layer 62a is formed on the reflection electrode 48 and on the glass substrate 10. The surface of the substrate is planarized with the color filter layer 62a. The thickness of the color filter layer 62a is about 2 μm. In the present modification, in which the convexities 42 formed in the surface of the insulation layer 40a is large, the average thickness of the color filter layer 62a present on the reflection electrode 48 is about 1 μm. As described above, in the reflection part 56, light twice passes through the color filter 62a, and in the transmission part 54, light once passes through the color filter layer 62a, but the average thickness of the color filter layer 62a in the reflection part 56 is about ½ of the thickness of the color filter layer 62a in the transmission part 54, which can make the color density in the reflection part 56 to be substantially equal to the color density in the transmission part 54.

The transmission electrode 32 is formed on the color filter layer 62a of the transmission part 54. The transmission electrode 32 is connected to the reflection electrode 48 at the end thereof. A part of the reflection electrode 48 is exposed from the color filter layer 62a, which permits the transmission electrode 32 and the reflection electrode 48 to be interconnected with each other without forming the contact hole 78 (see FIG. 24) in the color filter layer 62a.

The liquid crystal display according to the present modification is characterized mainly in that the reflection electrode 48 is partially exposed from the color filter layer 62a.

According to the present modification, the transmission electrode 32 and the reflection electrode 48 can be interconnected with each other without forming the contact hole in the color filter layer 62a, which can simplify the fabrication steps.

[A Sixth Embodiment]

Figure 28A:
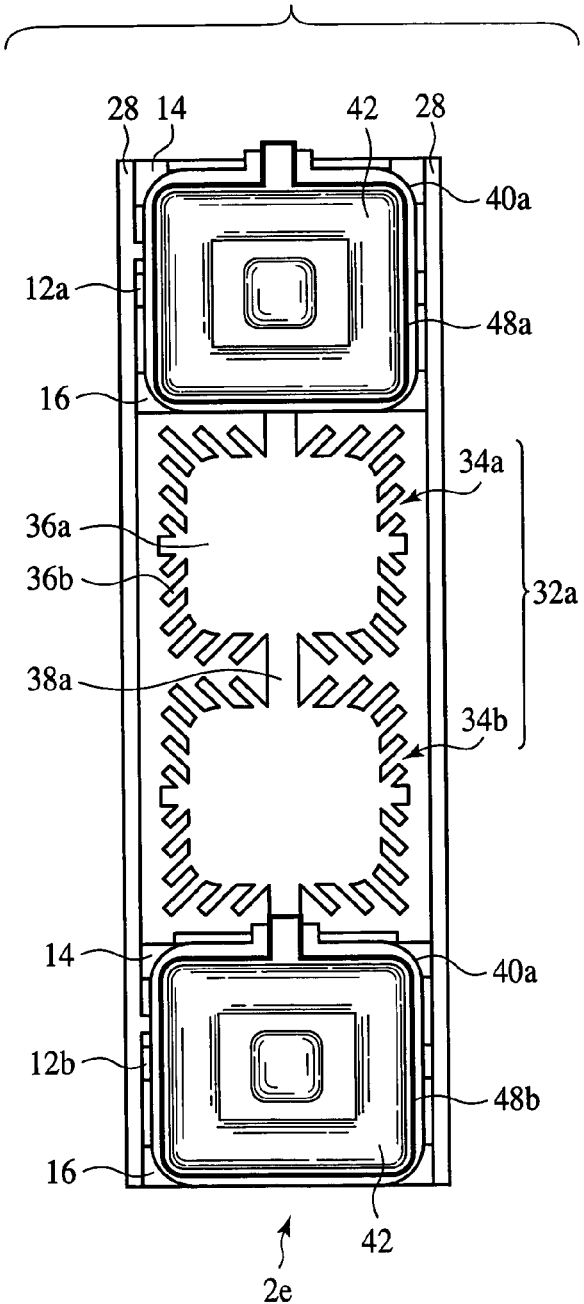
FIGS. 28A and 28B are plan views (Part 1) of the liquid crystal display according to a sixth embodiment of the present invention.
Figure 28B:
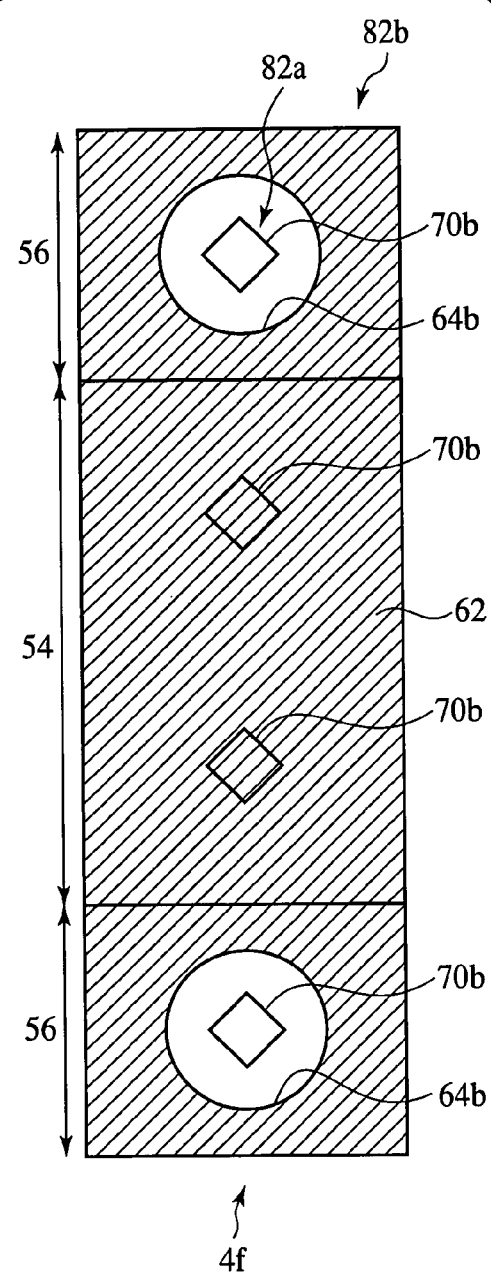
Figure 29:
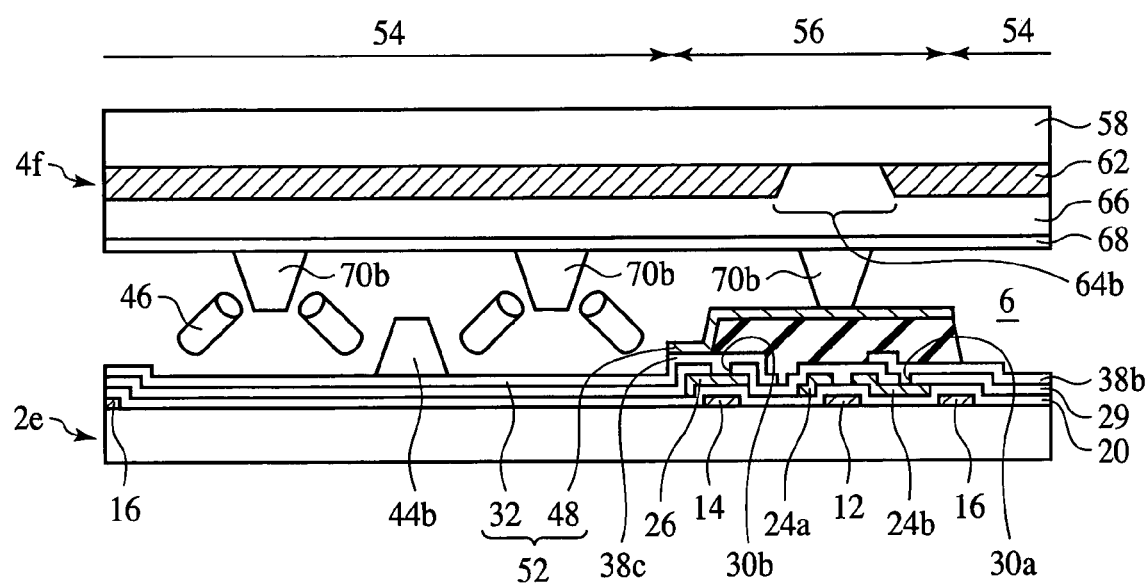
FIG. 29 is a sectional view of the liquid crystal display according to the sixth embodiment of the present invention.

The liquid crystal display according to a sixth embodiment of the present invention will be explained with reference to FIGS. 28A to 32C. FIGS. 28A and 28B are plan views of the liquid crystal display according to the present embodiment (Part 1) FIG. 28A illustrates a TFT substrate, and FIG. 28B is a CF substrate in the region illustrated in FIG. 28A. FIG. 29 is a sectional view of the liquid crystal display according to the present embodiment. The same members of the present embodiment as those of the liquid crystal display according to the first to the fifth embodiments illustrated in FIGS. 1A to 27B are represented by the same reference numbers not to repeat or to simplify their explanation.

The liquid crystal display according to the present embodiment is characterized mainly in that a non-colored region 82a of a reflection part 56 is selectively arranged so that the exit direction of light reflected by the non-colored region 82a of the reflection part 56 and the exit direction of light reflected by a colored region 82b of the reflection part 56 can be substantially the same. That is, the region (non-colored region) 82a of the reflection part 56, where a color filter layer 62 is not formed is selectively arranged so that the directivity of the reflection intensity in the non-colored region 82a can be substantially equal to the directivity of the reflection intensity in the region (colored region) 82b of the reflection part 56, where the color filter layer is formed.

First, a TFT substrate 2e will be explained.

On a glass substrate 10, an island-shaped insulation layer 48a is formed in the reflection part 56. The insulation layer 48a has, e.g., a quadrangular plane shape. Convexities 42 are formed concentrically in the surface of the insulation layer 48a. The convexities 42 have a quadrangular pattern. The direction, shape, etc. of the convexities 42 are much influenced by a balance of stresses exerted when the insulation layer 48a is solidification shrunk. Most of the directions of the convexities formed in the surface of the insulation layer 40a are substantially in parallel with or substantially perpendicular to the longitudinal direction of gate bus lines 12. The streaks of the convexities which are directed substantially perpendicular to the longitudinal direction of the gate bus lines 12 are called the perpendicular wrinkles. The streaks of the convexities which are substantially parallel with the longitudinal direction of the gate bus lines 12 are called the horizontal wrinkles.

In the present embodiment, the convexities are formed in the surface of the insulation layer 40a in the form of wrinkles but are not essentially wrinkles. The convexities may be formed in the surface of the insulation layer 40a by, e.g., patterning an insulation layer by photolithography, etc.

A reflection electrode 48, for example, is formed on the insulation layer 40a. The reflection electrode 48 is formed of, e.g., aluminum. The reflection electrode 48 of aluminum can be formed by, e.g., sputtering. The reflection electrode 48 is formed on the insulation layer 40a with the convexities 42 formed concentrically in the surface, and the concentric convexities 42 are reflected to be formed concentrically also in the surface of the reflection electrode 48. Accordingly, the streaks of the convexities which are substantially perpendicular to the longitudinal direction of the gate bus lines 12, and the streaks of the convexities which are substantially parallel with the longitudinal direction of the gate bus lines are formed. The declination direction of the declined planes of the convexities 42 which are substantially perpendicular to the longitudinal direction of the gate bus lines 12 substantially agrees with the longitudinal direction of the gate bus lines 12. The declination direction of the declined planes of the streaks of the convexities 42 which are substantially parallel with the longitudinal direction of the gate bus lines 12 substantially agrees with the direction substantially perpendicular to the longitudinal direction of the gate bus lines 12. Such convexities 42 in present the surface of the reflection electrode 48 gives directivity of the reflection intensity in the azimuth direction or the polar angle direction. For example, light incident from the left and right of the screen of the liquid crystal display and light incident from above and below the screen of the liquid crystal display are caused to exit at the front surface of the liquid crystal display at high light intensities.

Thus, the TFT substrate 2e is constituted.

Then, a CF substrate 4f will be explained.

A color filter layer 62 is formed on the side of the CF substrate 4f. An opening 64b is formed in the color filter layer 62 at the center of a reflection part 56. The opening 64b is formed in, e.g., a circle, an ellipse, a quadrangle (rhombic) or other shapes. The region of the reflection part 56, where the color filter layer 62 is not formed, i.e., the region where the opening 64b is formed is called the non-colored region 82a. The region of the reflection part 56, where the color filter layer 62 is formed, i.e., the region where the opening 64b is not formed is called the colored region 82b. The area ratio between the non-colored region 82a and the colored region 82b is, e.g., 1:4.

Convexities 42 are formed concentrically in the surface of the reflection electrode 48, and the non-colored region 82a is positioned at the center of the reflection electrode 48. Accordingly, the presence ratio of the perpendicular wrinkles and the horizontal wrinkles in the non-colored region 82a of the reflection part 56 and the present ratio of the perpendicular wrinkles and the horizontal wrinkles in the colored region 82b of the reflection part 56 are substantially equal to each other. Thus, the exit direction of light reflected in the non-colored region 82a and the exit direction of light reflected by the colored region 82b are substantially the same. That is, the directivity of the reflection intensity in the non-colored region 82a and the directivity of the reflection intensity in the colored region 82b are substantially the same.

An alignment control structure 70b is formed in the region above the center of the reflection electrode 48. Alignment control structures 70b are formed on the CF substrate 4f respectively in the regions above the centers of the slid portions 36a of the transmission electrode 32. The alignment control structures 70b has, e.g., a quadrangular (rhombic) plane shape.

Thus, the liquid crystal display according to the present embodiment is constituted.

The liquid crystal display according to the present embodiment is characterized mainly in that the non-colored region 82a is selectively arranged so that the exit direction of light reflected by the non-colored region 82a and the exit direction of light reflected by the colored region 82b can be substantially the same.

The non-colored region 82a can be arranged in the reflection part 56 so as to prevent the color density of he reflection part 56 from being such higher than the color density of the transmission part 54. However, the exit direction of light reflected by the non-colored region 82a and the exit direction of light reflected by the colored region 82b are often different from each other, but the color regeneration range is often small.

However, in the present embodiment, the concentric convexities 42 are formed in the reflection electrode 48, and the non-colored region 82b is arranged at the central part of the reflection part 56, whereby the presence ratio between the perpendicular wrinkles and the horizontal wrinkles in the non-colored region 82a of the reflection part 56 and the present ratio between the perpendicular wrinkles and the horizontal wrinkles in the colored region 82b of the reflection part 56 can be made substantially the same. Accordingly, the exit direction of light reflected by the non-colored region 82a and the exit direction of light reflected by the colored region 82b can be made substantially the same. That is, the directivity of the reflection intensity in the non-colored region 82a and the directivity of the reflection intensity in the colored region 82b can be made substantially same. Thus, according to the present embodiment, the color density in the reflection part 56 is prevented from being much higher than the color density in the transmission region 54 while the color regeneration range can be made large.

(Evaluation Result)

Next, the results of evaluating the liquid crystal display according to the present embodiment will be explained.

Figure 30A:
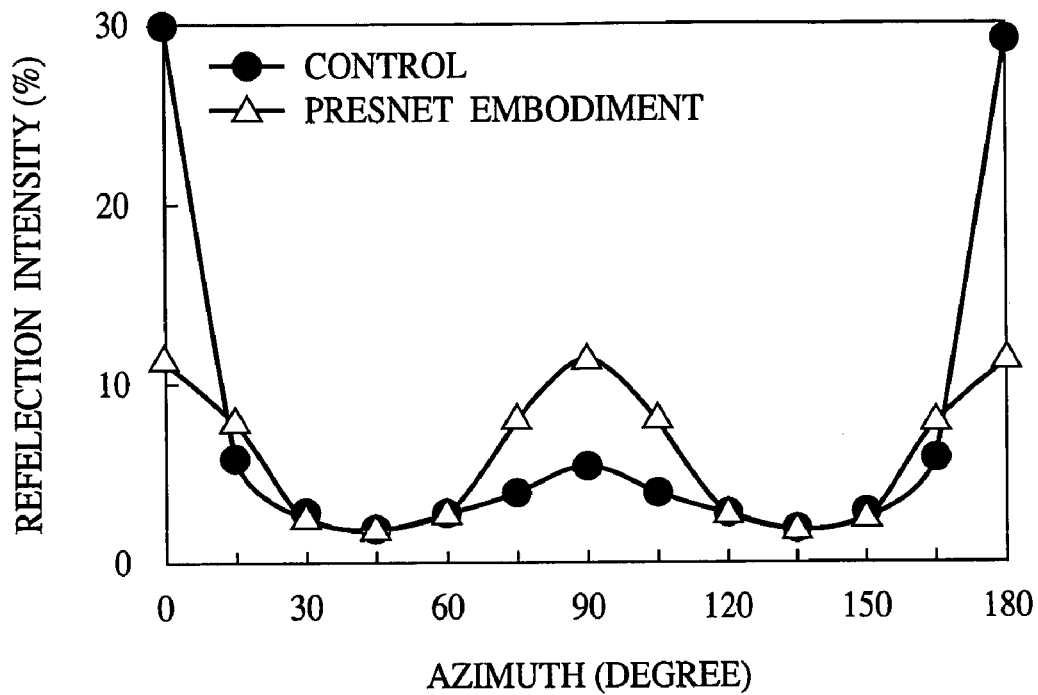
FIGS. 30A and 30B are graphs of the results of evaluating the liquid crystal display according to a sixth embodiment of the present invention.
Figure 30B:
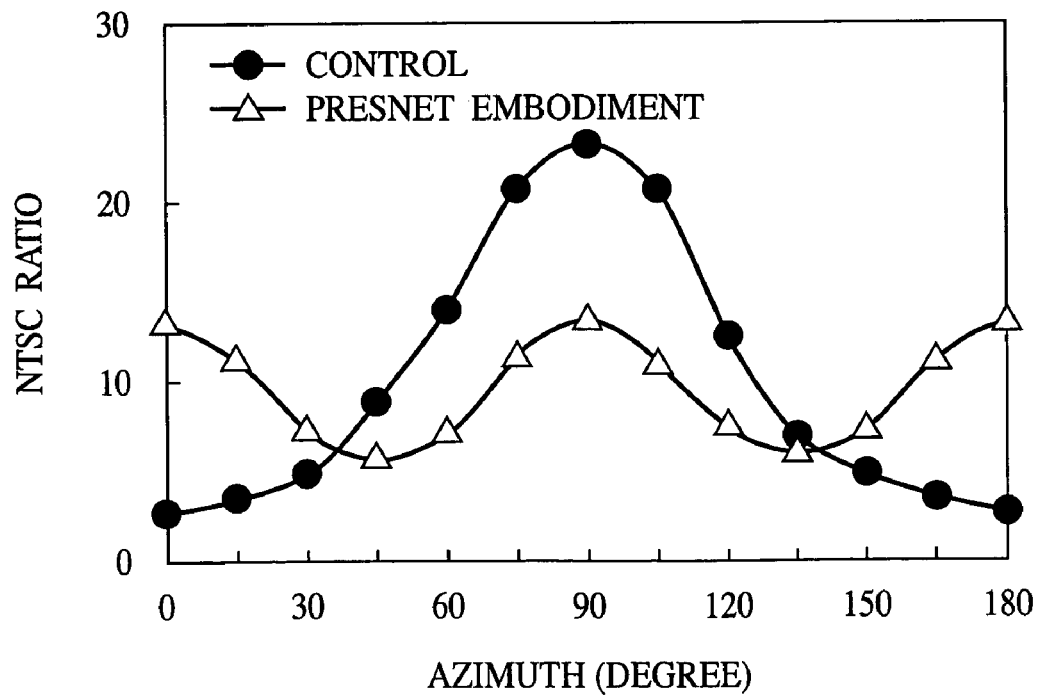
Figure 31A:
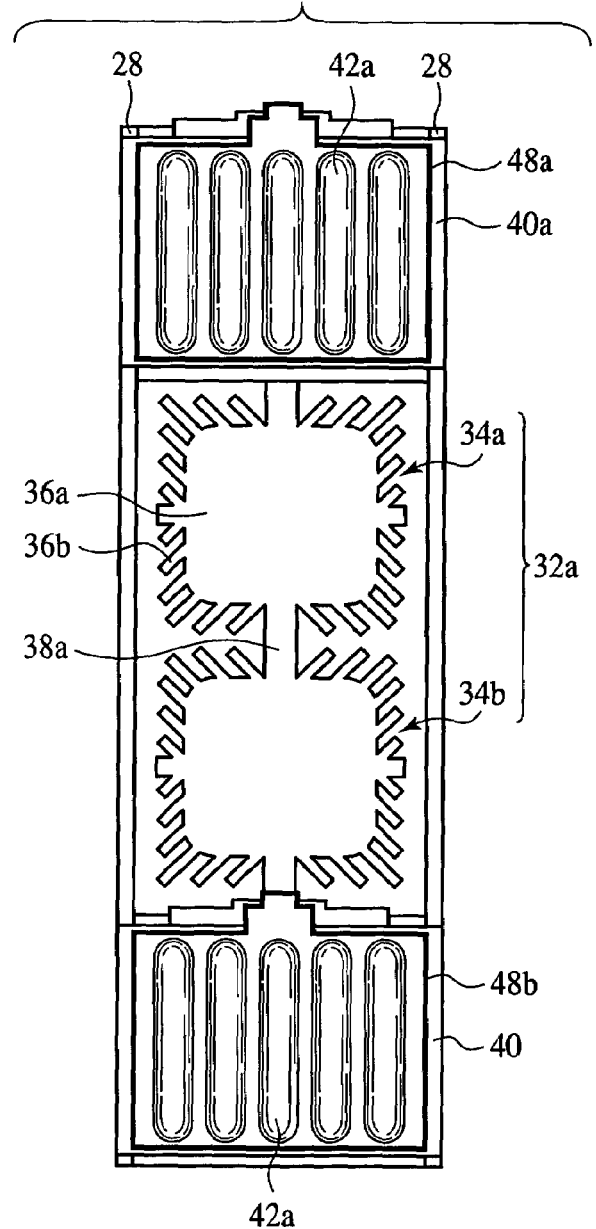
FIGS. 31A and 31B are plan views of the liquid crystal display according to a control.
Figure 31B:
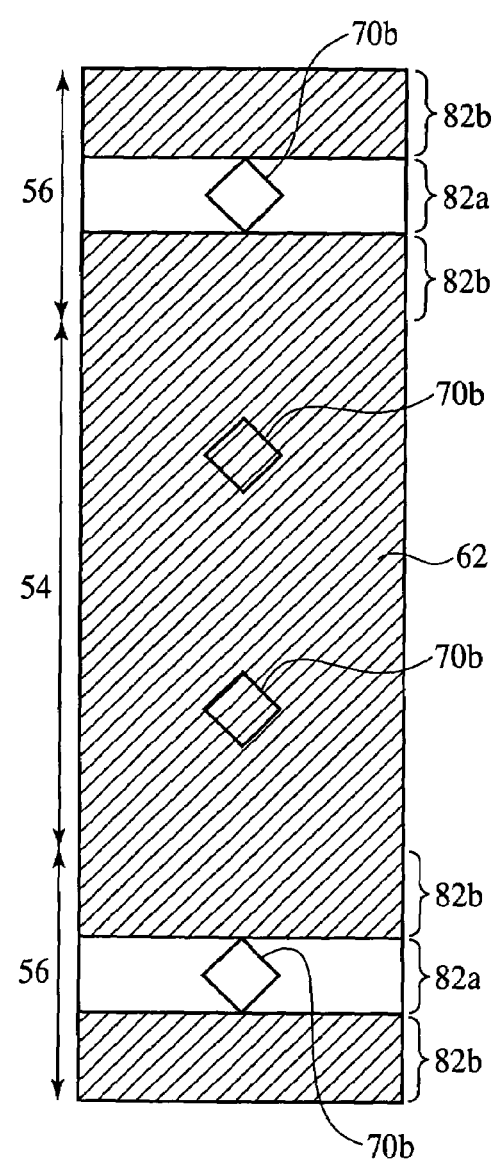
Figure 32A:
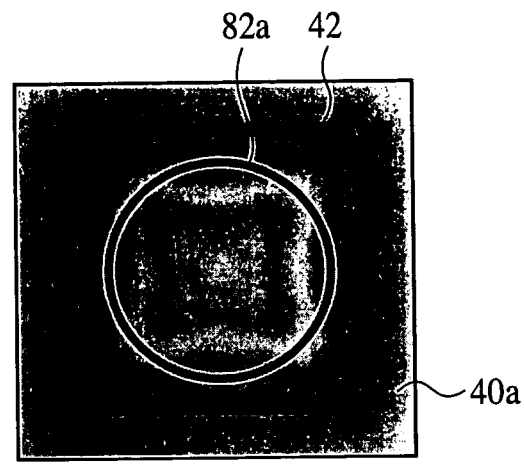
FIGS. 32A to 32C are plan views of the reflection part of the liquid crystal display according to the sixth embodiment and the reflection part of the liquid crystal display according to the control.
Figure 32B:
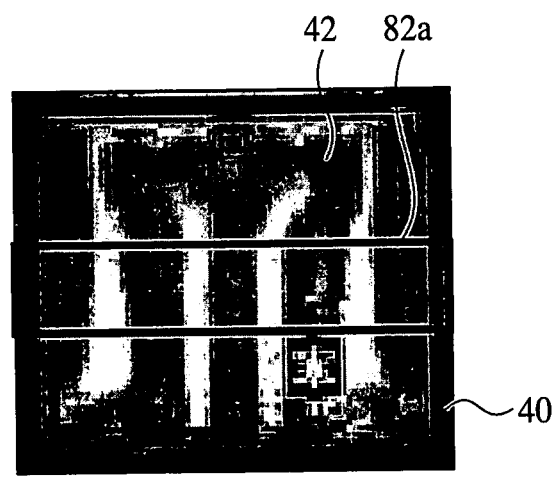
Figure 32C:
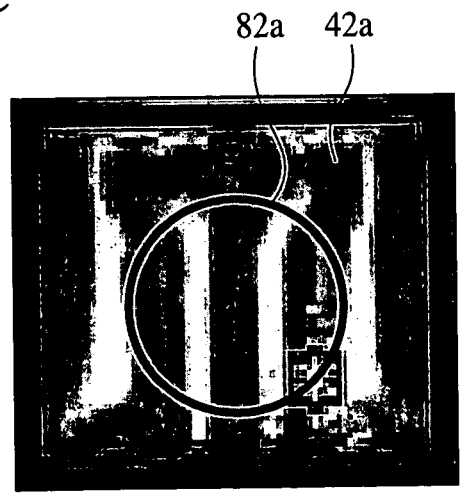

First, the reflection intensity distribution of the reflection display will be explained. FIGS. 30A and 30B are graphs of results of evaluating the liquid crystal display according to the present embodiment. FIG. 30A is a graph of the reflection intensity distribution of the reflection display. In measuring the reflection intensity distribution, the polar angle of the incident light was 25 degrees, and the azimuth of the incident light was changed in the range of 0 degree to 180 degrees. The measuring point was normal to the substrate surface. FIGS. 31A and 31B are plan views of the liquid crystal display used as a control. FIG. 31A illustrates the TFT substrate, and FIG. 31B illustrates the CF substrate. FIGS. 32A to 32C are plan views of reflection parts. FIG. 32A is the plan view of the reflection part of the liquid crystal display according to the present embodiment. As shown in FIG. 32A, the insulation layer 40a is formed in an island-shape, the convexities 42 are formed concentrically in the surface of the insulation layer 40a, and the circle non-colored region 82a is arranged at the central part of the reflection electrode 48. FIG. 32B illustrates the reflection part of the liquid crystal display of the control. As illustrated in FIG. 32B, in the control, the insulation layer 40 is formed in strips in parallel with the gate bus line 12, and streaks of the convexities (perpendicular wrinkles) 42a perpendicular to the longitudinal direction of the gate bus liens 12 are formed in the surface of the insulation layer 40. In the control, the non-colored region 82a is arranged in the region where the ends of the convexities 42a are not included, more specifically the non-colored region 82a was arranged in the region upper of the gate bus line 12.

As seen in FIGS. 30A and 30B, in the control, i.e., indicated by the ● marks, the reflection intensity is highest when the azimuth of the incident light is 0 degrees and 180 degrees. On the other hand, the azimuth of the incident light is other than around 0 degrees or around 180 degrees, the reflection intensity is very low. Based on this, it is found that in the control, the reflection intensity of light incident from the left and right is extremely higher than the reflection intensity of light incident from above and below.

With the insulation layer 40a formed in a strip parallel with the longitudinal direction of the gate bus lines 12 and with the convexities 42a formed in the surface of the insulation layer 40a perpendicularly to the longitudinal direction of the gate bus lines 12, the same characteristics could be obtained even when the circular non-colored region 82*a* is arranged selectively at the central part of the reflection electrode 28 (see FIG. 32C). FIG. 32B is a plan view of another control, i.e., with the insulation layer 40*a* formed in a strip along the gate bus lines 12 and with the convexities 42*a* formed in the surface of the insulation layer 40*a* along the longitudinal direction of the gate bus lines 12, in which the circular non-colored region 82*a* is arranged selectively at the central part of the reflection electrode 28.

However, in the present embodiment, i.e., as indicated by the ▲ marks, the reflection intensity given when the azimuth of incident light is 0 degrees and 180 degrees, and the reflection intensity given when the azimuth angle of incident light is 90 degrees are substantially equal to each other. It is found that, in the present embodiment, the reflection intensity of light incident from the left and right and the reflection intensity of light incident from above and below are substantially equal to each other.

Then, the NTSC ratio distribution of the reflection display will be explained with reference to FIG. 30B. FIG. 30B is a graph of NTSC ratio distributions of the reflection display. The NTSC ratio is a color regeneration range of a chromaticity area defined by NTSC specifications, which is represented by an area ratio. In measuring the visual characteristics of the reflectivity of light, the polar angle α of the incident light (see FIG. 8) was 25 degrees, and the azimuth β of the incident light (see FIG. 8) was changed in the range of 0–180 degrees. The measuring point was normal to the substrate surface. The ● marks indicate the result of the control, i.e., the liquid crystal display illustrated in FIGS. 31A and 31B. The ▲ marks indicate the result of the present embodiment.

As seen in FIG. 30B, in the control, i.e., as indicated by the ● marks, the NTSC ratio given when the azimuth β of the incident light is 0 degrees and 180 degrees, is extremely small in comparison with the NTSC ratio given when the azimuth β of the incident light is 90 degrees. Based on this, it is found that, in the control, the NTSC ratio given when light is incident, e.g., from the left and right is extremely small in comparison with the NTSC ratio given when light is incident from above and below. The same characteristics was given when the circular non-colored region 82*a* was arranged selectively at the central part of the reflection electrode 48 with the insulation layer 40*a* formed in a strip parallel with the longitudinal direction of the gate bus lines 12 and with the perpendicular convexities 42*a* formed along the longitudinal direction of the gate bus lines 12.

However, in the present embodiment, i.e., as indicated by the ▲ marks, the NTSC ratio given when the azimuth β of the incident light is 0 degrees and 180 degrees, and the NTSC ratio given when the azimuth β of the incident light is 90 degrees are substantially equal to each other. Based on this, it is found that, in the present embodiment, the NTSC ratio given when light is incident, e.g., from the left and right and the NTSC ratio given when light is incident from above and below can be substantially equal to each other.

As described above, the liquid crystal display according to the present embodiment can have little brightness deviation and have a wide color regeneration range.

(Modification 1)

Figure 33:
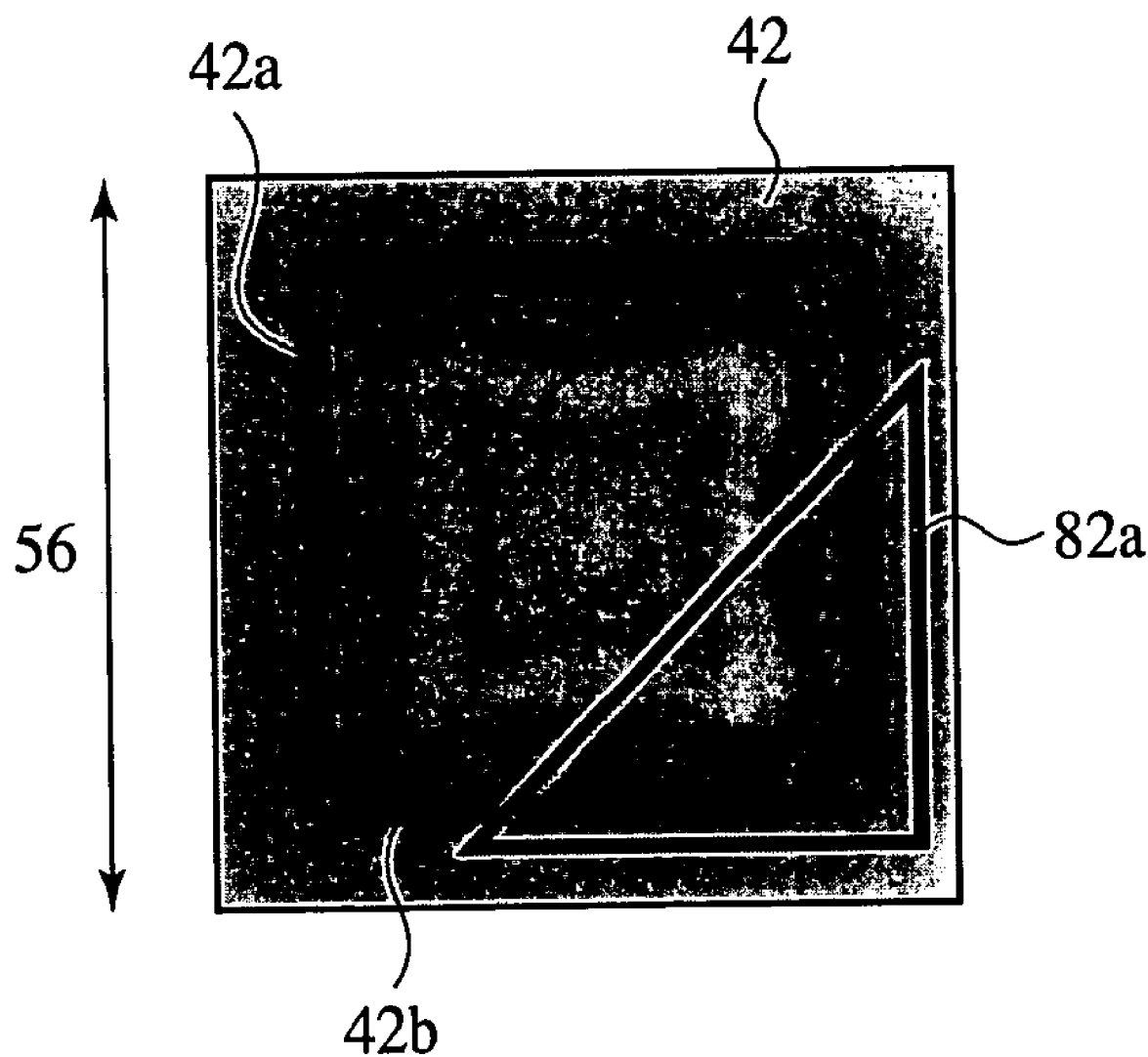
FIG. 33 is a plan view of the reflection part of the liquid crystal display according to Modification 1 of the sixth embodiment of the present invention.

A modification (Part 1) of the liquid crystal display according to the present embodiment will be explained with reference to FIGS. 33 to 34B. FIG. 33 is a plan view of the reflection part of the liquid crystal display according to the present modification.

As shown in FIG. 33, convexities 42 are formed concentrically in an island-shaped insulation layer 40*a*. The island-shaped insulation layer 40*a* has a quadrangular shape. The convexities 42 define a quadrangular shape.

A non-colored region 82*a* is selectively arranged in the reflection part 56. The non-colored region 82*a* has, e.g., a right-angled triangular shape. The non-colored region 82*a* is arranged with the corners of the non-colored region 82*a* agreed with the corners of the reflection electrode 48. The ratio of the length of the horizontal wrinkles 42*a* and the length of the perpendicular wrinkles 42*b* present in the non-colored region 82*a*, and the ratio between the length of the sides of the triangle are substantially equal to each other. The part except the non-colored region 82*a* is the colored region 82*b*, i.e., the region where the color filter layer 62 (see FIG. 28B) is formed. The presence ratio of the perpendicular wrinkles 42*a* and the horizontal wrinkles 42*b* present in the non-colored region 82*a* of the reflection part 56, and the presence ratio of the perpendicular wrinkles 42*a* and the horizontal wrinkles 42*b* present in the colored region 82*b* of the reflection part 56 are substantially equal to each other, whereby the directivity of the reflection intensity of light reflected in the non-colored region 82*b* and the directivity of the reflection intensity of light reflected in the colored region 82*a* are substantially equal to each other. Accordingly, the exit direction of light reflected in the non-colored region 82*a* can be made substantially the same as the exit direction of light reflected in the colored region 82*b*.

Figure 34A:
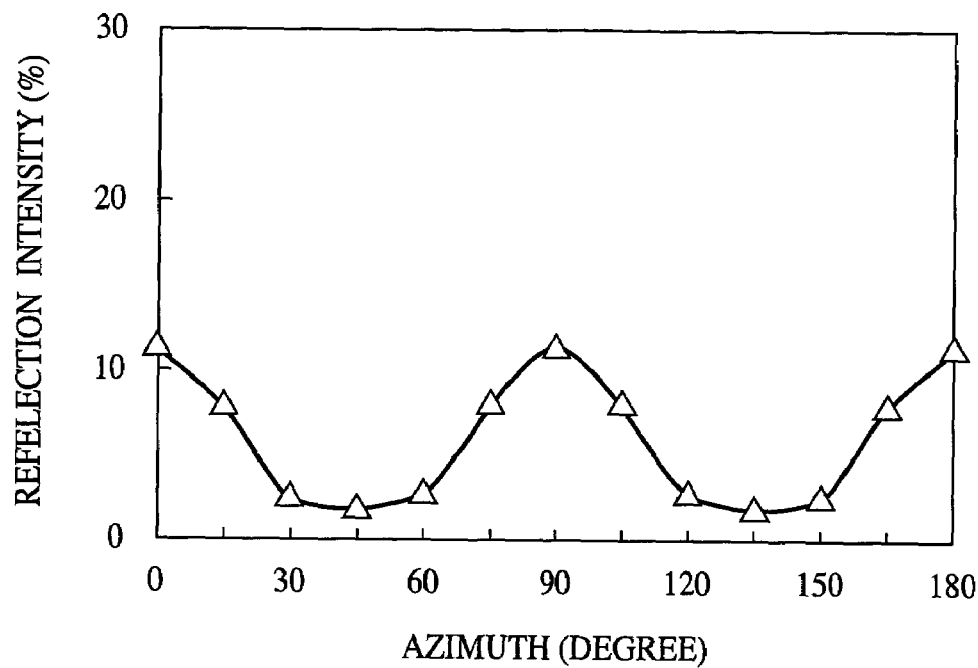
FIGS. 34A and 34B are graphs of the results of evaluating the liquid crystal display according to Modification 1 of the sixth embodiment of the present invention.

Next, the results of evaluating the liquid crystal display according to the present modification will be explained with reference to FIGS. 34A and 34B. FIGS. 34A and 34B are graphs of the evaluation results of the liquid crystal display according to the present modification.

First, reflection intensity distribution of the reflection display will be explained with reference to FIG. 34A. FIG. 34A is the graph of the reflection intensity distribution of the reflection display. In measuring the reflection intensity distribution, the polar angle α of incident light (see FIG. 8) is 25 degrees, and the azimuth β of incident light (see FIG. 8) was changed in the range of 0–180 degrees. The measuring point was normal to the substrate surface.

As seen in FIG. 34A, in the liquid crystal display according to the present modification, the reflection intensity given when the azimuth β of the incident light is 0 degree and 180 degrees and the reflection intensity given when the azimuth β of the incident light is 90 degrees are substantially equal to each other. Based on this, it is found that, in the present embodiment, the reflection intensity of light incident from the left and right, and the reflection intensity of light incident from above and below can be made substantially equal to each other.

Next, the NTSC ratio distribution of the reflection display will be explained with reference to FIG. 34B. FIG. 34B is the graph of the NTSC ratio distribution of the reflection display. In measuring the visual angle characteristics of the reflectivity of light, the polar angle α of incident light was 25 degrees, and the azimuth β of incident light was changed in the range of 0–180 degrees. The measuring point was normal to the substrate surface.

Figure 34B:
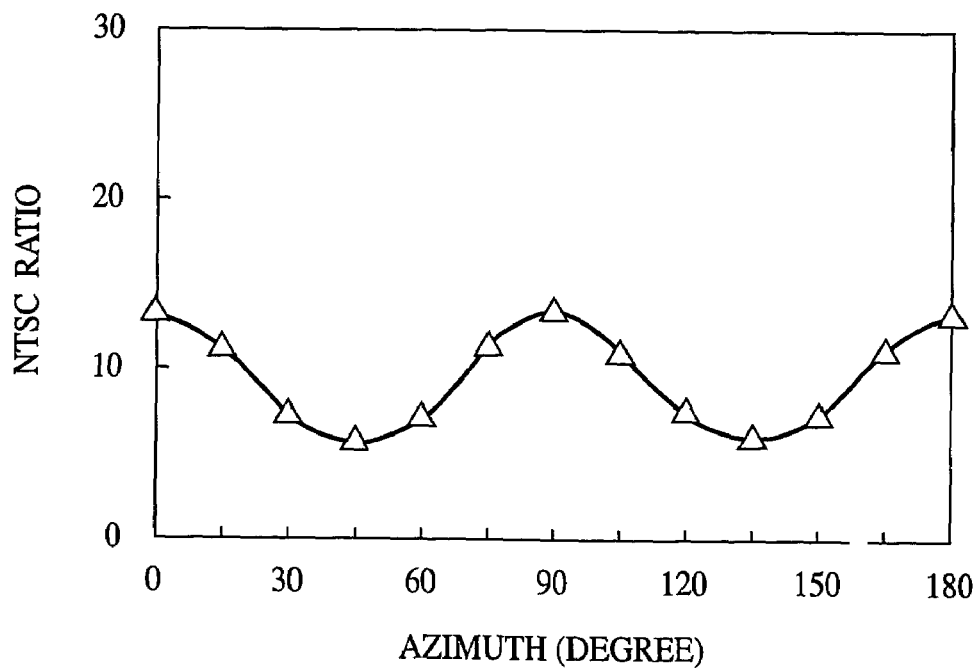

As seen in FIG. 34B, the NTSC ratio given when the azimuth β of the incident light is 0 degrees and 180 degrees, and the NTSD ratio given when the azimuth β of the incident light is 90 degrees are substantially equal to each other. Based on this, it is found that, in the present modification, the NTSC ratio given when light is incident, e.g., from the left and right and the NTSC ratio given when light is incident from above and below can be substantially equal to each other.

As described above, the liquid crystal display according to the present modification can have little brightness deviation and have a wide color regeneration range.

In the present modification, the non-colored region 82a has a triangular shape but is not limited to a triangular or a circular shape. The non-colored region 82a of any other shape can be suitably arranged so that the exit direction of light reflected in the non-colored region 82a is substantially the same as the exit direction of light reflected by the colored region 82b. In other words, the non-colored region 82a of any other shape can be suitably arranged so that the directivity of the reflection intensity in the non-colored region 82a is substantially the same as the directivity of the reflection intensity in the colored region 82b. More specifically, the non-colored region 82a may be arranged so that the presence ratio of the perpendicular wrinkles 42a and the horizontal wrinkles 42b present in the non-colored region 82a, and the presence ratio between the perpendicular wrinkles 42a and the horizontal wrinkles 42b present in the colored-region 82b can be substantially equal to each other.

(Modification 2)

Figure 35:
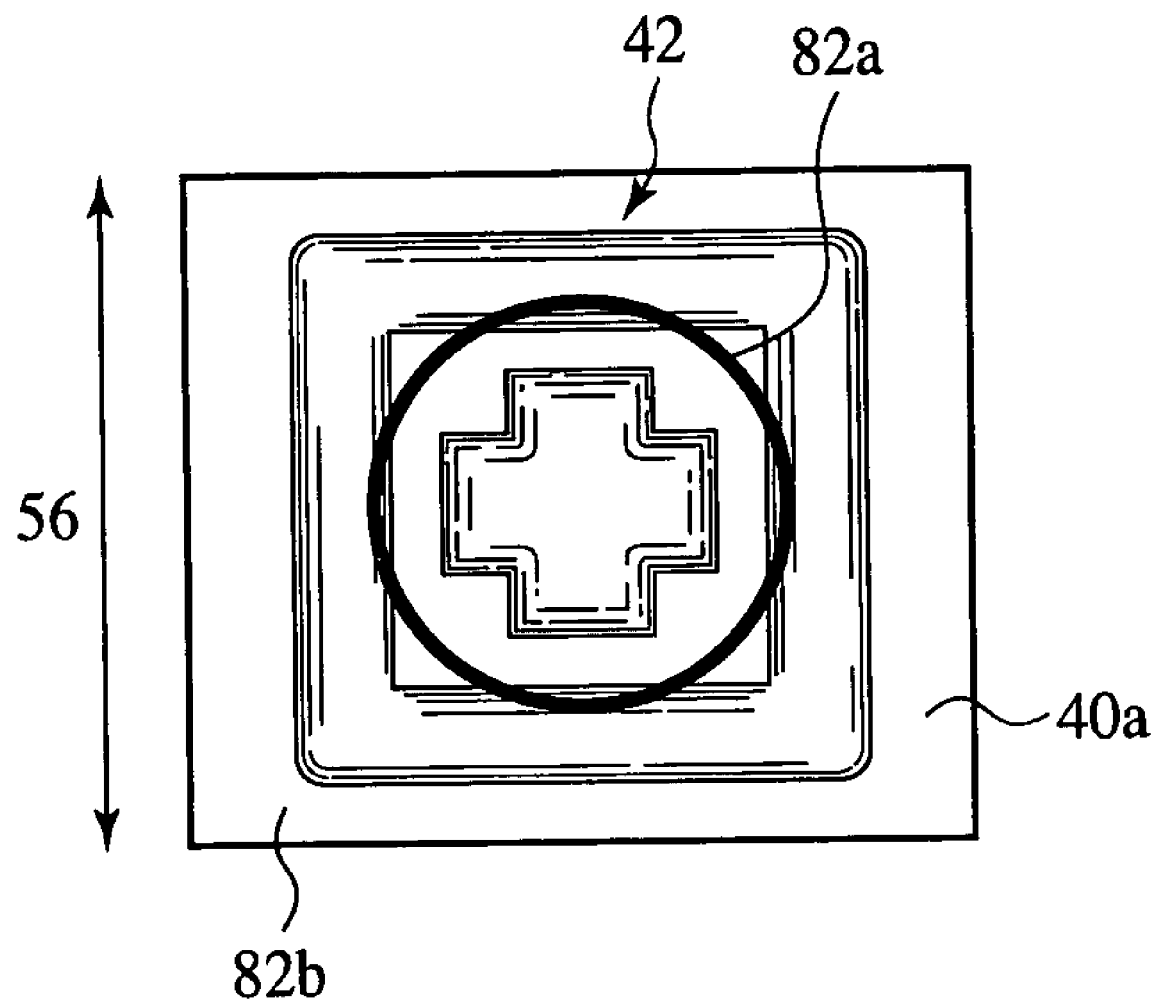
FIG. 35 is a plan view of the reflection part of the liquid crystal display according to Modification 2 of the sixth embodiment of the present invention.

Next, a modification (Part 2) of the liquid crystal display according to the present embodiment will be explained with reference to FIG. 35. FIG. 35 is a plan view of the reflection part of the liquid crystal display according to the present modification.

The liquid crystal display according to the present modification is characterized mainly in that the convexities 42 in the surface of the insulation layer 40a are formed by patterning using photolithography.

As shown in FIG. 35, the convexities 42 are formed concentrically in the surface of the insulation layer 40a. The outer concave and convex patterns have quadrangular. The outer concave and convex patterns have patterns substantially parallel to the longitudinal direction of the gate bus lines 12 and patterns substantially perpendicular to the longitudinal direction of the gate bus lines 12. The inner concave and convex patterns are cross-shaped. The inner concave and convex patterns also have patterns substantially parallel to the longitudinal direction of the gate bus lines 12 and the patterns substantially perpendicular to the longitudinal direction of the gate bus lines 12. The outer patterns and the inner patterns are arranged concentric to the center of the insulation layer 40a.

The non-colored region 82a is arranged at the central part of the reflection part 56. The non-colored region 82a has a circular (elliptic) shape. The region of the reflection part 56 except the non-colored region 82a is the colored region 82b.

Thus, the liquid crystal display according to the present modification is constituted.

As described above, the liquid crystal display according to the present modification is characterized mainly in that the convexities 42 are formed in the surface of the insulation layer 40a by patterning the surface of the insulation layer 40a.

In the liquid crystal display shown in FIGS. 28A and 28B, the insulation layer 40a is thermally solidification shrunk to form the convexities 42 in the surface of the insulation layer 40a. However, as in the present modification, the convexities 42 may be formed in the surface of the insulation layer 40a by patterning using photolithography.

In the present modification as well, in which the convexities 42 are concentrically formed in the surface of the insulation layer 40a, and the non-colored region 82a is selectively arranged at the central part of the insulation layer 40a, the directivity of the reflection intensity in the non-colored region 82a and the directivity of the reflection intensity in the colored region 82b can be made substantially the same. That is, the reflection direction of light reflected in the non-colored region 82a and the reflection direction of light reflected in the colored region 82b can be made substantially the same. Accordingly, the liquid crystal display according to the present modification as well can have a wide color regeneration range, as does the liquid crystal display shown in FIGS. 28A, 28B and 33.

[A Seventh Embodiment]

Figure 36A:
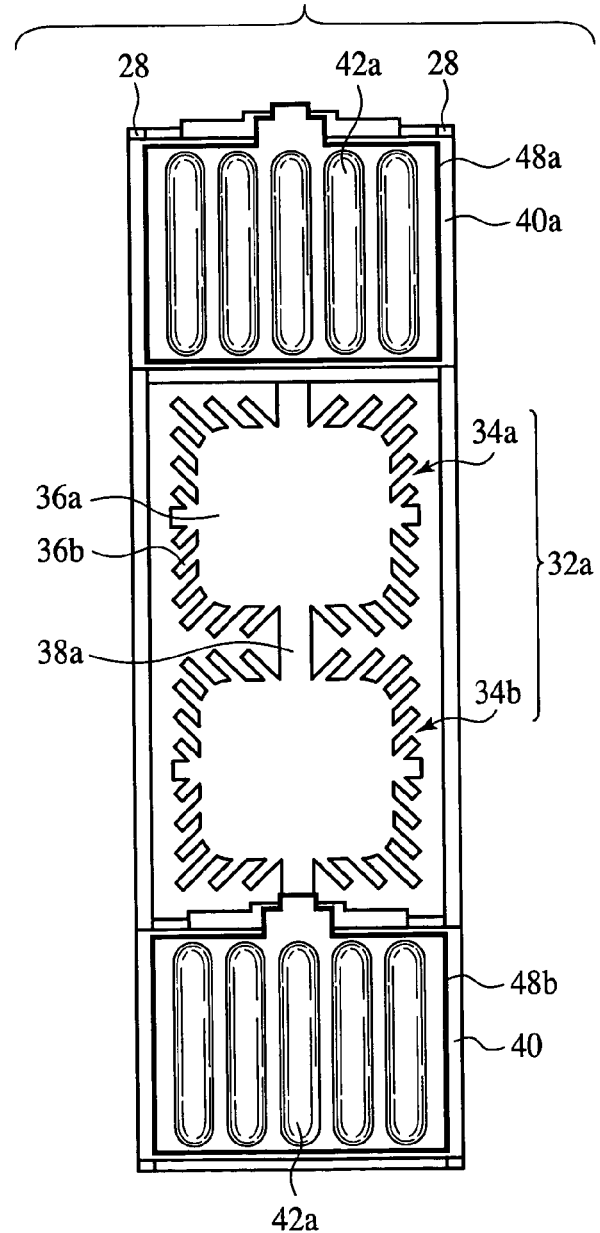
FIGS. 36A and 36B are plan views of the liquid crystal display according to a seventh embodiment of the present invention.
Figure 36B:
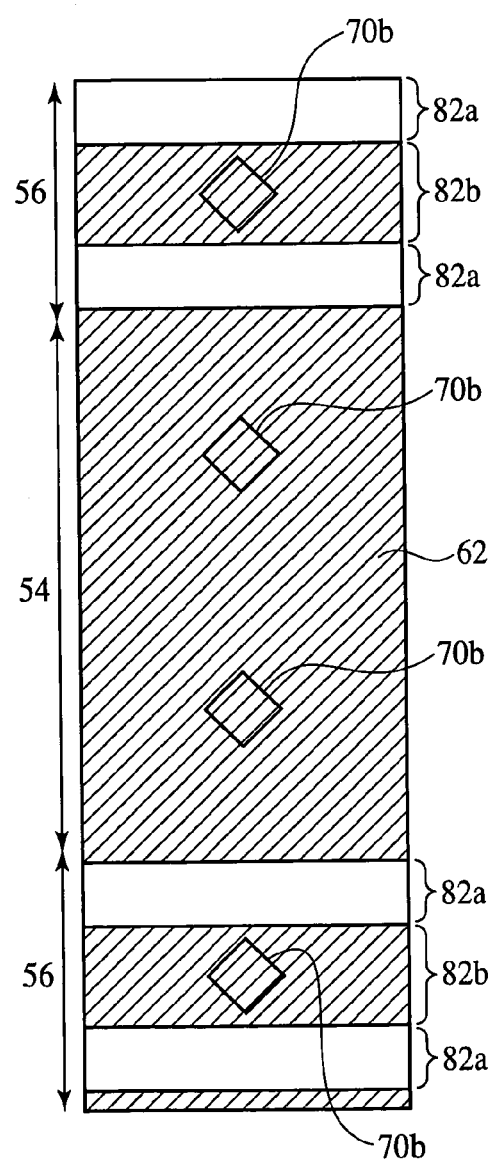
Figure 37:
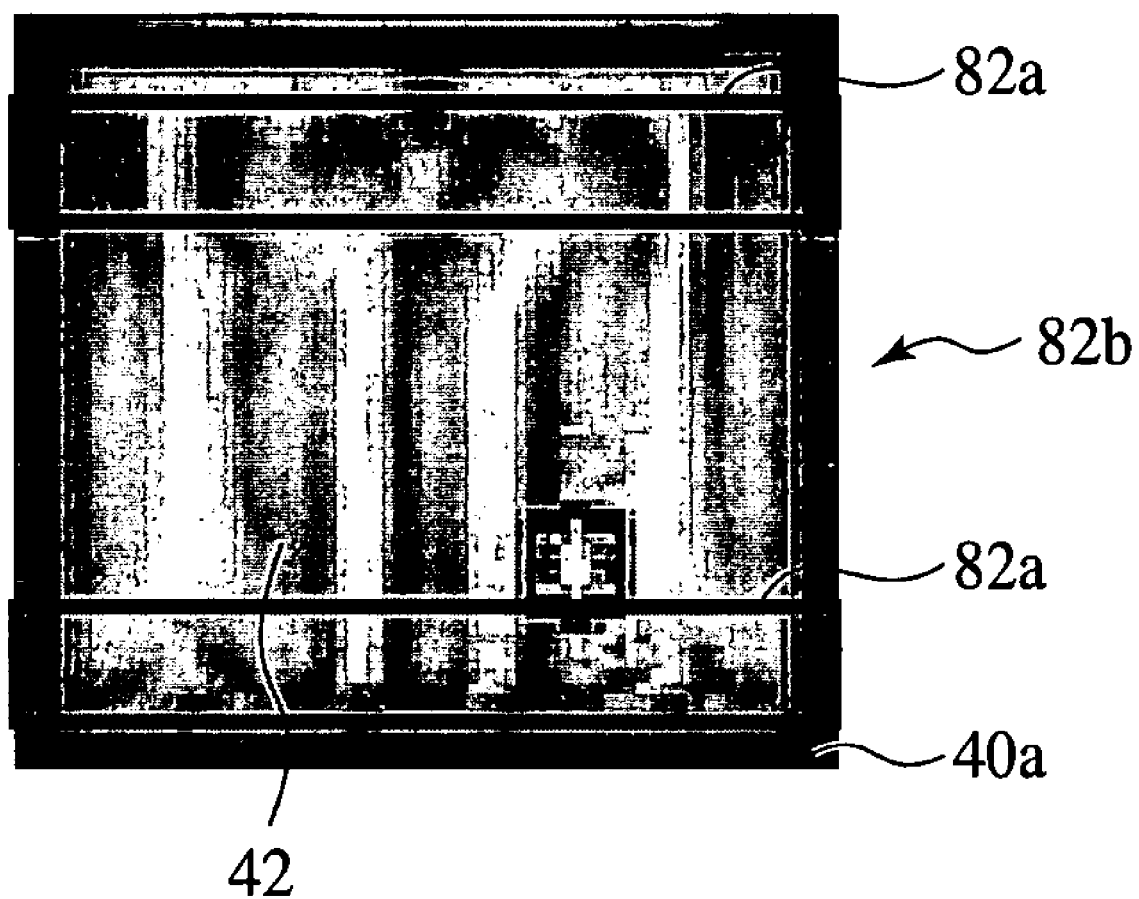
FIG. 37 is a plan view of the reflection part of the liquid crystal display according to the seventh embodiment of the present invention.

The liquid crystal display according to a seventh embodiment of the present invention will be explained with reference to FIGS. 36A to 38B. FIGS. 36A and 36B are plan views of the liquid crystal display according to the present embodiment. FIG. 36A illustrates a TFT substrate, and FIG. 36B illustrate a CF substrate in the region illustrated in FIG. 36A. FIG. 37 is a plan view of a reflection part of the liquid crystal display according to the present embodiment. The same members of the present embodiment as those of the liquid crystal display according to the first to the sixth embodiments illustrated in FIGS. 1A to 25B are represented by the same reference numbers not to repeat or to simplify their explanation.

The liquid crystal display according to the present embodiment is characterized mainly in that non-colored regions 82a are arranged so that the directivity of the reflection intensity of light reflected by a reflection electrode 48 in a colored region 82b and the directivity of the reflection intensity of light reflected by the reflection electrode 48 in the non-colored regions 82a are different from each other, and the reflection intensity of light reflected by the reflection electrode 48 in the colored region 82b is higher than the reflection intensity of light reflected by the reflection electrode 48 in the non-colored region 82a. More specifically, the liquid crystal display according to the present embodiment is characterized mainly in that the streaks of the convexities 42a are formed side by side in the surface of the reflection electrode 48, and the non-colored regions 82a are arranged, covering the ends of the convexities 42a.

As shown in FIGS. 36A and 36B, an insulation layer 40 is formed in a strip substantially parallel with the longitudinal direction of gate bus lines 12. Convexities 42a are formed in the surface of the strip-shaped insulation layer 40. The convexities 42a are formed substantially perpendicular to the longitudinal direction of the gate bus lines 12.

The same convexities 42a as the convexities formed in the surface of the insulation layer 40 are formed in the reflection electrode 48 formed on the insulation layer 40. Because of the convexities 42 present in the surface of the reflection electrode 48, directivity is given to the reflection intensity in the azimuth direction or polar angle direction.

The strip-shaped non-colored regions 82a are arranged on both ends of the reflection part 56. The non-colored regions 82a cover the ends of the convexities 42a. The declined planes of the convexities 42a at the ends thereof are faced in various directions, and light incident on the ends of the convexities 42a is diffused. Accordingly, the peaks of the reflection intensities of light reflected in the non-colored regions 82a are relatively low.

The region of the reflection part 56 except the non-colored region 82a is the colored region 82b. The colored region 82b is, e.g., strip-shaped. The colored region is arranged, not covering the ends of the convexities 42a. In the region which does not contain the ends of the convexities 42a, the declination direction of the declined planes of the convexities 42a is along the longitudinal direction of the gate bus line 14, and light incident from, e.g., the left and right is reflected at high intensity. Peaks of the reflection intensities of light reflected in the colored region 82b is higher than peaks of intensities of light reflected in the non-colored regions 82a.

In the present embodiment, the non-colored regions 82a have a strip-shaped plane shape, i.e., a polygonal shape but is not limited a polygonal plane shape. The plane shape of the non-colored regions 82a can be circular or elliptic.

Figure 38A:
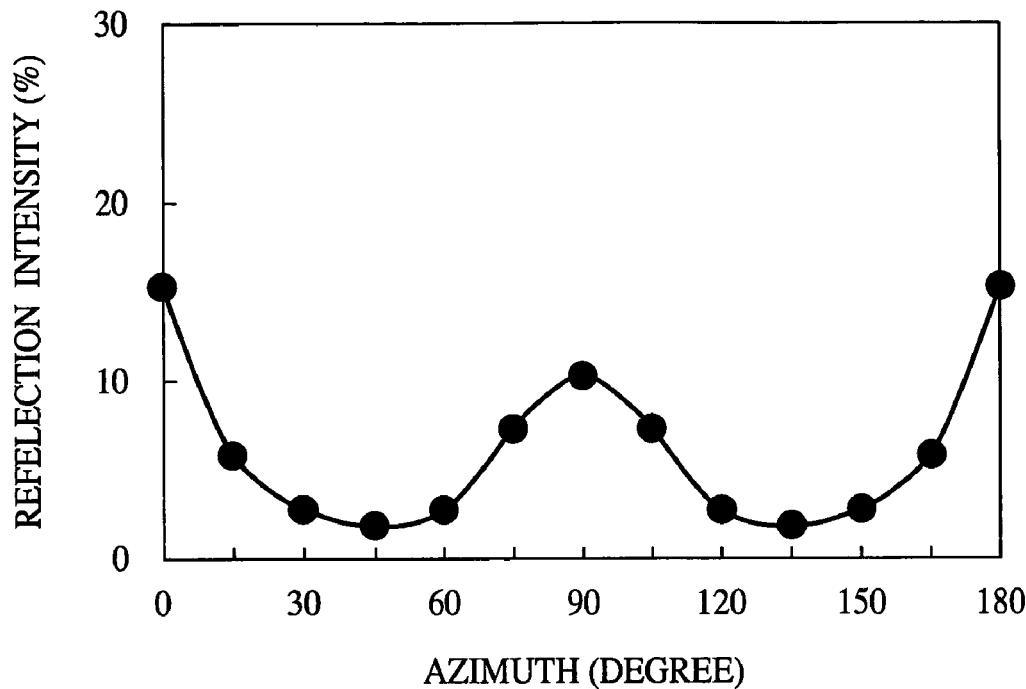
FIGS. 38A and 38B are graphs of the results of evaluating the liquid crystal display according to the seventh embodiment of the present invention.
Figure 38B:
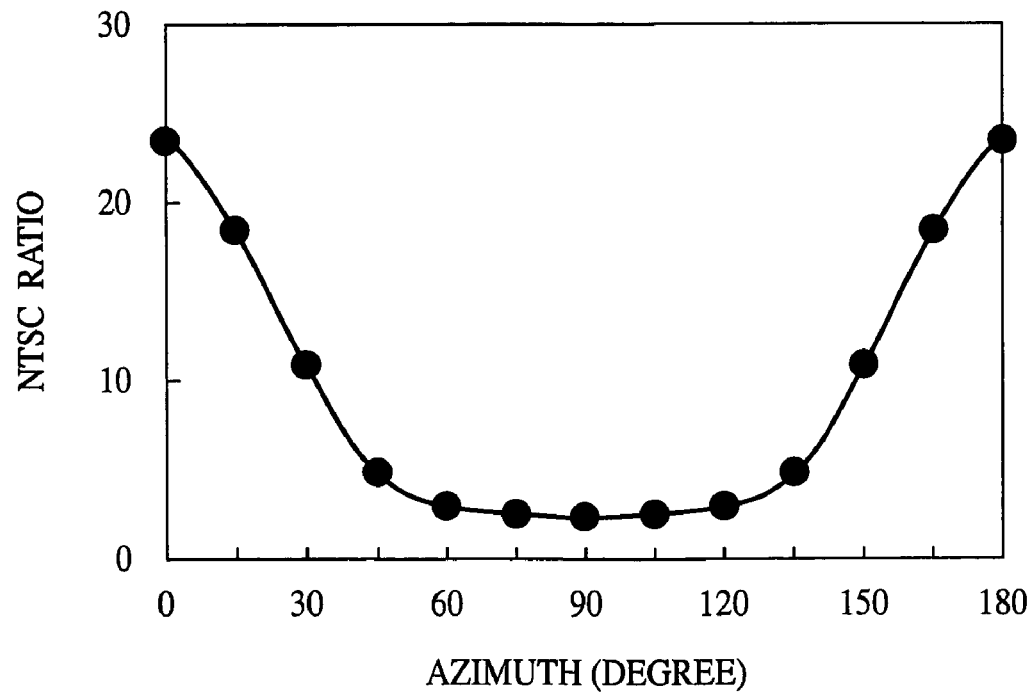

Next, the result of evaluating the liquid crystal display according to the present embodiment will be explained with reference to FIGS. 38A and 38B. FIGS. 38A and 38B are graphs of the results of the evaluation of the liquid crystal display according to the present embodiment.

First, the reflection intensity distribution of the reflection display will be explained. FIG. 38A is a graph of the reflection intensity distribution of the reflection display. In measuring the reflection intensity distribution, the polar angle α (see FIG. 8) of incident light was 25 degrees, and the azimuth β (see FIG. 8) of the incident light was changed in the range of 0–180 degrees. The measuring point was normal to the substrate surface.

As seen in FIG. 38A, in the liquid crystal display according to the present embodiment, the reflection intensity given when the azimuth β of incident light is 0 degrees and 180 degrees is higher than the reflection intensity given when the azimuth β of incident light is 90 degrees. However, in the liquid crystal display according to the present embodiment, the reflection intensity distribution of the reflection display is much improved in comparison with that of the liquid crystal display according to the control illustrated in FIGS. 30A and 30B.

Then, the NTSC ratio distribution of the reflection display will be explained with reference to FIG. 38B. FIG. 38B is the graph of the NTSC ratio distribution of the reflection display. In measuring the visual angle characteristics of the reflectivity of light, the polar angle α of incident light was 25 degrees, and the azimuth β of incident light was changed in the range of 0–180 degrees. The measuring point was normal to the substrate surface.

As seen in FIG. 38B, in the liquid crystal display according to the present embodiment, the NTSC ratio is very high when the azimuth β of incident light is 0 degrees and 180 degrees and is very low when the azimuth of incident light other than around 0 degrees and around 180 degrees. Based on this, it is found that, in the present embodiment, the NTSC ratio given when light is incident from, e.g., the left and right can be made high.

Based on the above, it is found that under conditions which the display is bright, a wide color regeneration range can be obtained, and the color regeneration range is narrow under conditions under which the display is dark.

The liquid crystal display according to the present embodiment is characterized mainly in that, as described above, the directivity of the reflection intensity of light reflected by the reflection electrode 48 in the colored region 82b and the directivity of the reflection intensity of light reflected by the reflection electrode 48 in the non-colored regions 82a are different from each other, and the non-colored regions 82a are arranged so that the reflection intensity of light reflected by the reflection electrode 48 in the colored region 82b is higher than the reflection intensity of light reflected by the reflection electrode 48 in the non-colored regions 82a. More specifically, the liquid crystal display according to the present embodiment is characterized mainly in that, as described above, the convexities 42a are formed side by side in the surface of the reflection electrode 48, and the colored region 82b is arranged, not covering the ends of the convexities lines 42a while the non-colored regions 82a is arranged, covering the ends of the convexities 42a. The liquid crystal display of such arrangement can provide a large color regeneration range under conditions which provide bright display. On the other hand, under conditions which provide dark display, the color regeneration range is small, but without any special practical problem, the small color regeneration range is hard to recognize under conditions which provide dark display. Thus, the liquid crystal display according to the present embodiment as well can have good display quality.

(Modification)

Figure 39:
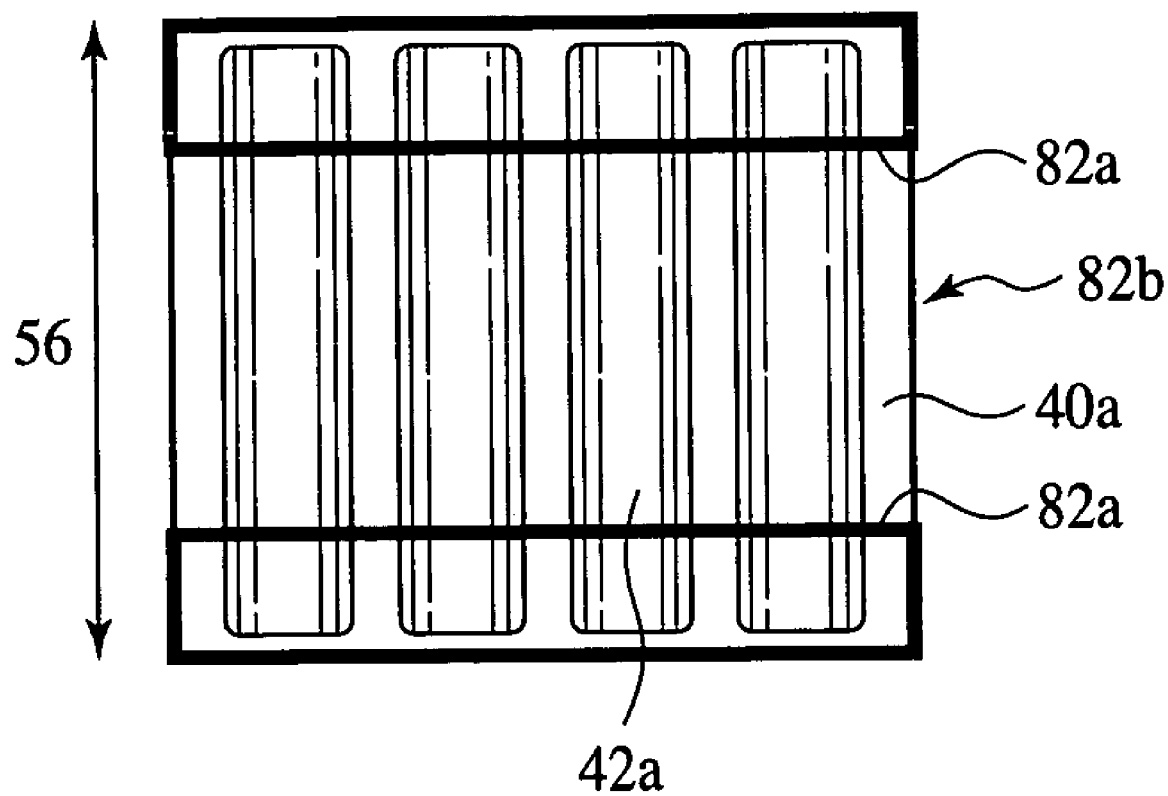
FIG. 39 is a plan view of the reflection part of the liquid crystal display according to a modification of the seventh embodiment of the present invention.

Then, a modification of the liquid crystal display according to the present embodiment will be explained with reference to FIG. 39. FIG. 39 is a plan view of a reflection part of the liquid crystal display according to the present modification.

The liquid crystal display according to the present modification is characterized mainly in that convexities 42a are formed in the surface of the insulation layer 40a by patterning using photolithography.

As shown in FIG. 39, concave and convex patterns 42a which are substantially perpendicular to the longitudinal direction of the gate bus lines 12 are formed in the surface of the insulation layer 40a.

Strip-shaped non-colored regions 82a are arranged on both ends of the reflection part 56. The non-colored regions 82a are arranged, covering the ends of the convexities 42a. The convexities 42a have the declined planes faced in various declination directions at the ends thereof, and light is diffused. Accordingly, peaks of the intensity of the light reflected in the non-colored region 82a are relatively low.

The region of the reflection part 56, which is other than the non-colored region 82a is the colored region 82b. The colored region 82b has, e.g., a strip-shape. The colored region 82b is arranged, not containing the ends of the convexities 42a. In the region which does not contain the ends of the convexities 42a, the declination direction of the declined planes of the convexities 42a is along the longitudinal direction of the gate bus line 12, and light incident, e.g., from the left and right is reflected at a high reflection intensity. Peaks of the intensity of light reflected in the colored region 82b is higher than peaks of the intensity of light reflected in the non-colored region 82a.

Even the liquid crystal display in which the convexities 42a are formed in the surface of the insulation layer 40a by photolithography can have good display quality, as does the liquid crystal display illustrated in FIGS. 36A and 36B.

[An Eighth Embodiment]

Figure 40A:
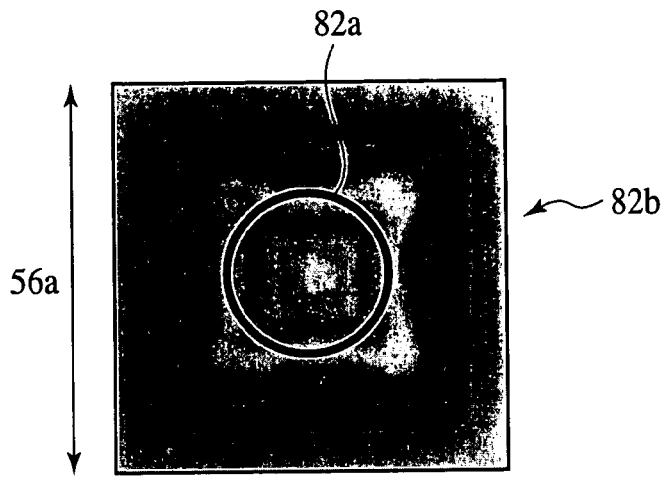
FIGS. 40A to 40C are plan views of the reflection part of the liquid crystal display according to an eighth embodiment of the present invention.

The liquid crystal display according to an eighth embodiment of the present invention will be explained with reference to FIGS. 40A to 41. FIGS. 40A to 40C are plan views of a reflection part of the liquid crystal display according to the present embodiment. The same members of the present embodiment as those of the liquid crystal display according to the first to the seventh embodiments illustrated in FIGS. 1A to 39 are represented by the same reference numbers not to repeat or to simplify their explanation.

The liquid crystal display according to the present embodiment is characterized mainly in that pixels have different areas of the non-colored regions 82a in accordance with display colors of the pixels.

First, the same TFT substrate as the TFT substrate 2e of the liquid crystal display illustrated in FIG. 28A can be used, and its detailed description is omitted.

Next, a CF substrate will be explained.

The CF substrate of the present embodiment is the same as the CF substrate of the liquid crystal display illustrated in FIG. 28B except that pixels have different areas of the non-colored regions 82a in accordance with display colors of the pixels.

Figure 40B:
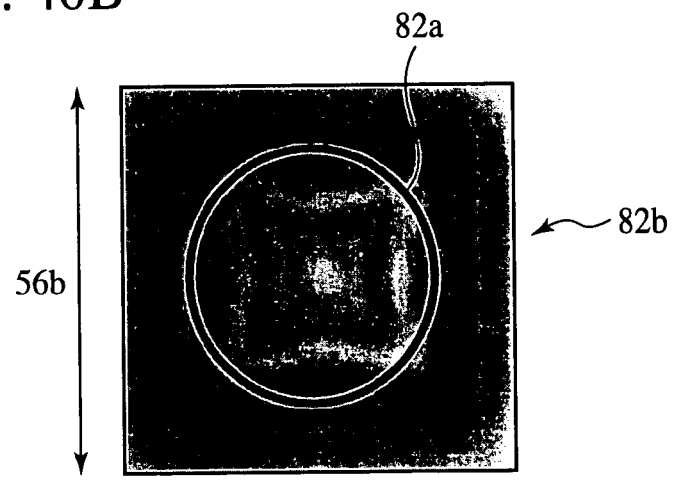

FIG. 40A is a plan view of the reflection part of a pixel which displays red color (R) FIG. 40B is a plan view of the reflection part of a pixel which displays green color (G). FIG. 40C is a plan view of the reflection part of a pixel which displays blue color (B).

Figure 40C:
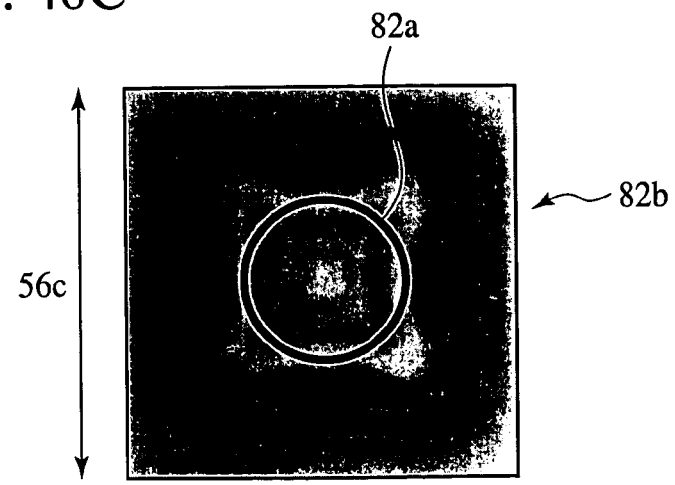
Figure 41:
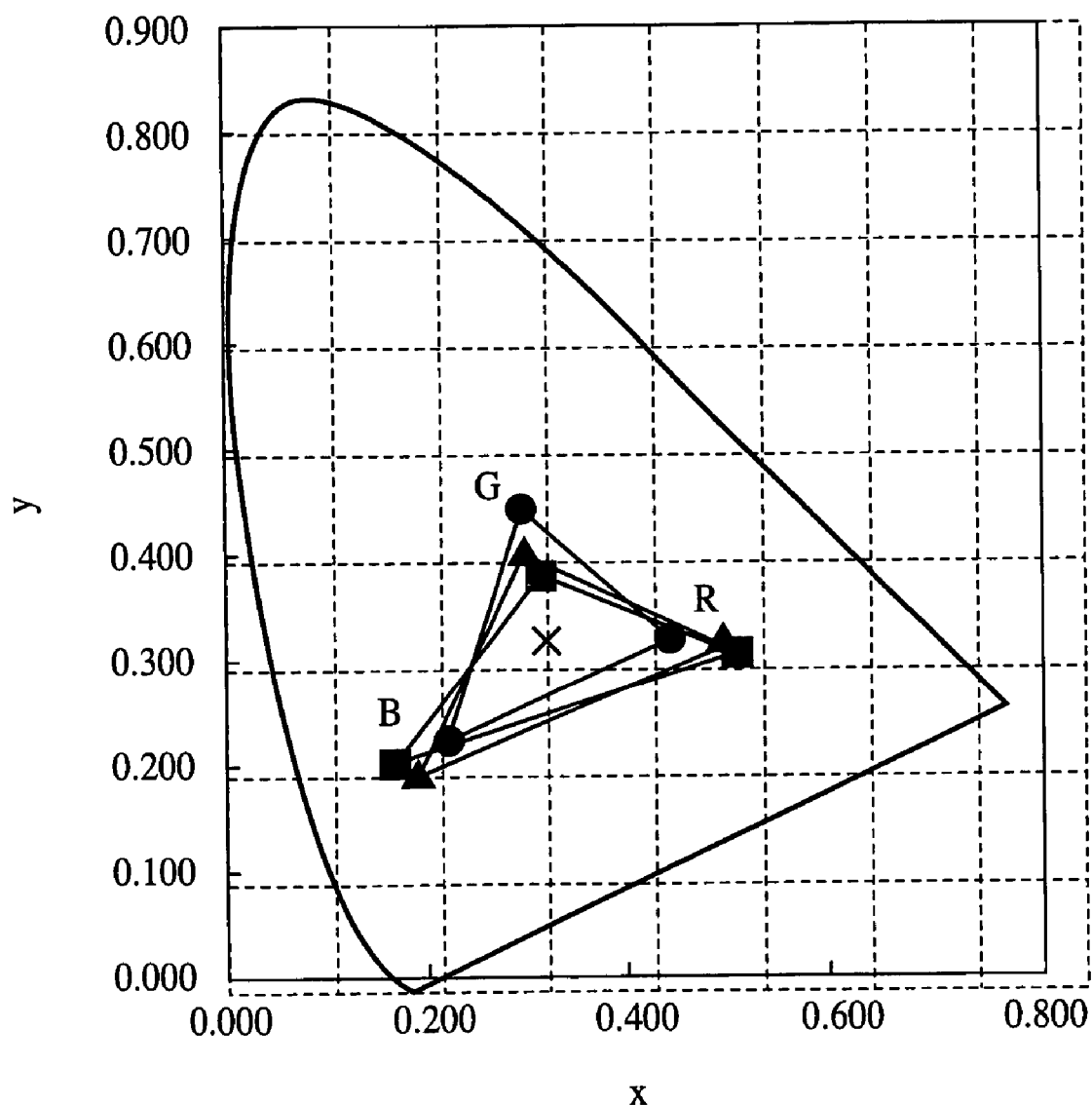
FIG. 41 is a graph of chromaticity coordinates of the liquid crystal display according to the eighth embodiment of the present invention.

As illustrated in FIGS. 40A and 40C, the reflection part 56a of the pixel which displays red color and the reflection part 56c of the pixel which displays blue color have relatively small areas of the non-colored regions 82a. Specifically, the ratio of the areas of the non-colored regions 82a to the areas of the colored regions 82b are set at about 15%.

As illustrated in FIG. 40B, in the reflection part 56 of the pixel which displays green color, the area of the non-colored region 82a is set to be relatively large. Specifically, the ratio of the area of the non-colored region 82a to the area of the colored region 82b is set at about 35%.

(Evaluation Result)

The result of evaluating the liquid crystal display according to the present embodiment will be explained with reference to FIG. 41. FIG. 41 is a graph of the chromaticity coordinates of the liquid crystal display according to the present embodiment.

The ● marks indicate the result of the case where the ratio of the area of the non-colored region 82a to the area of the colored region 82b was set at 25%. The ■ marks indicate the result of the case where the thickness of the color filter layer for the reflection was 0.7 μm, and the non-colored region 82a is not formed in the reflection part 56. The ▲ marks indicate the result of the present embodiment, in which, in the reflection parts 56a, 56c of a pixel, which display red color and blue color, the ratio of the non-colored region 82a to the area of the colored region 82b was set at 15%, and in the reflection parts 56b of a pixel, which display green color, the ratio of the area of the non-colored region 82a to the area of the colored region 82b was set at 35%.

The ratio of the area of the non-colored region is set to be substantially equal so that the NTSC ratio of the transmission color filter layer 62 is substantially equal to the NTSC ratio of the reflection color filter layer. However, as seen in FIG. 41, in the ● marked case, the chromaticity coordinates of the displayed colors are offset from the color coordinates of the ■ marked case.

In the present embodiment, however, i.e., in the ▲ marked case, such chromaticity coordinates offset is corrected, and the chromaticity coordinates of the displayed colors are near the chromaticity coordinates of the ■ marked case.

As described above, according to the present embodiment, the ratio of the area of the non-colored region 82a to the area of the colored region 82b is suitably changed in accordance with display colors of pixels, whereby good color regeneration in the reflection display can be realized.

[A Ninth Embodiment]

Figure 42:
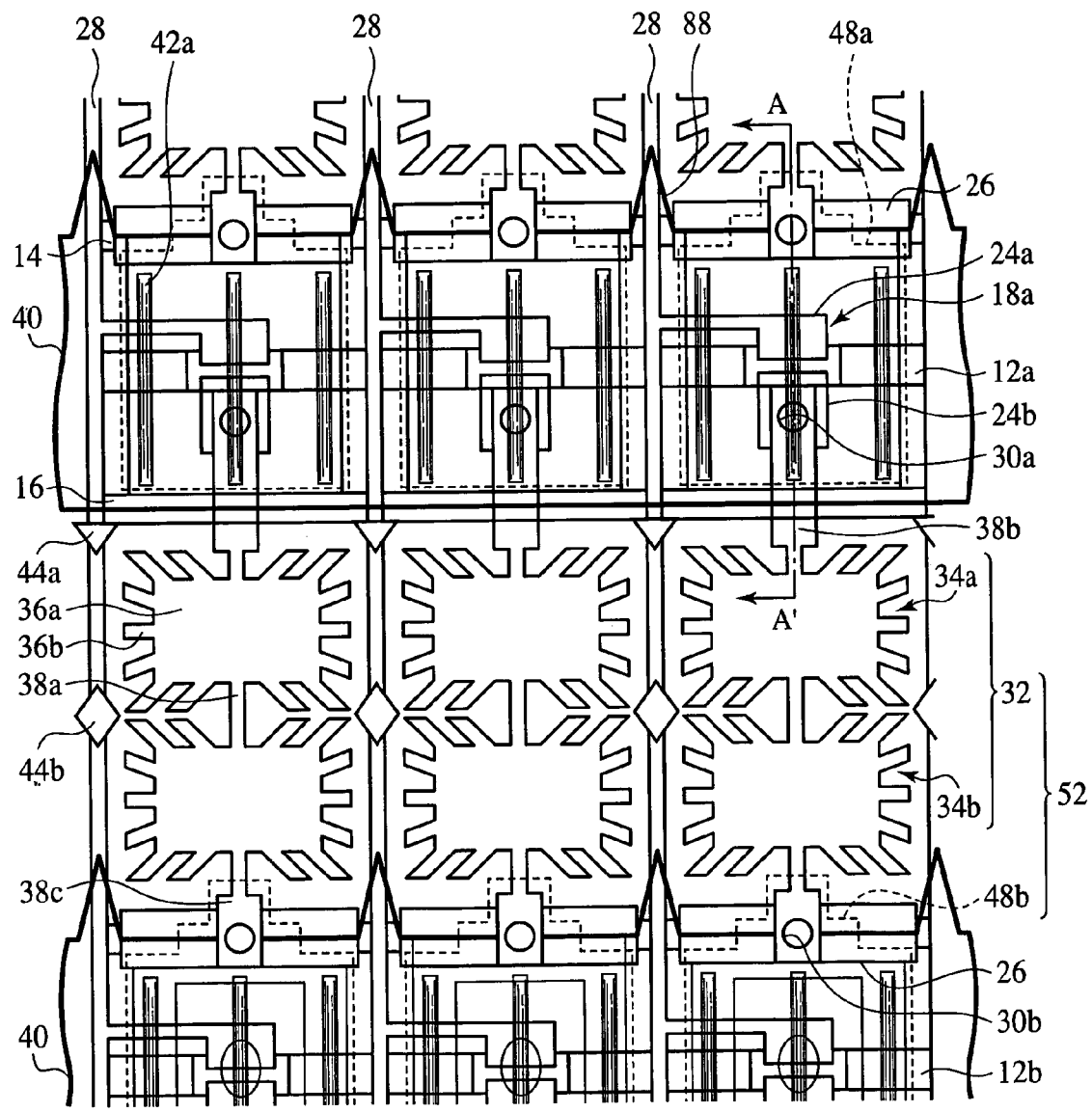
FIG. 42 is a plan view of the liquid crystal display according to a ninth embodiment of the present invention.
Figure 43:
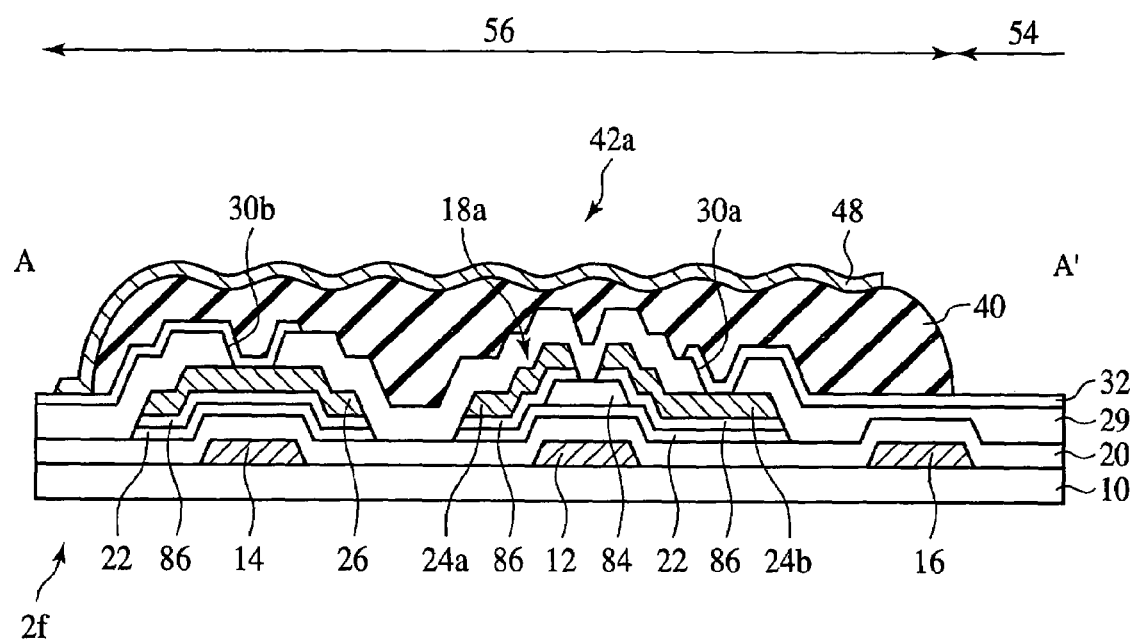
FIG. 43 is the sectional view of the liquid crystal display according to the ninth embodiment of the present invention along the line A–A'.

The liquid crystal display according to a ninth embodiment of the present invention and a method for fabricating the liquid crystal display will be explained with reference to FIGS. 42 to 48C. FIG. 42 is a plan view of the liquid crystal display according to the present embodiment. FIG. 43 is the sectional view of the liquid crystal display according to the present embodiment along the line A–A' The same members of the present embodiment as those of the liquid crystal display according to the first to the eighth embodiments illustrated in FIGS. 1A to 41 not to repeat or to simplify their explanation.

(The Liquid Crystal Display)

The liquid crystal display according to the present embodiment comprises a TFT substrate 2f with thin film transistors, etc. formed on, a CF substrate 4 with a color filter layer, etc. formed on and a liquid crystal layer 6 sealed between the TFT substrate 2f and the CF substrate 4. The CF substrate 4 can be suitably any one of the CF substrates of the above-described embodiments.

First, the TFT substrate 2f will be explained with reference to FIGS. 42 and 43.

A gate bus line 12, a Cs (storage capacitance) bus line 14 and a Cs dummy bus line 16 are formed on a glass substrate 10.

A gate insulation film 20 of, e.g., a silicon nitride film is formed on the glass substrate 10 with the gate bus line 12, the Cs bus line 14 and the Cs dummy bus line 16 formed on.

A channel layer 22 of, e.g., amorphous silicon is formed on the gate insulation film 20.

A channel protection film 84 of, e.g., a silicon nitride film is formed on the channel layer 22.

A contact layer 86 of, e.g., $n^+$ type amorphous silicon is formed on the channel layer 22 and the channel protection film 84. The contact layer 86 is for forming an ohmic-contact with a source electrode 24a and a drain electrode 24b.

The source electrode 24a and the drain electrode 24b are formed on the contact layer 86. Thus, a thin film transistor 18a comprising the gate electrode 12, the channel layer 22, the source electrode 24a, the drain electrode 24, etc. is formed.

An amorphous silicon film 22, an $n^+$ type amorphous silicon film 86 and a Cs opposed electrode (intermediate electrode) 26 are formed above the Cs bus line 14 with a gate insulation film 20 formed therebetween. The Cs opposed electrode 26 forms a prescribed capacitance together with the Cs bus line 14. The Cs opposed electrode 26 is formed of one and the same conduction film as the source electrode 24a and the drain electrode 24b.

A data bus line 28 is formed on the gate insulation film 20. The data bus line is formed of one and the same conduction film as the source electrode 24a, the drain electrode 24b and the Cs opposed electrode 26. The data bus line 28 and the source electrode 24a are formed integral with each other.

A protection film 29 of a transparent material is formed on the glass substrate 10 with the thin film transistor 18a, the Cs opposed electrode 26 and the data bus line 28 formed on.

A contact hole 30a and a contact hole 30b are formed in the protection film 29 respectively down to the source electrode 24b and down to the Cs opposed electrode 26.

A transmission electrode 32 of, e.g., ITO film is formed on the protection film 29. The transmission electrode 32 includes, e.g., two electrode units 34a, 34b. An interconnection pattern 38b of the transmission electrode 32 is connected to the source electrode 24b through the contact hole 30a. An interconnection pattern 38c of the transmission electrode 32 is connected to the Cs opposed electrode 26 through the contact hole 30b.

A strip-shaped of resin layer 40 with convexities 42a formed in the surface is formed on the interconnection pattern 38b of the transmission electrode 32 and the protection film 29. The resin layer 40 is formed by using, e.g., a positive-type resist. The resin layer 40 is formed substantially in parallel with the longitudinal direction of the gate bus line 12. The resin layer 40 has one edge positioned on the Cs bus line 14, and the other edge of the resin layer 40 positioned on the Cs dummy bus line 16. The direction of the convexities 42a are perpendicular to the longitudinal direction of the resin layer 40, i.e., substantially perpendicular to the longitudinal direction of the gate bus line 12.

The resin layer 40 has a projected pattern 88 which is projected between pixel electrodes 52 which are adjacent to each other. The protected pattern 88 and the resin layer 40 are formed integral each other. In the present embodiment, the resin layer 40 has the protected pattern 88 for the following reason.

That is, the resin layer 40 is as thick as, e.g., about 2.5 μm that when the conduction film is dry etched to form the reflection electrode 48, the residue of the conduction film is left on the side wall of the resin layer 40. The residue of the conduction film on the side wall of the resin layer 40 causes a risk that the adjacent reflection electrodes 48 may be electrically shorted. However, the projected pattern 88 formed on the resin layer 40, projected between the pixel electrodes 52 makes the tilt of the plane of the side wall of the resin layer 40 blunt to the substrate surface at the forward end of the projected pattern 88. In a case that the tilt of the plane of the side wall of the resin layer 40 is blunt to the substrate surface, the residue of the conduction film tend to remain, when the conduction film is etched to form the reflection electrode 48. In the present embodiment, for this reason, the projected pattern 88 is formed on the resin layer 40. However, when the conduction film to be the reflection electrode 48 is patterned by wet etching, the residue of the conduction film does not easily remain on the side wall of the resin layer 40 when the conduction film to be the reflection electrode 40 is patterned by wet etching, and it is not necessary to form the projected pattern 88 on the resin layer 40.

Alignment control structures 44a, 44b of one and the same resin layer as the resin layer 40 are formed on the data bus line 28. The alignment control structures 44a, 44b have, e.g., a triangular or a quadrangular (rhombic) plane shape.

Reflection electrodes 48a, 48b are formed on the resin layer 40. The reflection electrode 48b is not electrically connected to the transmission electrode 32 which is driven by the gate bus line 12b present below the reflection electrode 48b but is electrically connected to the transmission electrode 32 which is driven by the gate bus line 12a which is different from the gate bus line 12b present below the reflection electrode 48b.

Thus, the TFT substrate 2f is constituted.

A CF substrate 4 (see FIG. 5) is disposed opposed to the TFT substrate 2f. A liquid crystal layer 6 (see FIG. 4) is sealed between the TFT substrate 2f and the CF substrate 4.

Thus, the liquid crystal display according to the present embodiment is constituted.

As described above the liquid crystal display according to the present embodiment is characterized mainly in that the resin layer 40 is formed in a strip along the gate bus line 12, and the streaks of the convexities 42a which are substantially perpendicular to the longitudinal direction of the resin layer 40 are formed in the surface of the resin layer 40.

The reflection electrode 48 is formed on the insulation layer 40 with such convexities 42a formed in, and the convexities 42a are formed also in the surface of the reflection electrode 48, reflecting the convexities 42a in the surface of the insulation layer 40. The declination direction of the declines planes of the convexities 42a are substantially in agreement with the longitudinal direction of the gate bus line 12. Accordingly, in the present embodiment, the reflectivity of light incident from, e.g., the left and right can be increased. That is, in the present embodiment, the reflectivity of light incident, e.g., from the left and right or from above and below in the drawing can be increased. Thus, the brightness of the reflection display can be improved.

The liquid crystal display according to the present embodiment is characterized mainly in that the resin layer 40 has the projected pattern 88 which is projected from the region between the adjacent reflection electrodes 48a. At the forward end of the projected pattern 88, the tilt of the plane of the side wall of the resin layer 40 is blunt to the substrate surface, which makes it difficult for the residue of the conduction film to remain at the forward end of the projected pattern 88 when the conduction film is dry etched to form the reflection electrode 48. Accordingly, the present embodiment can prevent without failure the adjacent reflection electrodes from shorting with each other.

(The Method for Fabricating the Liquid Crystal Display)

Then, the method for fabricating the liquid crystal display according to the present embodiment will be explained with reference to FIGS. 44A to 47D. FIGS. 44A to 47D are sectional views of the liquid crystal display according to the present embodiment in the steps of the method for fabricating the liquid crystal display.

Figure 44A:
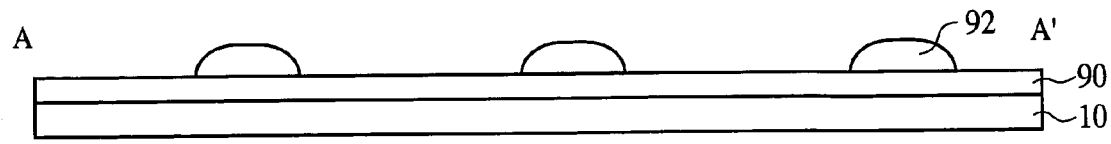
FIGS. 44A to 44D are sectional views of the liquid crystal display according to the ninth embodiment of the present invention in the steps of the method for fabricating the liquid crystal display, which illustrate the method (Part 1).

First, as shown in FIG. 44A, an Al film, an MoN film (molybdenum nitride film) and an Mo film (Molybdenum film) are sequentially formed on the entire surface of the glass substrate 10 by, e.g., PVD. The thickness of the Al film (aluminum film) is, e.g., 150 nm, the thickness of the MoN film is, e.g., 90 nm, and the thickness of the Mo film is, e.g., 10 nm. Thus, a layer film 90 is formed of the Al film, the MoN film and the Mo film is formed.

The layer film 90 for forming the gate bus line 12, etc. is formed of the Al film, the MoN film and Mo film. However, the conduction film forming the gate bus line 12, etc. is not limited to the layer film 90 formed of these materials. For example, the conduction film for forming the gate bus line 12, etc. may be Cr film, Al alloy film or others. The conduction film for forming the gate bus line 12, etc. may be a layer film of Al film and Ti film, or others.

Next, a photoresist film 92 is formed on the entire surface by, e.g., spin coating.

Then, the photoresist film 92 is patterned into a prescribed configuration by photolithography.

Figure 44B:
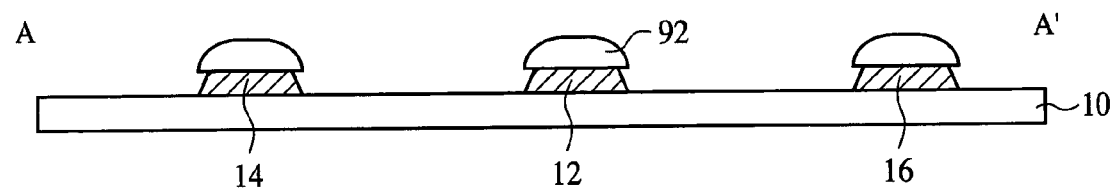

Then, as illustrated in FIG. 44B, with the photoresist film 92 as the mask, the layer film 90 is wet etched. The etchant is, e.g., a mixed acid of phosphoric acid, nitric acid and acetic acid. When the conduction film for forming the gate bus line 12, etc. is a layer film of Al film and Ti film, the conduction film may be dry etched. Thus, the gate bus line 12, the Cs bus line 14 and the Cs dummy bus line 16, etc. are formed. Then the photoresist film 92 is released.

Figure 44C:
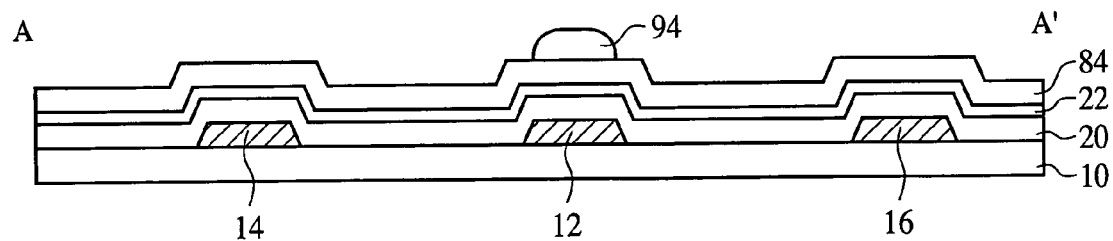

Then, as illustrated in FIG. 44C, the gate insulation film 20 of silicon nitride film is formed on the entire surface by, e.g., plasma CVD. Silicon nitride film is a transparent insulation film. The thickness of the gate insulation film 20 is, e.g., about 350 nm.

Next, the amorphous silicon film 22 is formed on the entire surface by, e.g., plasma CVD. The amorphous silicon film 22 is to be the channel layer of the thin film transistor (TFT). The thickness of the amorphous silicon film 22 is about, e.g., 30 nm.

Then, the channel protection film 84 of the silicon nitride film is formed on the entire surface by, e.g., plasma CVD. The thickness of the channel protection film 84 is, e.g., about 120 nm.

Next, a photoresist film 94 is formed on the entire surface by, e.g., spin coating.

Then, the photoresist film 94 is patterned into a prescribed configuration by photolithography. When the photoresist film 94 is patterned, the upper exposure and the back exposure may be suitably combined. The back exposure can expose the photoresist film 94 by self-alignment with the gate bus line 12.

Figure 44D:
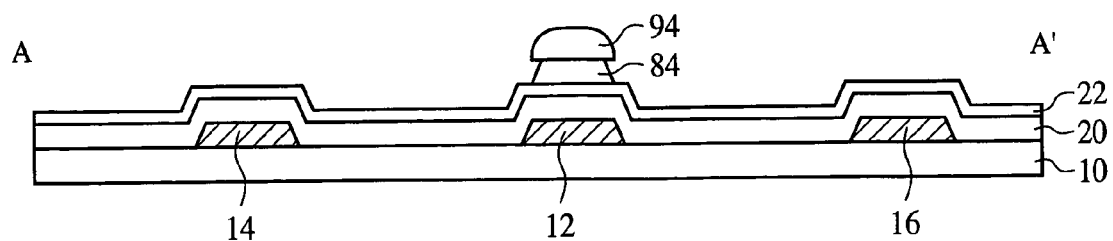

Then, as illustrated in FIG. 44D, with the photoresist film 94 as the mask, the channel protection film 84 is etched. Then, the photoresist film 94 is released.

Figure 45A:
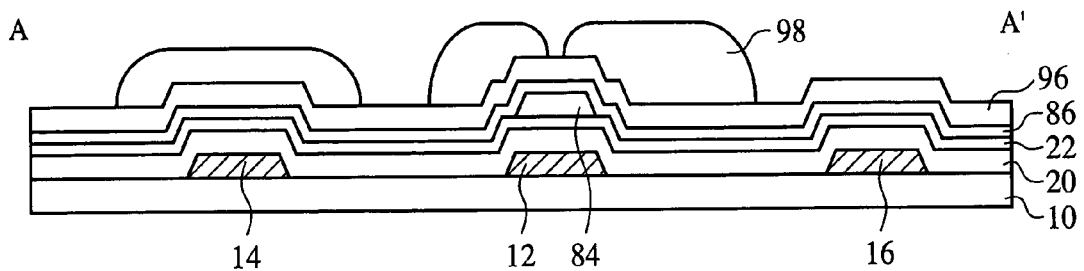
FIGS. 45A to 45D are sectional views of the liquid crystal display according to the ninth embodiment of the present invention in the steps of the method for fabricating the liquid crystal display, which illustrate the method (Part 2).

Next, as illustrated in FIG. 45A, the n$^+$ type amorphous silicon film 86 is formed on the entire surface by, e.g., PVD. The n$^+$ type amorphous silicon film 86 is to be a contact layer. The thickness of the n$^+$ type amorphous silicon film 86 is, e.g., about 30 nm.

Then, a 20 nm-thickness Ti film, a 75 nm-thickness Al film and a 80 nm-thickness Ti film are sequentially formed one on another on the entire surface by, e.g., PVD to form the conduction film 96. The conduction film 96 is to be the source electrode 24a, the drain electrode 24b, the data bus line 28 and the Cs opposed electrode 26.

In the present embodiment, as the conduction film to be the source electrode 24a, etc., the layer film 96 of Ti film, Al film and Ti film is formed, but the conduction film to be the source electrode 24a, etc. is not limited to the layer film 96. For example, as the conduction film to be the source electrode 24a, etc., an Al alloy film may be formed, or a layer film of other low resistive metals may be formed.

Then, a photoresist film 98 is formed on the entire surface by, e.g., spin coating.

Next, the photoresist film 98 is patterned into a prescribed configuration by photolithography.

Figure 45B:
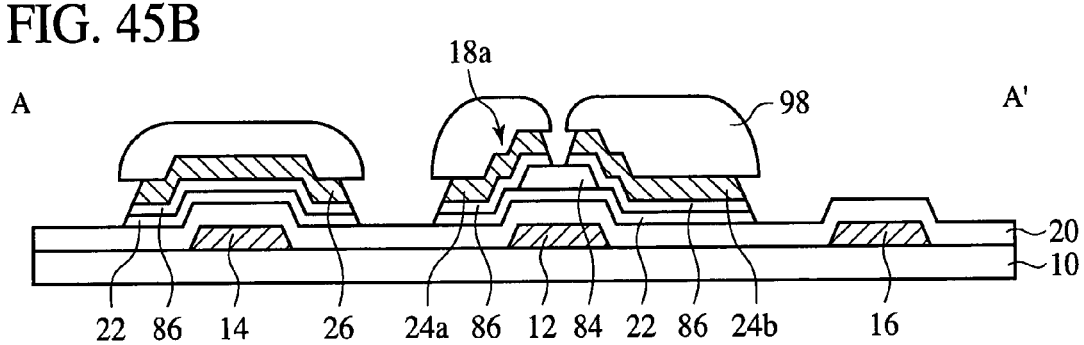

Then, as illustrated in FIG. 45B, the conduction film 96, n$^+$ type amorphous silicon film 86 and the amorphous silicon film 22 are dry etched by, e.g., RIE using the photoresist film 98 as the mask. The etchant gas is, e.g., a Cl-based gas. Thus, the data bus line 28, the drain electrode 24b, the source electrode 24a and the Cs opposed electrode 26 of the conduction film are formed. The n$^+$ type amorphous silicon film 86 present below the drain electrode 24b and the source electrode 24a functions as the contact layer. Then, the photoresist film 98 is released.

Figure 45C:
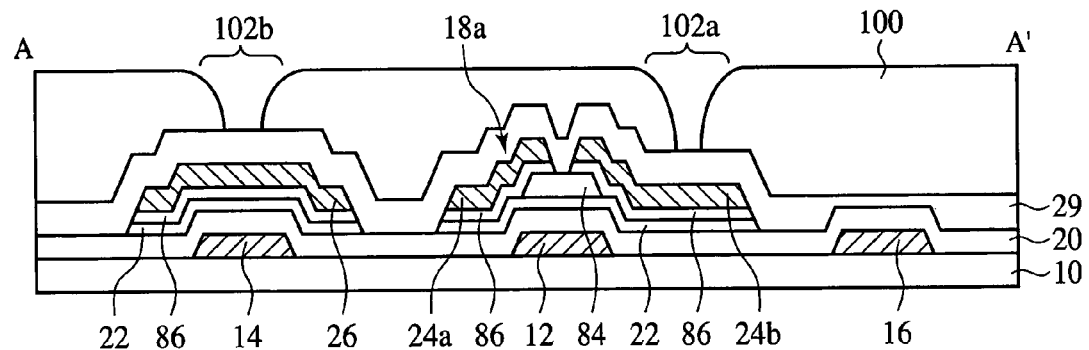

Next, as illustrated in FIG. 45C, the protection film 29 of silicon nitride is formed on the entire surface by, e.g., plasma CVD. The film thickness of the protection film 29 is, e.g., about 330 nm.

Next, a photoresist film 100 is formed on the entire surface by, e.g., spin coating.

Then, openings 102a, 102b are formed in the photoresist film 100 by photolithography. The openings 102a, 102b are for forming the contact holes 30a, 30b.

Figure 45D:
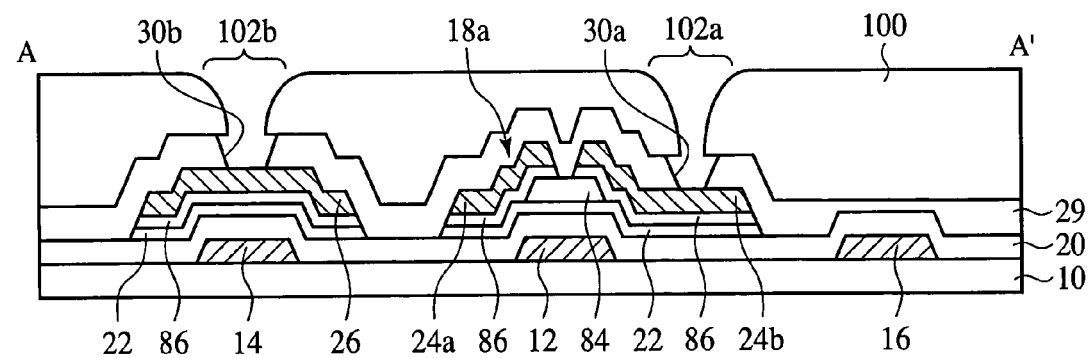

Next, as illustrated in FIG. 45D, the protection film 29 is etched with the photoresist film 100 as the mask. The contact hole 30a and the contact hole 30b are formed respectively down to the drain electrode 24b and the Cs opposed electrode 26. Then the photoresist film 100 is released (see FIG. 46A).

Figure 46A:
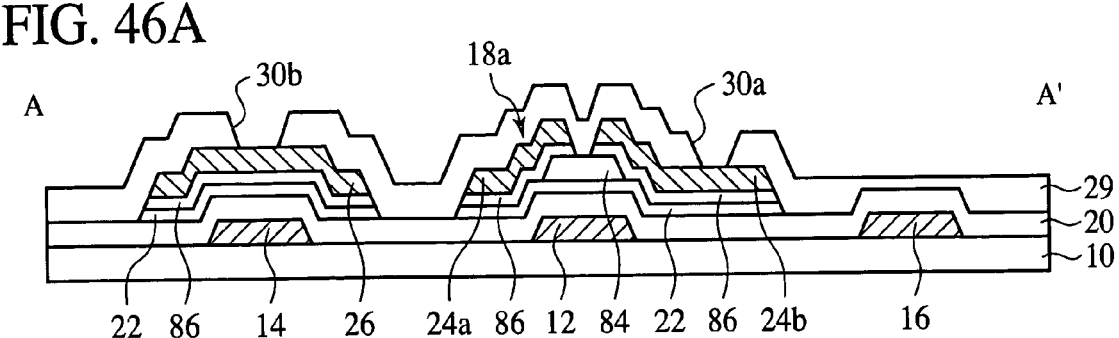
FIGS. 46A to 46D are sectional views of the liquid crystal display according to the ninth embodiment of the present invention in the steps of the method for fabricating the liquid crystal display, which illustrate the method (Part 3).
Figure 46B:
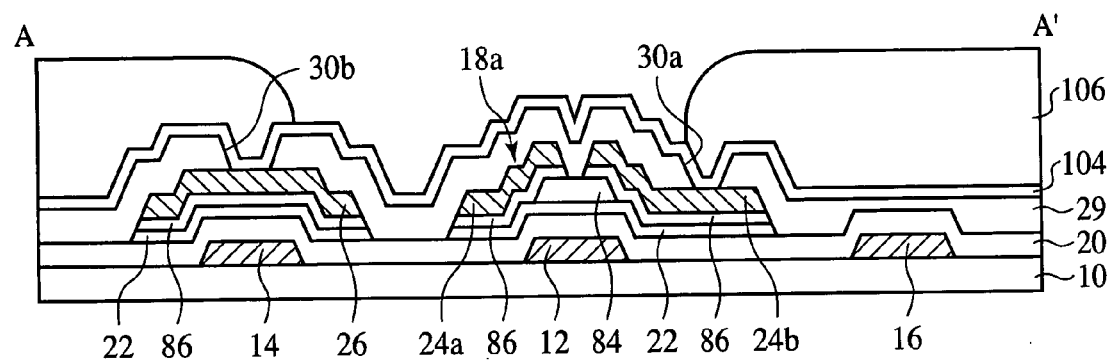

Next, as illustrated in FIG. 46B, an ITO layer 104 is formed on the entire surface by, e.g., PVD. The ITO film 104 is for forming the transmission electrode 52, etc. The thickness of the ITO film 104 is, e.g., about 70 nm.

Next, a photoresist film 106 is formed on the entire surface by, e.g., spin coating.

Then, the photoresist film 106 is patterned into a prescribed configuration by photolithography.

Figure 46C:
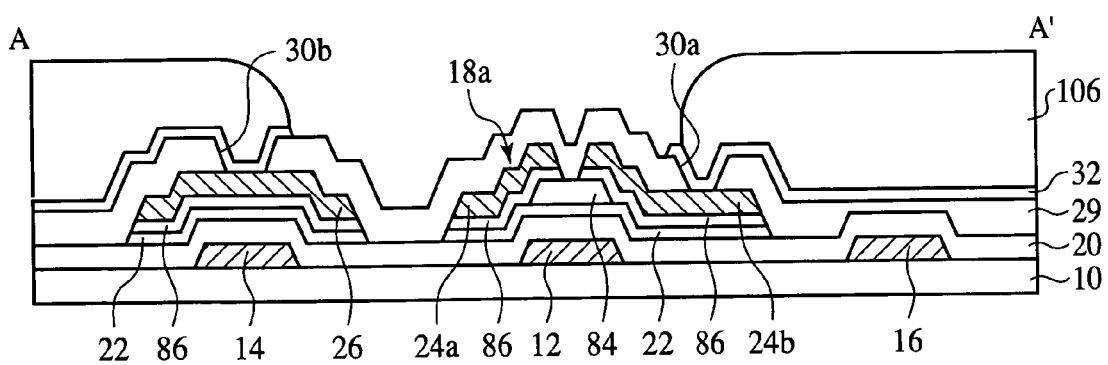

Then, as illustrated in FIG. 46C, with the photoresist film 106 as the mask, the ITO film 104 is etched. Thus, the transmission electrode 52 of the ITO film 104, and inter-connection pattern 38 of the ITO film 104 are formed. Then, the photoresist film 106 is released.

Next, thermal processing is performed to crystallize the transmission electrode 52, etc of the ITO film. The thermal processing temperature is, e.g., 200° C. or higher than 200° C.

Next, a positive-type photoresist layer 40 is formed on the entire surface by, e.g., spin coating. The thickness of the resist layer 40 is, e.g., about 2.5 μm. Then, thermal processing (pre-bake) is performed on the resist layer 40. The pre-bake evaporates the residual solvent in the resist layer 40 and enhance the adhesion of the photoresist layer 40 to the base.

Figure 46D:
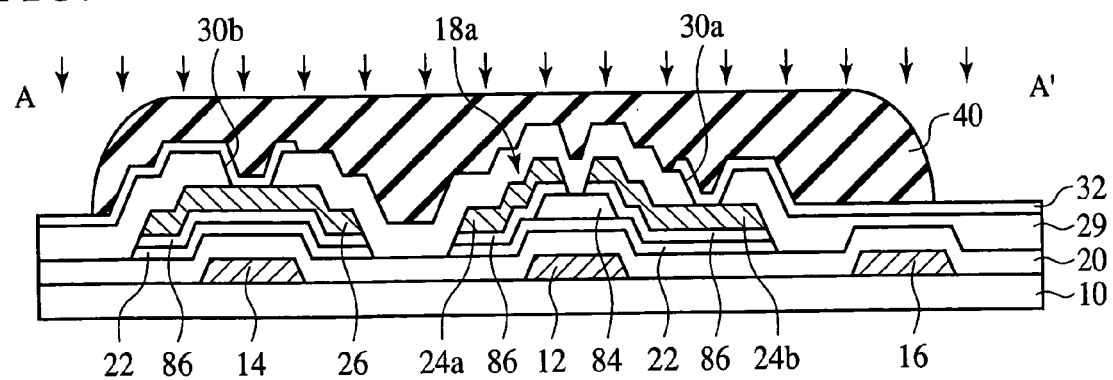

Then, as illustrated in FIG. 46D, the positive-type photoresist film 40 is patterned into a prescribed configuration by photolithography. Thus, a strip-shaped of the resin layer of the positive-type photoresist layer 40 is formed straight. The width of the strip-shaped resin layer 40 is, e.g., about 30–100 μm. At this time, the resist layer 40 is patterned to form the protected pattern 88 (see FIG. 42) projected between pixel electrodes 52. At this time, the alignment control structures 44a, 44b (see FIG. 42) of resin layer 40 are formed on the data bus line 28.

The projected pattern 88 of the resin layer 40 is formed so as to prevent the adjacent reflection electrodes 48 from shorting with each other. When the conduction film to form the reflection electrode 48 is patterned by wet etching, the residue of the conduction film is not easily left on the side wall of the resin layer, which makes it unnecessary to form the projected pattern 88 on the resin layer 40.

Next, thermal processing (post-bake) is performed on the resin layer 40. The thermal processing temperature is, e.g., 130–170° C. The post-bake is for evaporating the developer and rinse liquid remaining in the resist layer 40 or on the surface of the resist film 40, solidifying the resist layer 40 and ensuring the adhesion of the resist layer 40 to the base. The post-bake is essential because unless the post-bake is performed, there is a risk that when ions are implanted into the resist layer 40 in a later step, the ion implantation may not be perfectly performed due to the degassing. When, in a later step, ion-implantation is not performed, but UV exposure is performed, unless the post-bake is performed, there is a risk that the resist layer 40 may be exploded. The post-bake is essential also when UV exposure is performed in a later step.

Then phosphorus ions are implanted in the surface of the resin layer 40 by, e.g., ion implantation. A gas to be fed into the chamber of an ion implantation system is a phosphine (PH$_3$) gas diluted with hydrogen (H$_2$) gas. Phosphorus ions are implanted in the surface of the resin layer 40 so as to solidify the surface of the resin layer 40.

In the present embodiment, the surface of the resin layer 40 is solidified by ion implantation. However, the method for solidifying the surface of the resin layer 40 is not limited to ion implantation. The surface of the resin layer 40 may be solidified by, e.g., plasma irradiation, UV irradiation, laser beam irradiation or others.

Then, thermal processing of relatively high temperature (hard cure) is performed on the resin layer 40. The hard cure is performed at a temperature higher than that of the post-bake, more specifically a temperature above a thermal solidification temperature of the resist film. The thermal processing temperature is, e.g., 190–230° C. The surface of the resin layer 40, which has been solidified in advance, is not easily shrunk, but the inside of the resin layer is much thermally shrunk by the thermal processing of the relative high temperature. The convexities 42a are thus formed in the surface of the resin layer 40 (see FIG. 47A).

The thermal shrinkage percentage by the hard cure varies depending on temperatures of the post-bake. The temperature of the post-bake is suitably set, whereby the configuration etc. of the convexities 42a can be suitably set.

The height difference (depth) between the convexities 42 and the pitch thereof can be varied by suitably setting conditions for the ion implantation, the film thickness of the resist film, etc. In fabricating a small-sized liquid crystal displays, such as the liquid crystal displays used in PDA, the average declination angle of the declined planes of the convexities 42a is preferably about 4–8 degrees. When the convexities 42a are formed in the surface of the resin layer 40, it is possible to set, for example, the thickness of the resist film at about 2.5 μm, the gas flow rate of $PH_3$ to be fed into the chamber at about 40 sccm, the plasma discharge output at about 100 W, the acceleration voltage at about 60 keV, and the does at about $3\times10^{14}$ cm$^{-2}$. When the convexities 42a are formed under these conditions, the depth of the convexities 42a is 0.4–1.0 μm, the pitch thereof is 10–14 μm, and the average declination angle of the declined planes of the convexities 42a is about 4–8 degrees.

The ion implantation conditions are not limited to the above and can be suitably set. For example, the dose can be $5\times10^{13}$–$1\times10^{15}$ cm$^{-2}$, and the acceleration voltage is within the range of 5–90 keV, whereby the convexities can be formed uniform.

In the present embodiment, when the ion implantation is performed, phosphine gas diluted with hydrogen gas is fed into the chamber of the ion implantation system, but the gas to be fed into the chamber of the ion implantation system is not limited to the gas. For example, diborane gas ($B_2H_6$) diluted with hydrogen gas may be used. When diborane gas is used, boron ions are implanted into the surface of the resin layer 40 of a positive-type resist. The boron ion implantation into the surface of the resin layer 40 can form desired convexities lines in the surface of the resin layer 40, as does the phosphorus ion implantation.

Figure 47A:
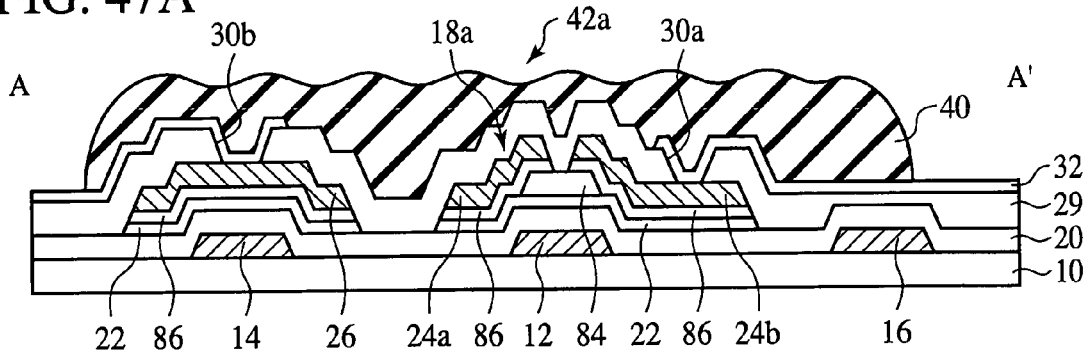
FIGS. 47A to 47D are sectional views of the liquid crystal display according to the ninth embodiment of the present invention in the steps of the method for fabricating the liquid crystal display, which illustrate the method (Part 4).
Figure 47B:
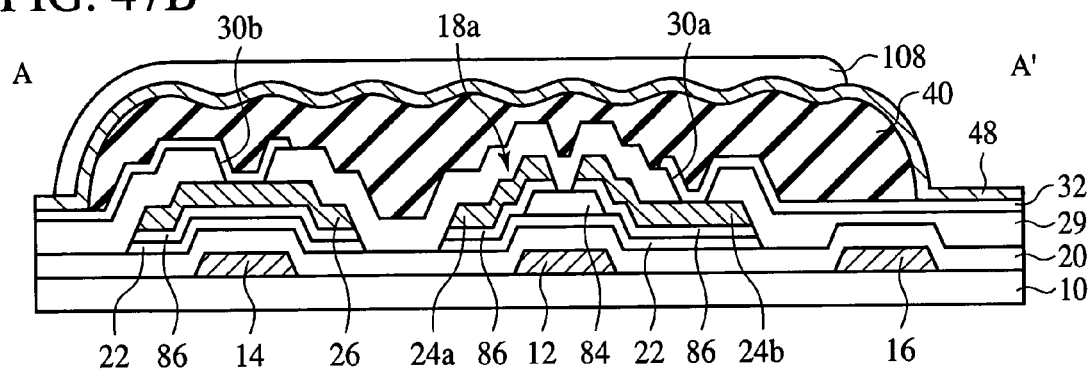

Next, as illustrated in FIG. 47B, a Ti film and an Al film are sequentially laid on the entire surface by, e.g., PVD to form the conductor film 48. The thickness of the Ti film is, e.g., 100 nm. The thickness of the Al film is, e.g., 100 nm.

The conductor film 48 is to be the reflection electrode.

The conductor film is not formed of a single layer of an Al film but is formed of the layer film of a Ti film and an Al film, because when the Al film is directly connected to the ITO film forming the transmission electrode 32, electrochemical corrosion, i.e., electro-corrosion take place. In the present embodiment, because of the Ti film between the ITO film forming the transmission electrode 32 and the Al film, the electro-corrosion can be prevented.

It is preferable to form the Ti film thick. More specifically, it is preferable to set the thickness of the Ti film to be larger than the thickness of the ITO film 104. The thickness of the Ti film is set to be larger because when the Ti film is absent at the edge of the reflection electrode 48, the Al film directly contacts the transmission electrode 32 of the ITO film, and the electro-corrosion takes place. When the Ti film is formed thicker than the ITO film 104, the Ti film is sufficiently thick, whereby the direct contact of the Al film to the transmission electrode 104 of the ITO film 104 can be prevented.

In the present embodiment, the Ti film and the Al film are sequentially laid to form the conductor film 48. However, the materials of the conductor film 48 is not limited them. For example, an MoN film and an Al film are sequentially laid to form the conductor film 48. In this case, the thickness of the MoN film is, e.g., 100 nm. The thickness of the Al film is, e.g., 100 nm. The conductor film 48 of the MoN film and the Al film can be patterned by wet etching. When the conductor film 48 of the MoN film and the Al film is patterned by wet etching, it is not necessary to form the projected pattern 88 on the resin layer 40.

As does the above-described Ti film, the MoN film prohibits the Al film from directly contacting the transmission electrode 32 of the ITO film 104 and resultantly prevents the electro-corrosion. For the same reason as described above, it is preferable to form the MoN film thicker than the ITO film 104.

Next, a photoresist film 108 is formed on the entire surface by, e.g., spin coating. At this time, it is preferable to form the photoresist film 108 thick in an about 2.0–2.3 μm thickness. More specifically, the photoresist film 108 is formed thick so that the thickness of the photoresist film 108 above the resin layer 40 is 0.3 μm or more.

The photoresist film 108 is formed thick in the present embodiment for the following reason. In general, the thickness of photoresist films used in patterning is usually about 1.5–1.7 μm. However, the resin layer 40 is as thick as about 2 μm, and when the photoresist film is formed in the usual thickness on the glass substrate 10 with the resin layer 40 of such thickness, the thickness of the photoresist film 108 above the resin layer 40 is decreased, and there is a risk that the photoresist film 108 above the resin layer 40 may be partially lost when the photoresist film 108 is developed after exposure. If the photoresist film 108 above the resin layer 40 is lost, the conduction layer 48 on the resin layer 40 could not be patterned in desired configuration.

However, in the present embodiment, the photoresist film 108 is formed thick, and even when the photoresist film 108 is developed, the photoresist film 108 above the resin layer 40 can remain without failure. Accordingly, in the present embodiment, the conduction film 48 on the resin layer 40 can be patterned in a desired configuration, and the reflection electrode 48 can be formed. The thickness decrease of the photoresist film 108 in the development is about 0.2–0.3 μm, and the photoresist film 108 may be formed thick so that the thickness of the photoresist film 108 above the resin layer 40 can be 0.3 μm or more.

Figure 47C:
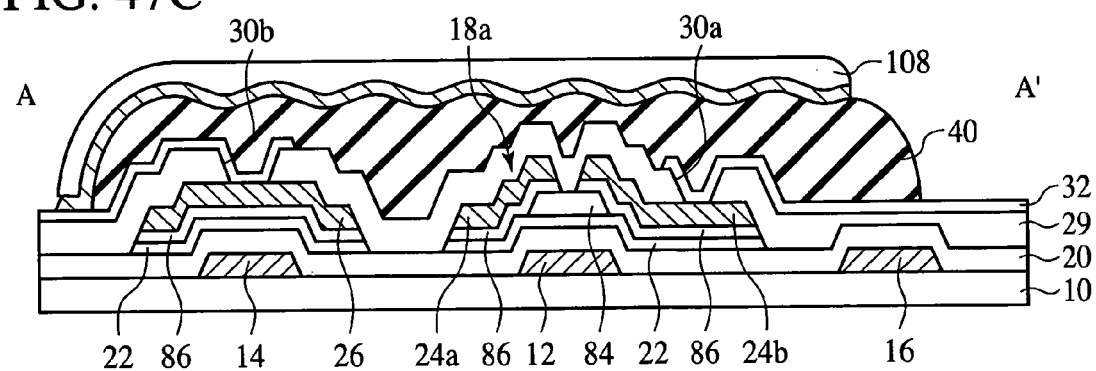

Next, as illustrated in FIG. 47C, the photoresist film 108 is patterned into a prescribed configuration by photolithography.

Then, with the photoresist film 108 as the mask, the conduction film 48 is dry etched. The etching gas can be, e.g., chlorine-based gas.

When the conduction film 48 is formed of the layer film of an MoN film and an Al film laid one on the other, the conduction film 48 may be patterned by wet etching. The etchant is, e.g., a mixed acid of phosphoric acid, nitric acid and acetic acid. Thus, the reflection electrode of the conduction film 48 is formed. When the conduction film 48 is patterned by wet etching, as described above, it is not necessary to form the projected pattern 88 on the resin layer 40.

Figure 47D:
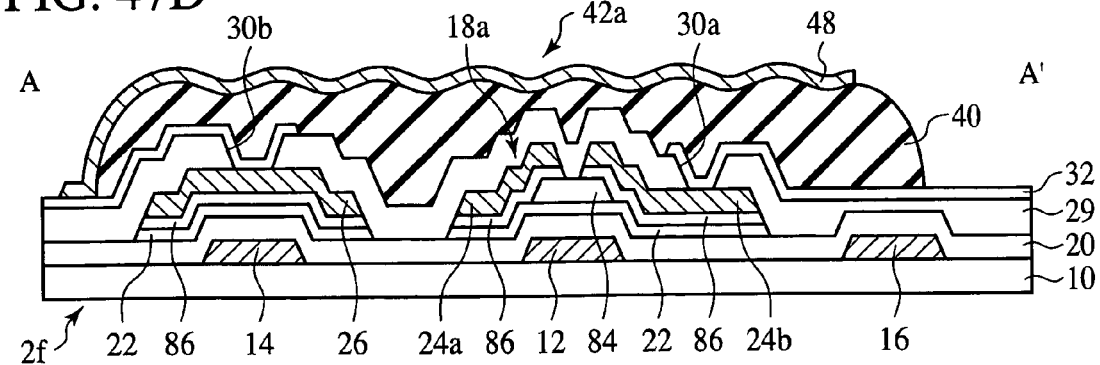

Then, as illustrated in FIG. 47D, the photoresist film 108 is released.

The TFT substrate 2f is thus formed. Then, the CF substrate 4 is provided, opposed to the TFT substrate 2f, and the liquid crystal layer 6 is sealed between the TFT substrate 2f and the CF substrate 4.

Thus, the liquid crystal display according to the present embodiment is fabricated.

In the present embodiment, the strip-shaped resin layer 40 is formed straight along the gate bus line 12. However, the strip-shaped resin layer 40 may not be formed straight.

Figure 48A:
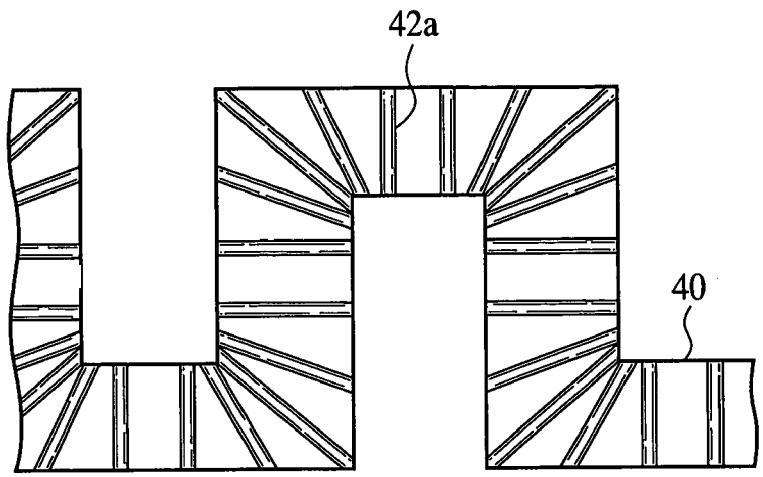
FIGS. 48A to 48C are plan views of modifications of the liquid crystal display according to the ninth embodiment of the present invention.
Figure 48B:
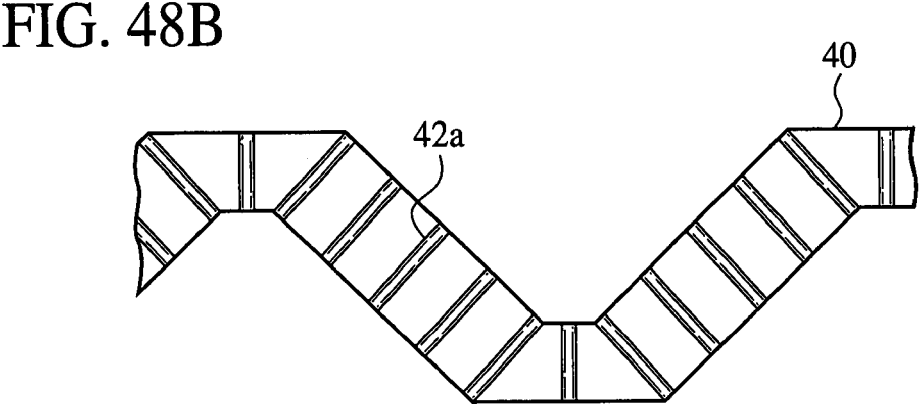
Figure 48C:
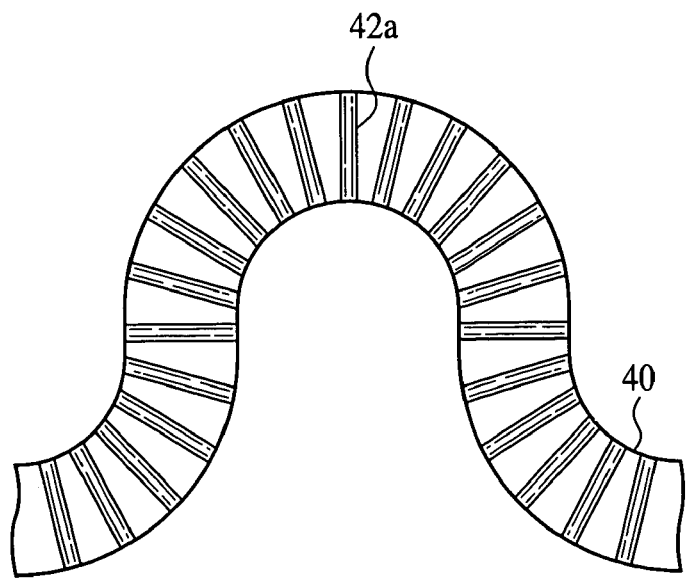

FIGS. 48A to 48C are plan views of a modification of the liquid crystal display according to the present embodiment.

FIG. 48A is plan view of the strip-shaped resin layer formed in a rectangular pattern. The strip-shaped resin layer 40 even formed in the rectangular pattern has the convexities 42a directed substantially perpendicular to the longitudinal direction of the strip-shaped resin layer 40.

FIG. 48B is a plan view of the strip-shaped resin layer formed in a sinuous arrangement. The strip-shaped resin layer even formed in a sinuous arrangement has the convexities 42a directed substantially perpendicular to the longitudinal direction of the strip-shaped resin layer 40.

FIG. 48C is a plan view of the strip-shaped resin layer formed in a serrate arrangement. The strip-shaped resin layer 40 even formed in a serrate arrangement has the convexities 42a directed substantially perpendicular to the longitudinal direction of the strip-shaped resin layer 40.

The reflection electrode 48 is suitably arranged on the strip-shaped resin layer 40 of any of these arrangements.

[A Tenth Embodiment]

Figure 49:
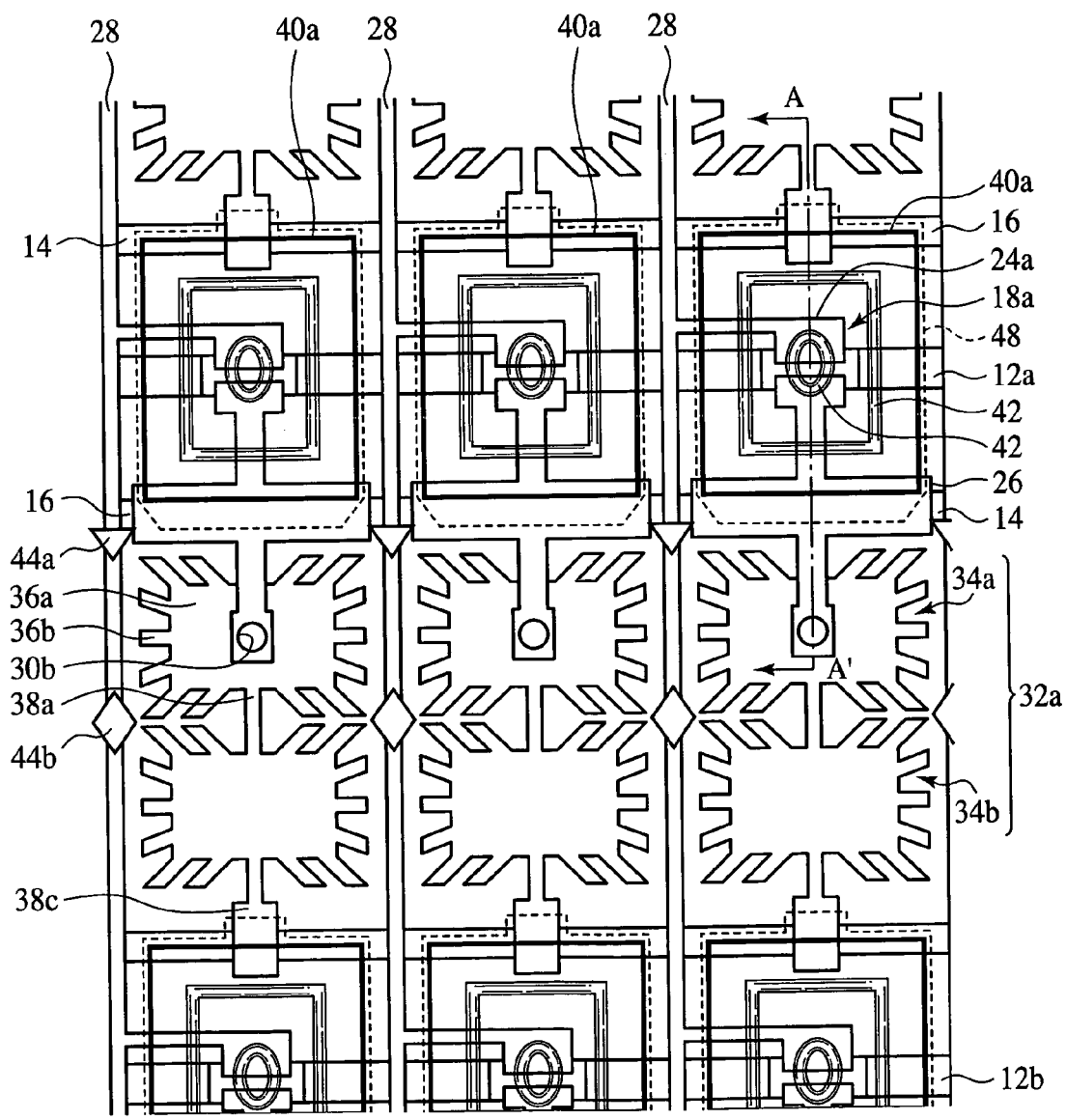
FIG. 49 is a plan view of the liquid crystal display according to a tenth embodiment of the present invention.
Figure 50:
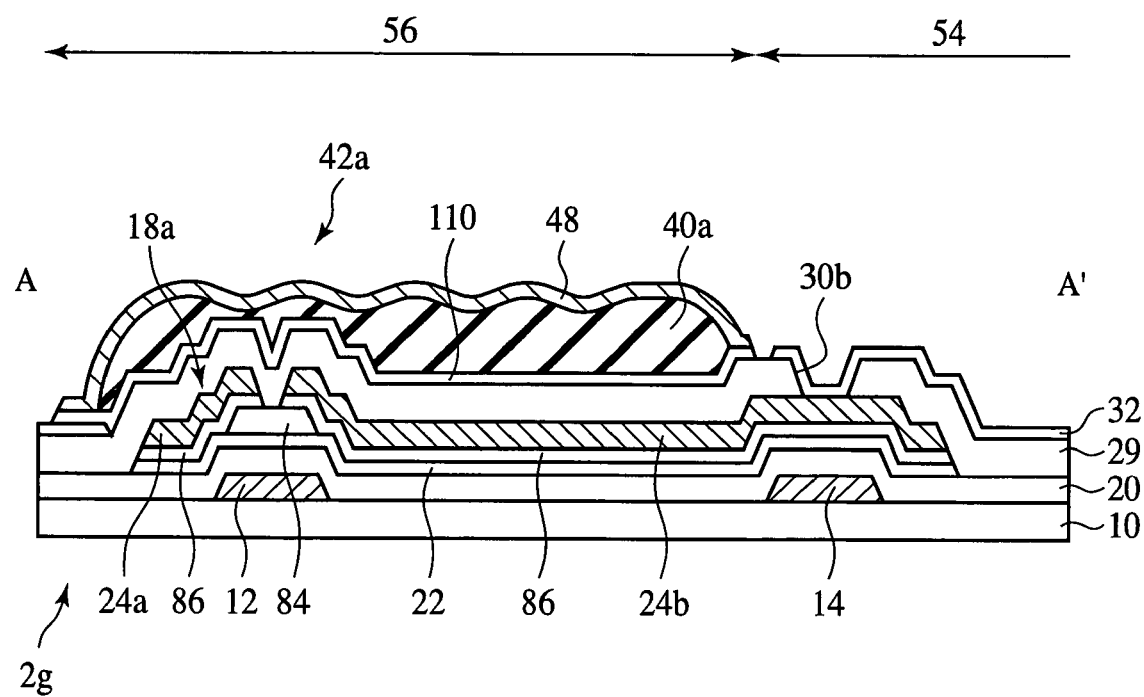
FIG. 50 is a sectional view of the liquid crystal display according to the tenth embodiment of the present invention.

The liquid crystal display according to a tenth embodiment and the method for fabricating the liquid crystal display will be explained with reference to FIGS. 49 to 52C. FIG. 49 is a plan view of the liquid crystal display according to the present embodiment. FIG. 50 is a sectional view of the liquid crystal display according to the present embodiment. The same members of the present embodiment as those of the liquid crystal display according to the first to the ninth embodiments illustrated in FIGS. 1A to 48C are represented by the same reference numbers not to repeat or to simplify their explanation.

(The Liquid Crystal Display)

First, the liquid crystal display according to the present embodiment will be explained.

The liquid crystal display according to the present embodiment is characterized mainly in that a light shielding film is formed below a resin layer 40a, and an insulation layer is formed in an island shape.

As illustrated in FIG. 50, a light shielding film 110 of, e.g., MoN or Ti is formed on a protection film 29 with a transmission electrode 32 formed on.

The light shielding film 110 is formed below the resin layer 40a in the present embodiment for the following reason. Patterning a resist layer 40a to be the resin layer requires exposure and development. In the exposure, light arrives at the exposure stage supporting the substrate, and is reflected or diffracted. Then, even parts of the resist film, that should not be exposed is photosensitized. In the exposure stage, various sensors, grooves for adsorbing substrates, pin chucks for holding substrates, etc. are formed, defining various convexities. Accordingly, parts of the resist layer 40a, which should not be exposed are disuniformly photosensitized. This disuniformly solidifies the resist layer 40a, and the convexities 42 are disuniformly formed in the surface of the resin layer 40a. However, in the present embodiment, because of the light shielding film 110 formed below the resin layer 40a, the resist layer 40a to be the resin layer is prevented from being disuniformly photosensitized due to the convexities of the exposure stage.

A resin layer 40a having convexities formed in the surface is formed on the light shielding film 110. The light shielding film 110 formed below the resin layer 40a prohibits the resin layer 40a from being disuniformly photosensitized. Accordingly, the convexities 42 are uniformly formed in the surface of the resin layer 40a. The resin layer has a quadrangular plane shape, and the convexities 42 also have a quadrangular pattern. The convexities 42 are formed concentric.

A reflection electrode 48 is formed on the resin layer 40a. The reflection electrode 48 is electrically connected to a transmission electrode 32 with the light shielding film 110 formed therebetween.

Thus, the liquid crystal display according to the present embodiment is fabricated.

The liquid crystal display according to the present embodiment is characterized mainly in that, as described above, the light shielding film 100a is formed below the resin layer 40a.

In the present embodiment, the light shielding film 110 is formed below the resin layer 40a, whereby the reflection of light by the exposure stage can be prevented, and accordingly the resin layer 40a is prevented from being disuniformly photosensitized in the exposure. Thus, according to the present embodiment, the convexities 42 can be formed uniformly in the surface of the resin layer 40a, and the liquid crystal display can have good display quality.

The liquid crystal display according to the present embodiment is also characterized mainly in that the resin layer 40a is formed in an island shape, and the convexities 42 are formed concentric in the surface of the island-shaped resin layer 40a. The reflection electrode 48 is formed on the insulation layer 40a with the convexities 42 formed concentric in the surface, and the concentric convexities 42 are formed also in the surface of the reflection electrode 48. Accordingly, in the surface of the reflection electrode 48, the streak of the convexities substantially perpendicular to the longitudinal direction of the gate bus line 12 and the streaks of the convexities 42 substantially parallel with the longitudinal direction of the gate bus line 12 are formed in the surface of the reflection electrode 48. The declination direction of the declined planes of the convexities 42 substantially perpendicular to the longitudinal direction of the gate bus line 12 substantially agrees with the longitudinal direction of the gate bus line 12. The direction of the declined planes of the convexities 42 substantially parallel with the longitudinal direction of the gate bus line 12 substantially agrees with the direction perpendicular to the longitudinal direction of the gate bus line 12. The liquid crystal display according to the present embodiment can exit light incident from the left and right of the screen of the liquid crystal display and light incident from above and below the screen of the liquid crystal display to the front surface of the screen of the liquid crystal display at high light intensities.

(The Method for Fabricating the Liquid Crystal Display)

Figure 51A:
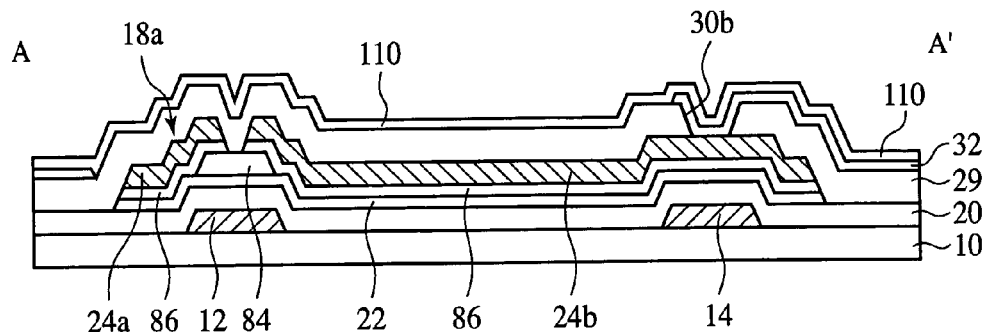
FIGS. 51A to 51C are sectional views of the liquid crystal display according to the tenth embodiment of the present invention in the steps of the method for fabricating the liquid crystal display, which illustrate the method (Part 1).

Next, the method for fabricating the liquid crystal display according to the present embodiment will be explained with reference to FIGS. 51A and 52C. FIGS. 51A to 52C are sectional views of the liquid crystal display in the steps of the method for fabricating the liquid crystal display, which illustrate the method.

First, the step of forming a transmission electrode 32 of ITO film including the transmission electrode 32 of ITO film forming step are the same as those of the method for fabricating the liquid crystal display illustrated in FIGS. 44A to 46C, and their explanation will be omitted (see FIG. 51A).

Figure 51B:
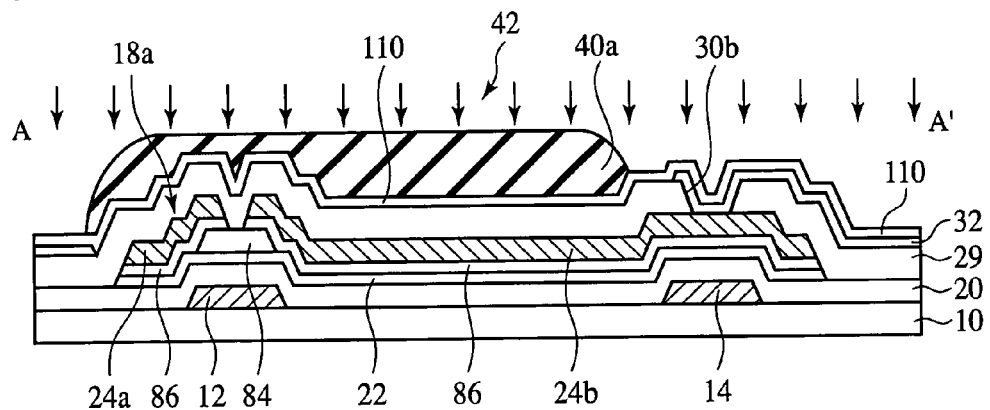

Then, as illustrated in FIG. 51B, the light shielding film 110 is formed of MoN or Ti is formed on the entire surface by, e.g., PVD. The thickness of the light shielding film is, e.g., about 100 nm.

Next, in the same way as in the method for fabricating the liquid crystal display described above with reference to FIG. 46D, a positive-type resist layer 40a is formed.

Then, the positive-type resist layer 40*a* is patterned into a prescribed configuration. Thus, the island-shaped resin layer of the positive-type resist layer 40*a* is formed. The resin layer 40*a* has, e.g., a quadrangular plane shape.

Then, in the same way as in the method for fabricating the liquid crystal display described above with reference to FIG. 46D, thermal processing (post-bake) is performed on the resin layer.

Next, phosphorus ions, for example, are implanted in the surface of the resin layer 40*a* by, e.g., ion implantation.

In the present embodiment, the surface of the resin layer 40*a* is solidified by implanting ions in the surface of the resin layer 40*a*. However, the method for solidifying the surface of the resin layer 40*a* is not essentially the ion implantation. For example, plasma irradiation, UV irradiation, laser beam irradiation or others may be used to solidify the surface of the resin layer 40*a*.

Figure 51C:
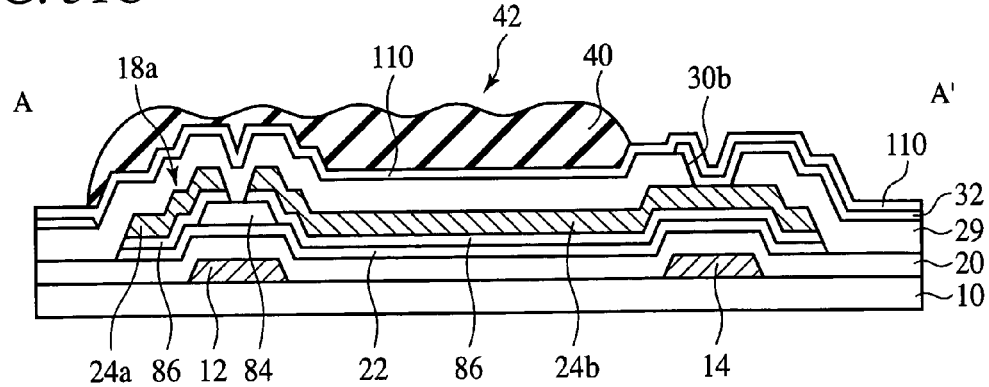

Then, as illustrated in FIG. 51C, thermal processing of relative high temperature (hard cure) is performed on the resin layer 40*a*. The high-temperature thermal processing may be performed in the same way as in the method for fabricating the liquid crystal display described above with reference to FIG. 47A. Thus, the convexities 42 are formed uniformly in the surface of the resin layer 40*a*. In the resin layer 40*a*, which is formed in an island shape, the convexities 42 are formed concentrically.

Figure 52A:
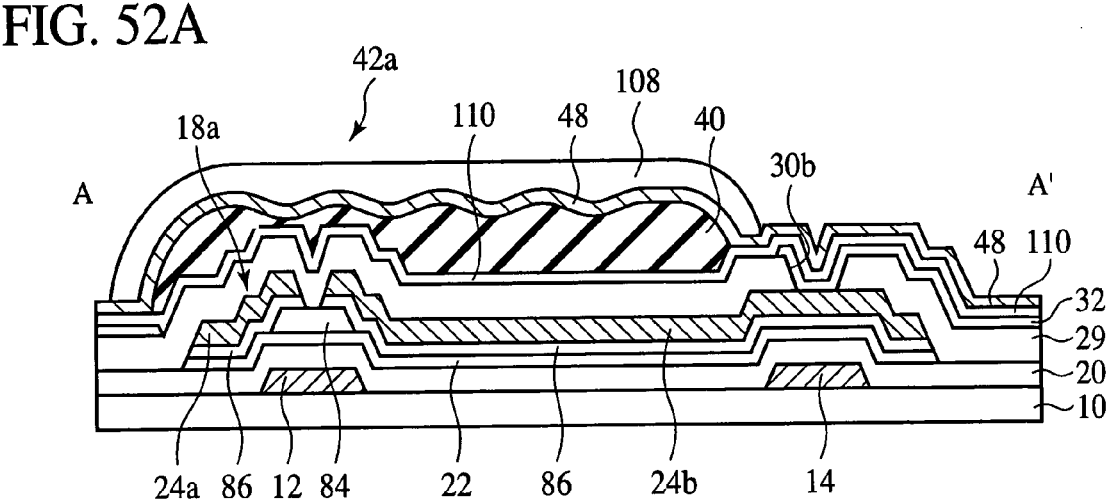
FIGS. 52A to 52C are sectional views of the liquid crystal display according to the tenth embodiment of the present invention in the steps of the method for fabricating the liquid crystal display, which illustrate the method (Part 2).

Next, as illustrated in FIG. 52A, the conduction film 48 of Al film is formed on the entire surface by, e.g., PVD. The thickness of the Al film is, e.g., 100 nm. The conduction film 48 is to be the reflection electrode. The electro-corrosion never takes place even in using the single layer of the Al film as the material of the conduction film to be the reflection electrode 48, because the reflection electrode 48 and the transmission electrode 32 of ITO film are electrically interconnected with the light shielding film 110 formed therebetween.

Next, the photoresist film 108 is formed on the entire surface by, e.g., spin coating.

Then, the photoresist film 108 is patterned into a prescribed configuration by photolithography.

Figure 52B:
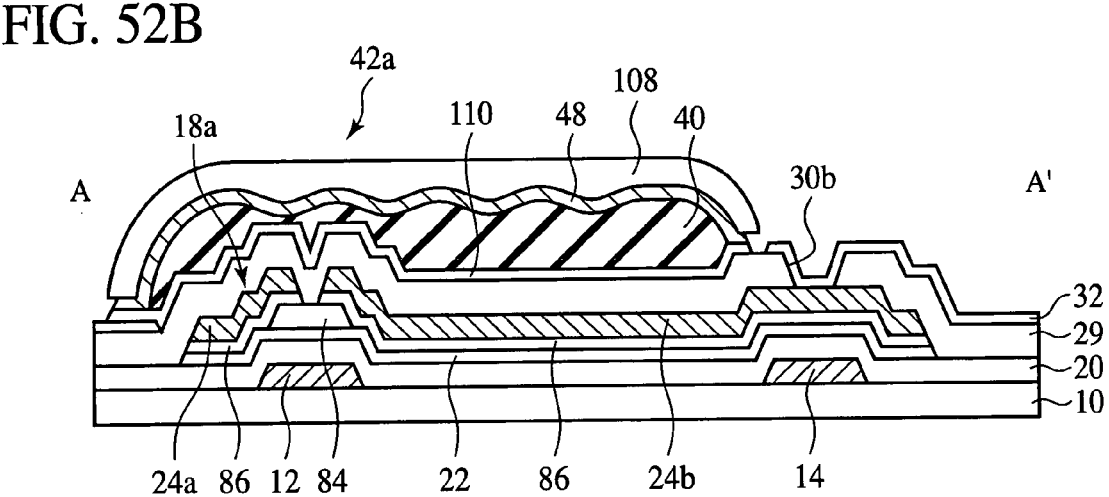
Figure 52C:
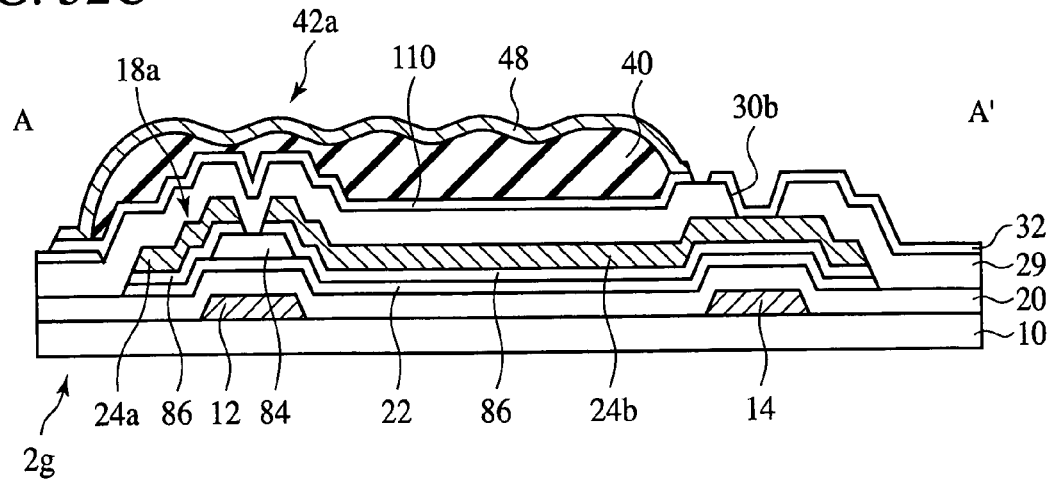

Then, as illustrated in FIG. 52B, with the photoresist film 108 as the mask, the conduction films 48, 110 are dry etched.

Then, as illustrated in FIG. 52C, the photoresist film 108 is released.

Thus, the TFT substrate 2*g* is formed. Then, the CF substrate 4 is provided, opposed to the TFT substrate 2*g*, and the liquid crystal layer 6 is sealed between the TFT substrate 2*g* and the CF substrate 4.

Thus, the liquid crystal display according to the present embodiment is fabricated.

In the present embodiment, the plane figure of the island-shaped resin layer 40*a* is quadrangular but is not limited to a quadrangular shape. For example, the plane figure of the resin layer 40*a* may be suitably hexagonal, octagonal, circular, elliptical or others.

Figure 53A:
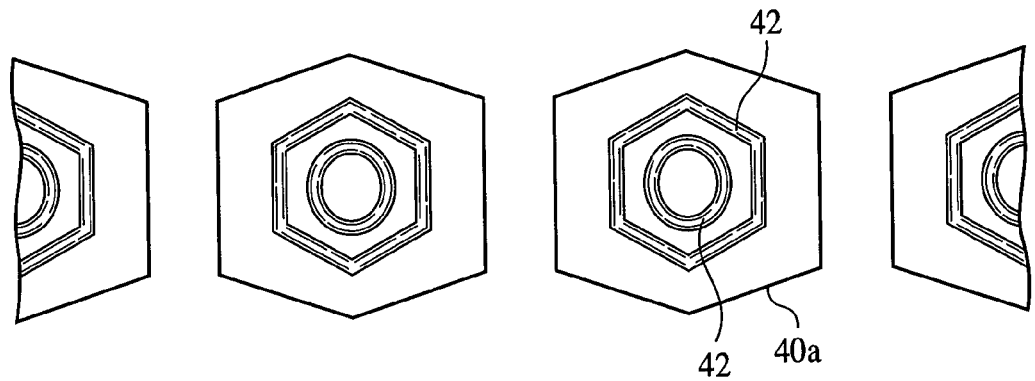
FIGS. 53A to 53C are plan views of modifications of the liquid crystal display according to the tenth embodiment of the present invention.
Figure 53B:
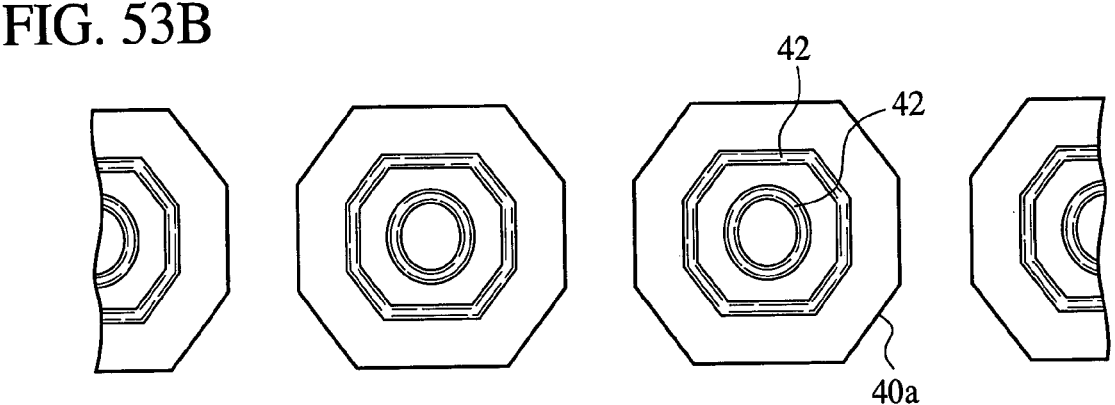
Figure 53C:
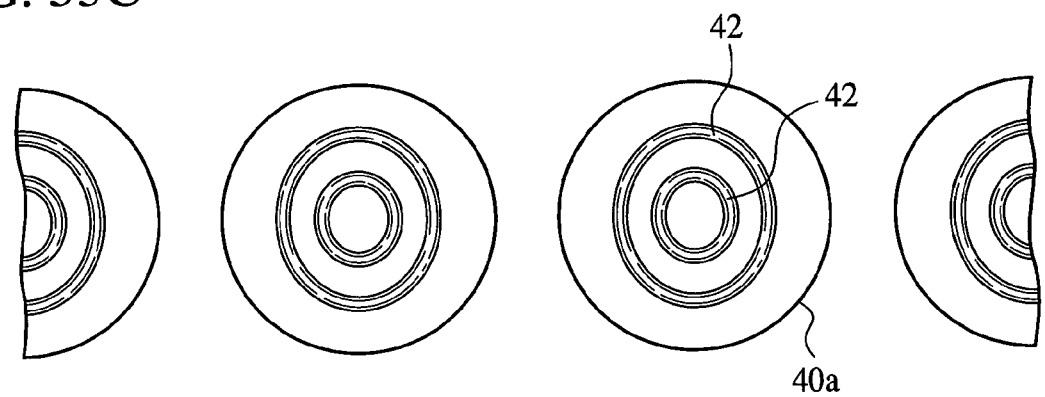

FIGS. 53A to 53C are plan views of modifications of the liquid crystal display according to the present embodiment.

FIG. 53A illustrate the resin layer of a hexagonal plane shape. The convexities 42 are formed concentrically even in the hexagonal plane-shaped resin layer 40*a*. In this case, the pattern of the convexities 42 is hexagonal.

FIG. 53B illustrates the resin layer of an octagonal plane shape. The convexities 42 are formed concentrically even in the octagonal plane-shaped resin layer 40*a*. In this case, the pattern of the convexities 42 is octagonal.

FIG. 53C illustrates the resin layer of a circular plane shape. The convexities 42 are formed concentrically even in the circular plane-shaped resin layer 40*a*. In this case, the pattern of the convexities 42 is circular.

[An Eleventh Embodiment]

Figure 54:
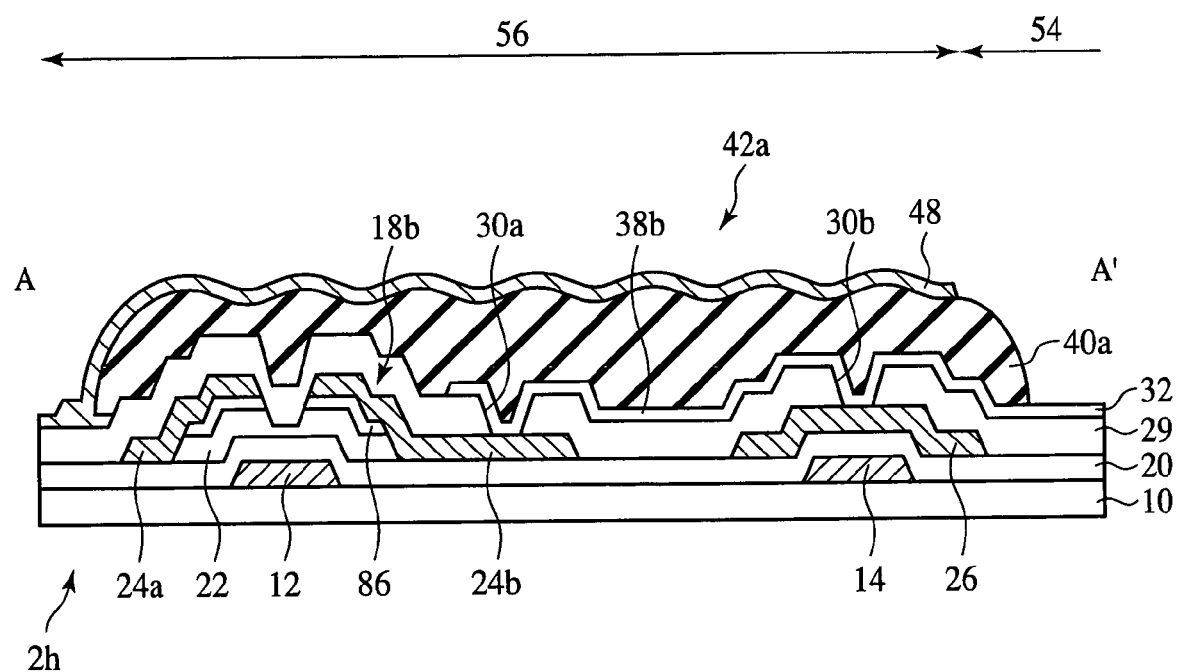
FIG. 54 is a sectional view of the liquid crystal display according to an eleventh embodiment of the present invention.

The liquid crystal display according to an eleventh embodiment of the present invention and the method for fabricating the liquid crystal display will be explained with reference to FIGS. 54 and 55D. FIG. 54 is a sectional view of the liquid crystal display according to the present embodiment. The same members of the present embodiment as those of the liquid crystal display according to the first to the tenth embodiments and the method for fabricating the liquid crystal display illustrated in FIGS. 1A to 53C are represented by the same reference numbers not to repeat or to simplify their explanation.

The liquid crystal display according to the present embodiment is characterized mainly in that channel etched thin film transistors are formed on a TFT substrate 2*h*.

A gate bus line 12, a Cs bus line 14, etc. are formed on a glass substrate 10.

A gate insulation film 20 is formed on the glass substrate 10 with the gate bus line 12, the Cs bus line 14, etc. formed on.

A channel layer 22 of amorphous silicon is formed above the gate bus line 12 with the gate insulation film 20 formed therebetween.

A contact layer 86 of $n^+$ type amorphous silicon is formed on the channel layer 22.

A source electrode 24*a* and a drain electrode 24*b* are formed on the contact layer 86 and the gate insulation film 20. The gate electrode 12, the source electrode 24*a*, the drain electrode 24*b*, the channel layer 22, etc. form a thin film transistor 18*b*. When the contact layer 86 is patterned, a part of the channel layer 22 is etched, and such thin film transistor 18*b* is called the channel etched-type.

Above the Cs bus line 14, a Cs opposed electrode 26 is formed with the gate insulation film 20 formed therebetween.

A protection film 29 is formed on the glass substrate 10 with the source electrode 24*a*, the drain electrode 24*b*, the Cs opposed electrode 26, etc. formed on.

A contact hole 30*a* and a contact hole 30*b* are formed in the protection film 29 respectively down to the drain electrode 24*b* and down to the Cs opposed electrode 26.

A transmission electrode 32 is formed on the protection film 29. The drain electrode 24*b* and the Cs opposed electrode 26 are connected to the interconnection pattern 38*b* of the transmission electrode 32 through the contact holes 30*a*, 30*b*.

A resin layer 40*a* with convexities 42 formed in the surface is formed on the transmission electrode 32 and the protection film 29. The resin layer 40*a* may be formed in a strip-shape or an island shape.

A reflection electrode 48 is formed on the resin layer 40*a*. The reflection electrode 48 is connected to the transmission electrode 32 in the region near the edge of the resin layer 40*a*.

Thus, the liquid crystal display according to the present embodiment is constituted.

(The Method for Fabricating the Liquid Crystal Display)

The liquid crystal display according to the present embodiment will be explained with reference to FIGS. 55A to 55D. FIGS. 55A to 55D are sectional views of the liquid crystal display according to the present embodiment in the steps of the method for fabricating the liquid crystal display, which illustrate the method.

A layer film is formed on the entire surface of the glass substrate 10. Then, the layer film is patterned into a prescribed configuration. Thus, the gate bus line 12, the Cs bus line 14, etc. are formed of the layer film (see FIG. 55A).

Figure 55A:
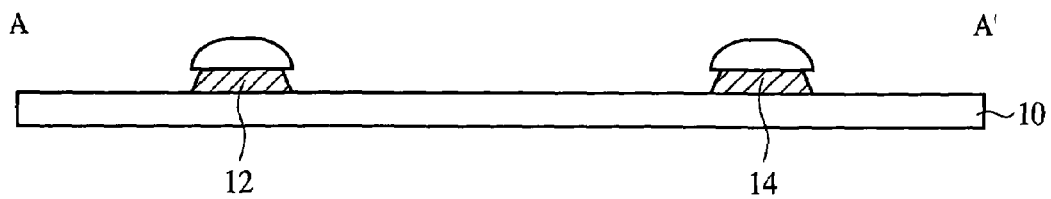
FIGS. 55A to 55D are sectional views of the liquid crystal display according to the eleventh embodiment of the present invention in the steps of the method for fabricating the liquid crystal display, which illustrate the method.
Figure 55B:
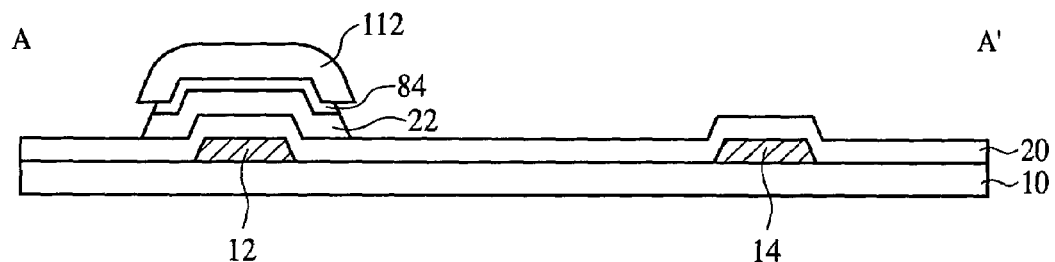
Figure 55C:
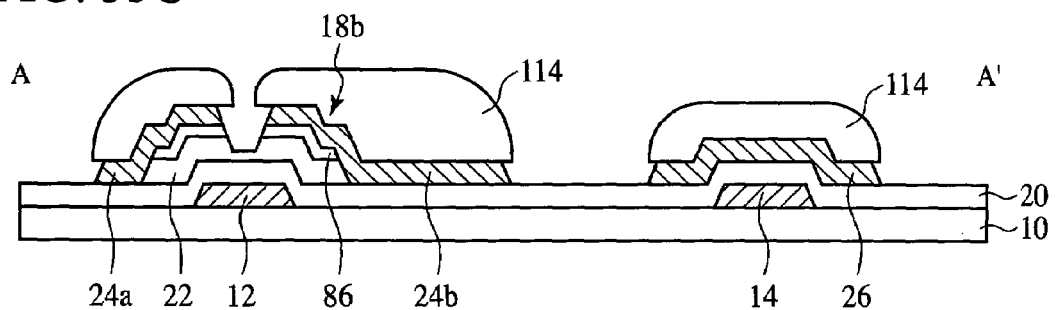
Figure 55D:
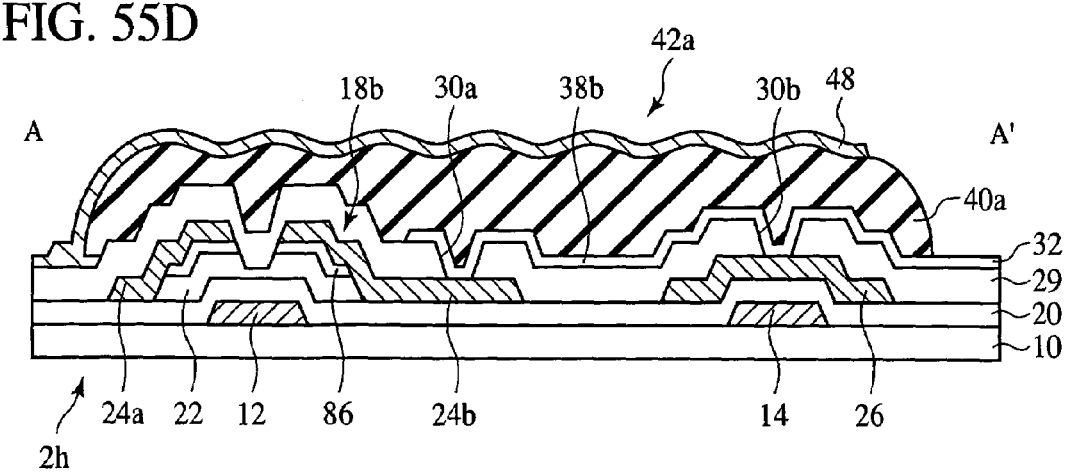

Next, as illustrated in FIG. 55B, the gate insulation film 20 is formed on the entire surface.

Next, an amorphous silicon film 22 is formed on the entire surface. The amorphous silicon film 22 is to be the channel layer. The thickness of the amorphous silicon film 22 is, e.g., about 120 nm. The $n^+$ type amorphous silicon film 22 is formed such thick so as to prevent the $n^+$ type amorphous silicon film 22 to be the channel layer from being excessively etched to be cut off when the $n^+$ type amorphous silicon film 84 to be a contact layer is patterned.

Then, an $n^+$ type amorphous silicon film 84 is formed on the entire surface. The $n^+$ type amorphous silicon film 84 is to be a contact layer. The thickness of the $n^+$ type amorphous silicon film 84 is, e.g., about 30 nm.

Next, a photoresist film 112 is formed on the entire surface by, e.g., spin coating.

Then, the photoresist film 112 is patterned into a prescribed configuration by photolithography.

Next, with the photoresist film 112 as the mask, the $n^+$ type amorphous silicon film 84 and the amorphous silicon film 22 are patterned by, e.g., RIE. Then, the photoresist film 112 is released.

Then, a 20 nm-thickness Mo film, a 75 nm-thickness Al film, a 90 nm-thickness MoN film and a 10 nm-thickness Mo film are sequentially laid one on another to form a conduction film. The conduction film is to be the source electrode 24*a*, the drain electrode 24*b*, the data bus line 28 and the Cs opposed electrode 26.

As the conduction film to be the source electrode 24*a*, etc., the layer film of Mo film, Al film, MoN film and Mo film is formed. The material of the conduction film to be the source electrode 24*a*, etc., is not limited to said layer film. For example, Al alloy film may be formed, or a layer film of other low resistive metals may be formed.

Then, a photoresist film 114 is formed on the entire surface by, e.g., spin coating.

Then, the photoresist film 114 is patterned into a prescribed configuration by photolithography.

Next, the with the photoresist film 114 as the mask, the layer film is wet etched with, e.g., a mixed acid. Then, the $n^+$ type amorphous silicon film 84 in the channel region is dry etched by, e.g., RIE. The etching gas is, e.g., a mixed gas of $SF_6$ gas, He gas and HCl gas. Thus, the source electrode 24*a*, the drain electrode 24*b*, the Cs opposed electrode 26, etc., of the conduction film are formed.

Then, with the photoresist film 114 as the mask, the $n^+$ type amorphous silicon film 84 is patterned by, e.g., RIE. At this time, the amorphous silicon film 22 below the $n^+$ type amorphous silicon film 22 is also etched, and if the amorphous silicon layer 22 to be the channel layer is excessively etched, the channel layer 22 will be cut off. In etching the $n^+$ type amorphous silicon film 84, it is preferable to etch the $n^+$ type amorphous silicon film 84 so that the amorphous silicon film 22 direct below the $n^+$ type amorphous silicon film 84 remains in at least several ten nanometers-thickness. Thus, the channel-etched thin film transistor 18*b* is fabricated. Then, the photoresist film 114 is released.

The following steps of the method for fabricating the liquid crystal display are the same as those of the method for fabricating the liquid crystal display according to the ninth or the tenth embodiment, and their explanation will be omitted.

Thus, the liquid crystal display according to the present embodiment is fabricated.

In the same way as in the present embodiment, the channel etched thin film transistor 18*b* may be fabricated on a TFT substrate 2*h*.

[Modified Embodiments]

The present invention is not limited to the above-described embodiment and can cover other various modifications.

For example, the TFT substrates of the above-described embodiments, and the CF substrates of the above-described embodiments may be suitably combined.

The method for fabricating the liquid crystal display according to the ninth and the tenth embodiments may be suitably used in fabricating the liquid crystal display according to the first to the eighth embodiments.

In the ninth embodiments, the resin layer is formed in a strip shape but may be formed in an island shape.

In the tenth embodiments, the resin layer is formed in an island shape but may be formed in a strip-shape. For example, the resin layer may be formed straight, rectangular, sinuous, serrated or in other shapes.

What is claimed is:

1. A liquid crystal display comprising:
   a first substrate including a gate bus line;
   a data bus line formed intersecting the gate bus line;
   a thin film transistor formed near an intersection between the gate bus line and the data bus line; and
   a pixel electrode including a transmission electrode electrically connected to the thin film transistor and a reflection electrode electrically connected to the transmission electrode;
   a second substrate opposed to the first substrate and including an opposed electrode opposed to the pixel electrode; and
   a liquid crystal layer sealed between the first substrate and the second substrate,
   the reflection electrode being formed over another gate bus line which is different from said gate bus line, with an insulation layer formed therebetween,
   wherein the first substrate further includes a storage capacitance bus line formed adjacent to said another gate bus line, and
   wherein at least a part of the storage capacitance bus line is positioned below the reflection electrode.

2. A liquid crystal display according to claim 1, wherein the transmission electrode includes a plurality of electrode units interconnected to each other by an interconnection pattern.

3. A liquid crystal display according to claim 2, wherein the electrode units each including a solid portion and a plurality of extensions extended from the solid portion outward toward the boundary thereof.

4. A liquid crystal display according to claim 2, wherein the interconnection pattern is formed near the center line of the electrode unit.

5. A liquid crystal display according to claim 1,
   wherein the first substrate further includes another thin film transistor formed near an intersection between said another gate bus line and the data bus line, and
   wherein said another thin film transistor is positioned below the reflection electrode.

6. A liquid crystal display according to claim 1, wherein streaks of convexities perpendicular to the longitudinal direction of the gate bus line are formed in the surface of the insulation layer.

7. A liquid crystal display according to claim 1, wherein first streaks of convexities perpendicular to the longitudinal direction of the gate bus line, and second streaks of convexities parallel with the longitudinal direction of the gate bus line are formed in the surface of the insulation layer.

8. A liquid crystal display according to claim 1, wherein the reflection electrode is connected to the transmission electrode at the edge of the insulation layer.

9. A liquid crystal display according to claim 1, wherein the reflection electrode is connected to the transmission electrode near the center line of the reflection electrode.

10. A liquid crystal display according to claim 1, wherein the second substrate further includes an alignment control structure which is in contact with the reflection electrode over the insulation layer, for controlling an alignment direction of a liquid crystal molecule of the liquid crystal layer.

11. A liquid crystal display according to claim 1, wherein the second substrate further includes a color filter layer; and an alignment control structure formed below the color filter layer, for controlling an alignment direction of a liquid crystal molecule of the liquid crystal layer, and
an opening is formed in the color filter layer in a region of the region above the reflection electrode, which is other than the region where the alignment control structure is formed.

12. A liquid crystal display according to claim 1, wherein the first substrate further includes an alignment control structure formed on the data bus line and formed of one and the same insulation layer, for controlling an alignment direction of a liquid crystal molecule of the liquid crystal layer.

13. A liquid crystal display according to claim 12, wherein the alignment control structure has a triangular or quadrangular plane shape.

14. A liquid crystal display according to claim 1, wherein a region where the reflection electrode is not formed is present at the edge of the insulation layer.

15. A liquid crystal display comprising:
a first substrate including a gate bus line;
a data bus line formed intersecting the gate bus line;
a thin film transistor formed near an intersection between the gate bus line and the data bus line; and
a pixel electrode including a transmission electrode electrically connected to the thin film transistor and a reflection electrode electrically connected to the transmission electrode;
a second substrate opposed to the first substrate and including an opposed electrode opposed to the pixel electrode; and
a liquid crystal layer sealed between the first substrate and the second substrate,
the reflection electrode being formed over another gate bus line which is different from said gate bus line, with an insulation layer formed therebetween,
wherein the first substrate further includes a storage capacitance bus line adjacent to said another gate bus line, and
wherein the edge of the insulation layer is positioned over the storage capacitance bus line.

16. A liquid crystal display according to claim 15, wherein the transmission electrode includes a plurality of electrode units interconnected to each other by an interconnection pattern.

17. A liquid crystal display according to claim 16, wherein the electrode units each including a solid portion and a plurality of extensions extended from the solid portion outward toward the boundary thereof.

18. liquid crystal display according to claim 16, wherein the interconnection pattern is formed near the center line of the electrode unit.

19. A liquid crystal display according to claim 15,
wherein the first substrate further includes another thin film transistor formed near an intersection between said another gate bus line and the data bus line, and
wherein said another thin film transistor is positioned below the reflection electrode.

20. A liquid crystal display according to claim 15, wherein first streaks of convexities perpendicular to the longitudinal direction of the gate bus line and second streaks of convexities parallel with the longitudinal direction of the gate bus line are formed in the surface of the insulation layer.

21. A liquid crystal display according to claim 15, wherein the reflection electrode is connected to the transmission electrode at the edge of the insulation layer.

22. A liquid crystal display according to claim 15, wherein the reflection electrode is connected to the transmission electrode near the center line of the reflection electrode.

23. A liquid crystal display according to claim 15, wherein the second substrate further includes an alignment control structure which is in contact with the reflection electrode over the insulation layer, for controlling an alignment direction of a liquid crystal molecule of the liquid crystal layer.

24. A liquid crystal display according to claim 15, wherein the first substrate further includes an alignment control structure formed on the data bus line and formed of one and the same insulation layer, for controlling an alignment direction of a liquid crystal molecule of the liquid crystal layer.

25. A liquid crystal display according to claim 24, wherein the alignment control structure has a triangular or quadrangular plane shape.

26. A liquid crystal display according to claim 15, wherein a region where the reflection electrode is not formed is present at the edge of the insulation layer.

* * * * *

UNITED STATES PATENT AND TRADEMARK OFFICE
CERTIFICATE OF CORRECTION

PATENT NO. : 7,212,266 B2 Page 1 of 1
APPLICATION NO. : 10/909975
DATED : May 1, 2007
INVENTOR(S) : Tashiro et al.

It is certified that error appears in the above-identified patent and that said Letters Patent is hereby corrected as shown below:

Title Page; item (73);

On the Patent Face:

Under Assignee, after "AU Optronics Corporation," delete "Kawasaki (JP)" and insert --Hsinchu (TA)--

Signed and Sealed this

Twenty-fourth Day of November, 2009

David J. Kappos
*Director of the United States Patent and Trademark Office*